United States Patent
Cowen et al.

(10) Patent No.: US 12,229,895 B1
(45) Date of Patent: Feb. 18, 2025

(54) VIRTUAL REALITY DETECTION AND PROJECTION SYSTEM FOR USE WITH A HEAD MOUNTED DISPLAY

(71) Applicants: Benjamin Cowen, New York, NY (US); Jon Muskin, Hutingdon Valley, PA (US)

(72) Inventors: Benjamin Cowen, New York, NY (US); Jon Muskin, Hutingdon Valley, PA (US)

(73) Assignee: Out of Sight Vision Systems LLC, Las Vegas, NV (US)

( * ) Notice: Subject to any disclaimer, the term of this patent is extended or adjusted under 35 U.S.C. 154(b) by 0 days.

(21) Appl. No.: 15/836,779

(22) Filed: Dec. 8, 2017

Related U.S. Application Data

(60) Provisional application No. 62/431,820, filed on Dec. 8, 2016.

(51) Int. Cl.
 *G06T 19/00* (2011.01)
 *G01S 17/04* (2020.01)
 *G02B 27/01* (2006.01)

(52) U.S. Cl.
 CPC ............ *G06T 19/003* (2013.01); *G01S 17/04* (2020.01); *G02B 27/017* (2013.01)

(58) Field of Classification Search
 None
 See application file for complete search history.

(56) References Cited

U.S. PATENT DOCUMENTS

| | | | | |
|---|---|---|---|---|
| 2007/0038944 A1* | 2/2007 | Carignano | ............ | G06T 19/006 715/757 |
| 2008/0129825 A1* | 6/2008 | DeAngelis | ............. | H04N 7/181 348/E7.086 |
| 2012/0020524 A1* | 1/2012 | Ishikawa | ................ | H04N 7/183 382/103 |
| 2012/0075285 A1* | 3/2012 | Oyagi | ................... | G06T 19/006 345/419 |
| 2013/0120449 A1* | 5/2013 | Ihara | ................... | G06F 11/0727 345/633 |
| 2013/0278635 A1* | 10/2013 | Maggiore | ............. | G06F 3/0304 345/633 |
| 2013/0335405 A1* | 12/2013 | Scavezze | ................ | G06T 19/20 345/419 |
| 2014/0015929 A1* | 1/2014 | Hong | ........................ | G06T 7/55 348/46 |
| 2014/0160117 A1* | 6/2014 | Nehmadi | ............... | G06F 3/0304 345/419 |
| 2014/0210858 A1* | 7/2014 | Kim | ........................ | G06F 3/147 345/633 |
| 2014/0267012 A1* | 9/2014 | Mullins | ................... | G06F 3/013 345/156 |
| 2014/0270477 A1* | 9/2014 | Coon | ..................... | G06T 19/006 382/154 |

(Continued)

*Primary Examiner* — Sultana M Zalalee
(74) *Attorney, Agent, or Firm* — Muskin and Farmer LLC

(57) ABSTRACT

A Virtual reality system which comprises a head mounted display and positional tracking to determine the position and orientation of the head mounted display. A player wearing the head mounted display would view a virtual world. External physical objects such as a cup can be identified and displayed inside the virtual world displayed inside the head mounted display so that a player can drink out of the cup without having to remove the head mounted display.

8 Claims, 37 Drawing Sheets

(56) References Cited

U.S. PATENT DOCUMENTS

| | | | | |
|---|---|---|---|---|
| 2014/0365506 | A1* | 12/2014 | Gong | G06F 16/24 |
| | | | | 707/748 |
| 2015/0009206 | A1* | 1/2015 | Arendash | G06T 19/006 |
| | | | | 345/419 |
| 2015/0016777 | A1* | 1/2015 | Abovitz | G02B 27/225 |
| | | | | 385/37 |
| 2015/0030202 | A1* | 1/2015 | Fleites | G06V 20/40 |
| | | | | 382/103 |
| 2015/0062120 | A1* | 3/2015 | Reisner-Kollmann | |
| | | | | G06T 17/00 |
| | | | | 345/419 |
| 2015/0170416 | A1* | 6/2015 | McGregor | G06T 17/00 |
| | | | | 345/420 |
| 2015/0228122 | A1* | 8/2015 | Sadasue | G06T 19/006 |
| | | | | 345/633 |
| 2016/0026253 | A1* | 1/2016 | Bradski | H04N 13/128 |
| | | | | 345/8 |
| 2016/0042249 | A1* | 2/2016 | Babenko | G06V 20/46 |
| | | | | 382/224 |
| 2016/0217616 | A1* | 7/2016 | Kraver | G06F 3/012 |
| 2016/0239952 | A1* | 8/2016 | Tanaka | G01D 5/26 |
| 2016/0288236 | A1* | 10/2016 | Becker | B23K 9/0953 |
| 2016/0314596 | A1* | 10/2016 | Yu | G09B 19/0038 |
| 2016/0321530 | A1* | 11/2016 | Troy | G06K 7/10881 |
| 2017/0011553 | A1* | 1/2017 | Chen | G06F 3/005 |
| 2017/0221272 | A1* | 8/2017 | Li | G06T 19/006 |
| 2017/0262247 | A1* | 9/2017 | Yoganandan | G06F 3/0482 |
| 2017/0287166 | A1* | 10/2017 | Claveau | H04N 17/002 |
| 2018/0033153 | A1* | 2/2018 | Hirasawa | G06F 18/00 |
| 2018/0182171 | A1* | 6/2018 | Lipner | G06T 11/00 |

\* cited by examiner

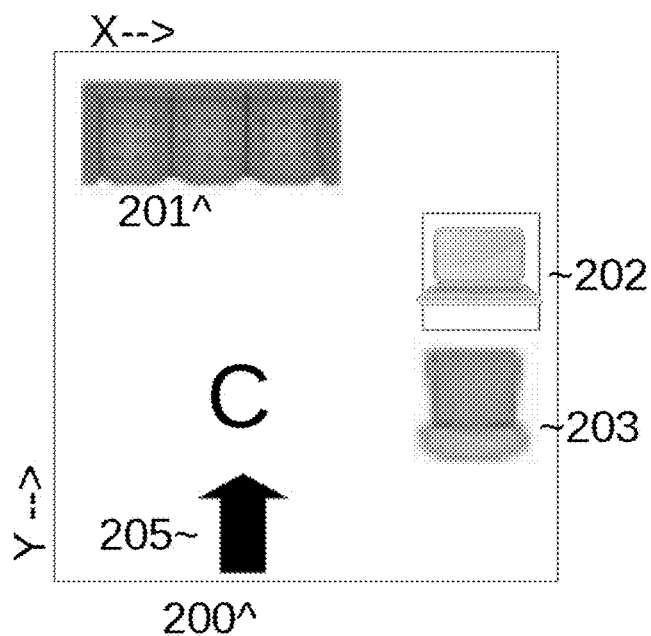
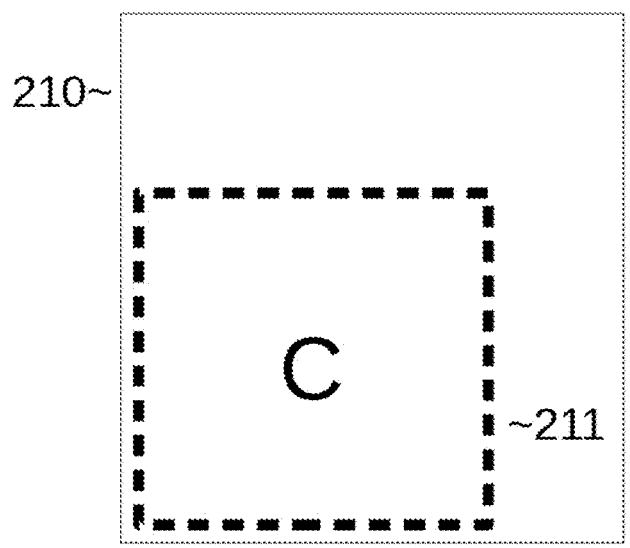
FIG. 2

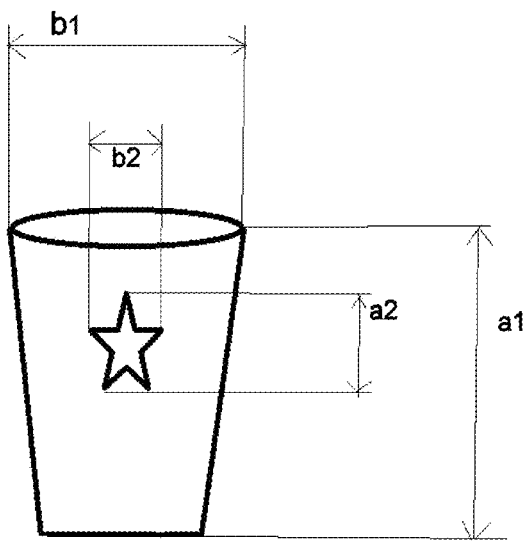
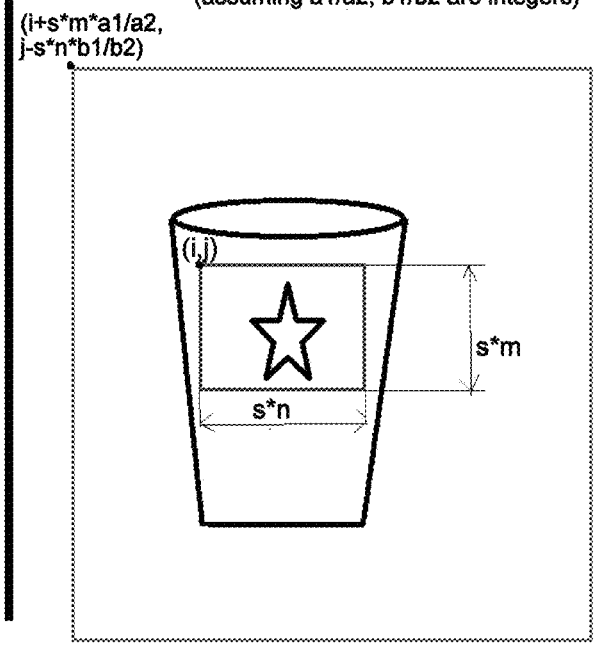
FIG. 12

Case 1: upright, from slightly above
(the 'width' crosses through the middle)
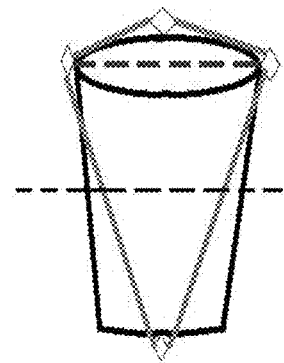
◇ = an extremity pixel
• ⋯ = width
⌇⌇⌇ = outer edge
      connections
⁃ ⋅ ⋅ = midsection
Case 2: tilted, from slightly above
(the 'width' is also an edge)
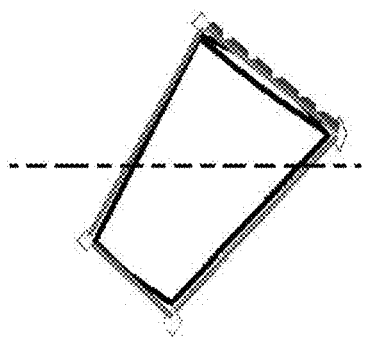
FIG. 13

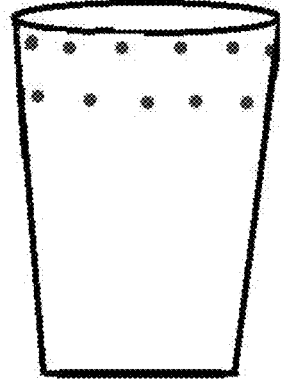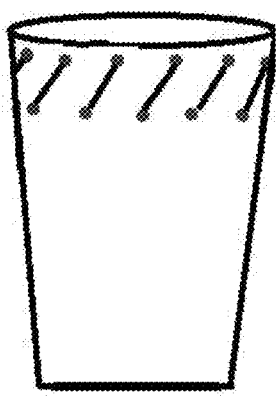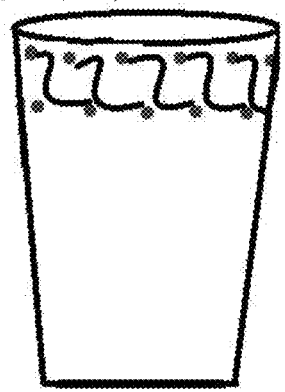
FIG. 17

A pair of cameras has computed the distances t1 and t2 to the top and bottom cup edges, with the angle between the points being the "cup angular height", estimated by $w=2*\arctan(2*h0/(t1+t2))$, where h0 is the actual height of the cup (same units t1 and t2). Using coordinate a and measurements w, t1, t2, the coordinates b and c can be computed.

VIRTUAL REALITY DETECTION AND PROJECTION SYSTEM FOR USE WITH A HEAD MOUNTED DISPLAY

CROSS REFERENCE TO RELATED APPLICATIONS

This application claims benefit to U.S. provisional application 62/431,820 filed on Dec. 8, 2016, which is incorporated by reference in its entirety for all purposes.

BACKGROUND OF THE INVENTION

Field of the Invention

The present general inventive concept is directed to a method, apparatus, and computer readable storage medium directed to implementing a virtual reality detection system.

Description of the Related Art

Virtual reality systems exist in which the player can remain in a stationary location or implement "room scale" virtual reality. The latter is where the player physically walks around a room while seeing corresponding motion in the virtual world using his/her virtual reality headset.

Tracking objects using convolutional networks is known and is an active area of research. For example, see Bertinetto et al., "Fully-Convolutional Siamese Networks for Object Tracking." See also Huang et al., "Object Boundary Guided Semantic Segmentation."

SUMMARY OF THE INVENTION

It is an aspect of the present invention to provide an improved virtual reality system.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which:

FIG. 2 illustrates a physical room used by the player and a virtual representation of the room, according to an embodiment;

FIG. 12 is a drawing showing the cup and a cropped image, according to an embodiment;

FIG. 13 is a drawing of different cases of the cup, according to an embodiment;

FIG. 17 is a drawing illustrating different points/patterns on cups, according to an embodiment;

DESCRIPTION OF THE PREFERRED EMBODIMENTS

Figure 1:
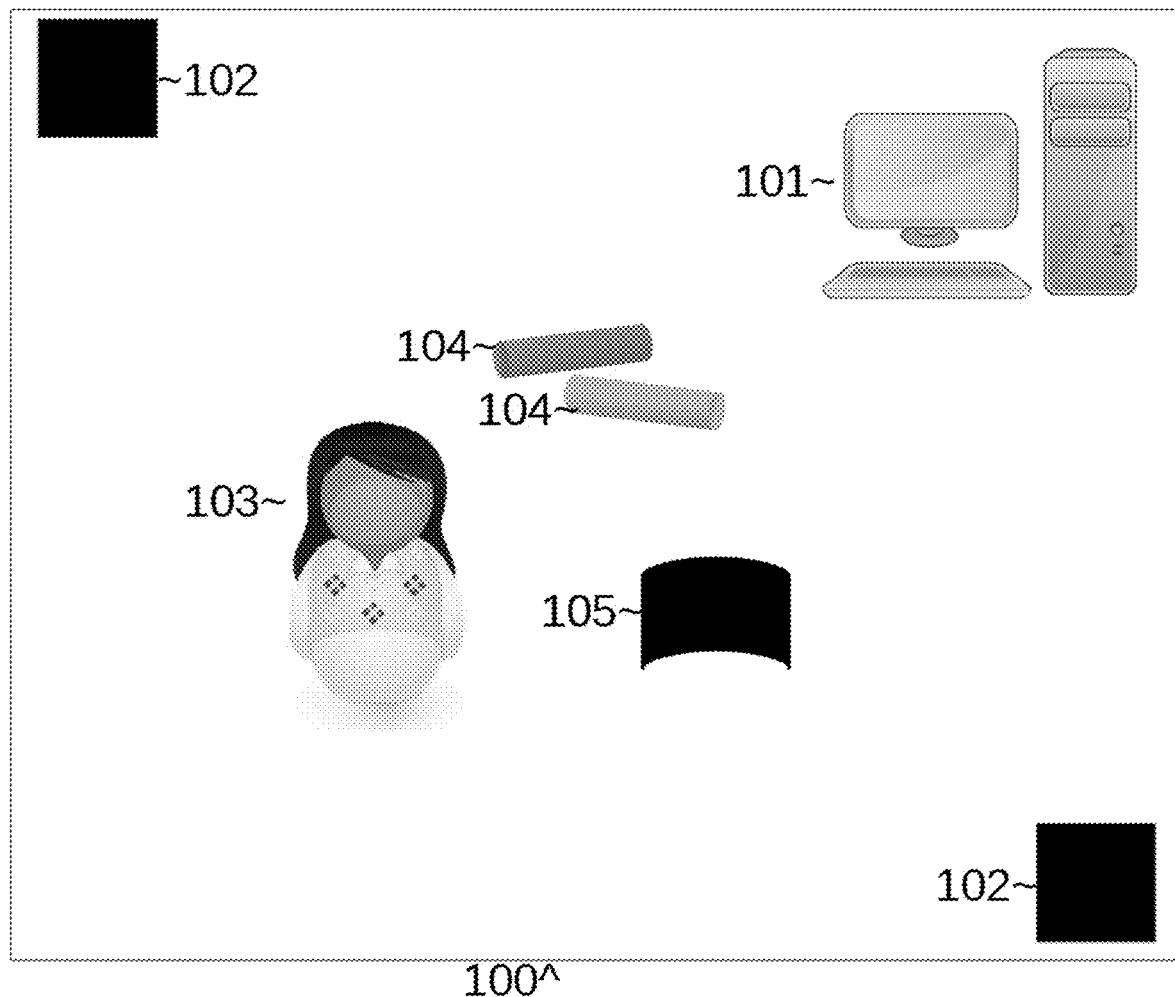
FIG. 1 shows a basic physical virtual reality room, according to an embodiment.

Reference will now be made in detail to the presently preferred embodiments of the invention, examples of which are illustrated in the accompanying drawings, wherein like reference numerals refer to like elements throughout.

The present inventive concept relates to a room scale virtual reality system which enables a player to walk through a large (in theory infinite) virtual world (VW) while confined to a single physical real world (RW) room (also referred to as physical room). In a virtual world (virtual reality), the player is wearing a headset which entirely (or predominantly) covers the players field of view in the real world and is presented with an entirely artificial (computer generated) 3-D world which replaces the real world (so the player cannot typically see anything from the real world in front of him unless these are generated into the virtual world). In addition to virtual reality, the methods described herein can also be applied to augmented reality, in which the player can see the real world (either through an electronic output device in a headset captured by a camera) or by enabling the player to view the real world through a lens which can generate computer generated images on top of this lens (thus the player's view of the real world is "augmented"). Virtual reality systems are described in US patent publications 2016/0140930 and 2015/0116316, both of which are incorporated by reference herein in their entireties.

FIG. 1 shows a basic physical virtual reality room 100, with a human player 103, two controllers 104 (which can be tracked both by position and orientation), a virtual reality headset 105 which the player wears over his/her head and eyes and is also tracked by position and orientation. The position and orientation of the headset 105 and controllers 104 is computed (as described herein) and transmitted (using cables or wirelessly) to the computer 101 (and more specifically a game software running on the computer). The game software has an interface with positional detectors 102 (see also 308), which detect the headset 105 (and hence the player) and the controllers 104 thus allowing the game software (or other module in communication with the game software) to computer the physical location and orientation of the headset 105 (and hence the player) and the controllers anywhere in the room 100. The physical location means in 3-D space (x, y, z) coordinates (although detecting the height can be optional) and orientation means the exact way the object is facing (with no degrees of freedom so we know where each face of the object is facing).

In the physical room, the game system can identify walls. This can be done using detectors (e.g., positional detectors or other equipment such as cameras) to identify where the walls are in order to implement methods described herein to prevent the player from hitting the wall and interrupting the virtual reality experience.

In another embodiment, the player can initialize the game system by identifying to the game system where the boundaries of the area the player wishes to be confined to ("play area") when playing a room scale virtual reality experience (game). "Wall" as used herein to describe a wall in the physical room can also include the player defined boundaries which will basically serve as "walls" inasmuch as the player should be confined to within these boundaries. FIG. 2 illustrates a physical room 200 used by the player and a virtual representation 210 of the room which can be displayed on the player's computer screen 202. In the physical room 200 there is a couch 201, chair 203, and table with a computer on it 202. Of course, when the player is playing the room scale virtual reality experience, the player does not want to run into these physical objects and thus can draw the boundary 211 to avoid any physical objects therein. The player should typically move any physical objects (e.g., furniture) located inside the boundary 211 to outside of the boundary 211 so that the player can walk freely inside the boundary without fear of walking into anything (e.g., the area inside the boundary should be obstruction free). The player can set the boundary in numerous ways, for example the player can use controller (the location of which is tracked by the virtual reality system) and walk around the boundary so that the game system records the boundary. Note that while the boundary in FIG. 2 is drawn to be square, the boundary 211 is not required to be a square and can be any shape. Thus, the boundary 211 can also be considered "walls" as used herein and the methods described herein can be applied such that the boundary can serve as walls. Note that two real physical walls (the bottom and the left) are adjacent (or can be coincident) to the boundary while the other two sides of the boundary do not border a wall.

The area of the physical room in which the player can walk around in is important because while the player is limited to ambulating in this area, embodiments of the present invention describe how given this finite area the player can nevertheless experience a seemingly infinite virtual world.

Figure 3:
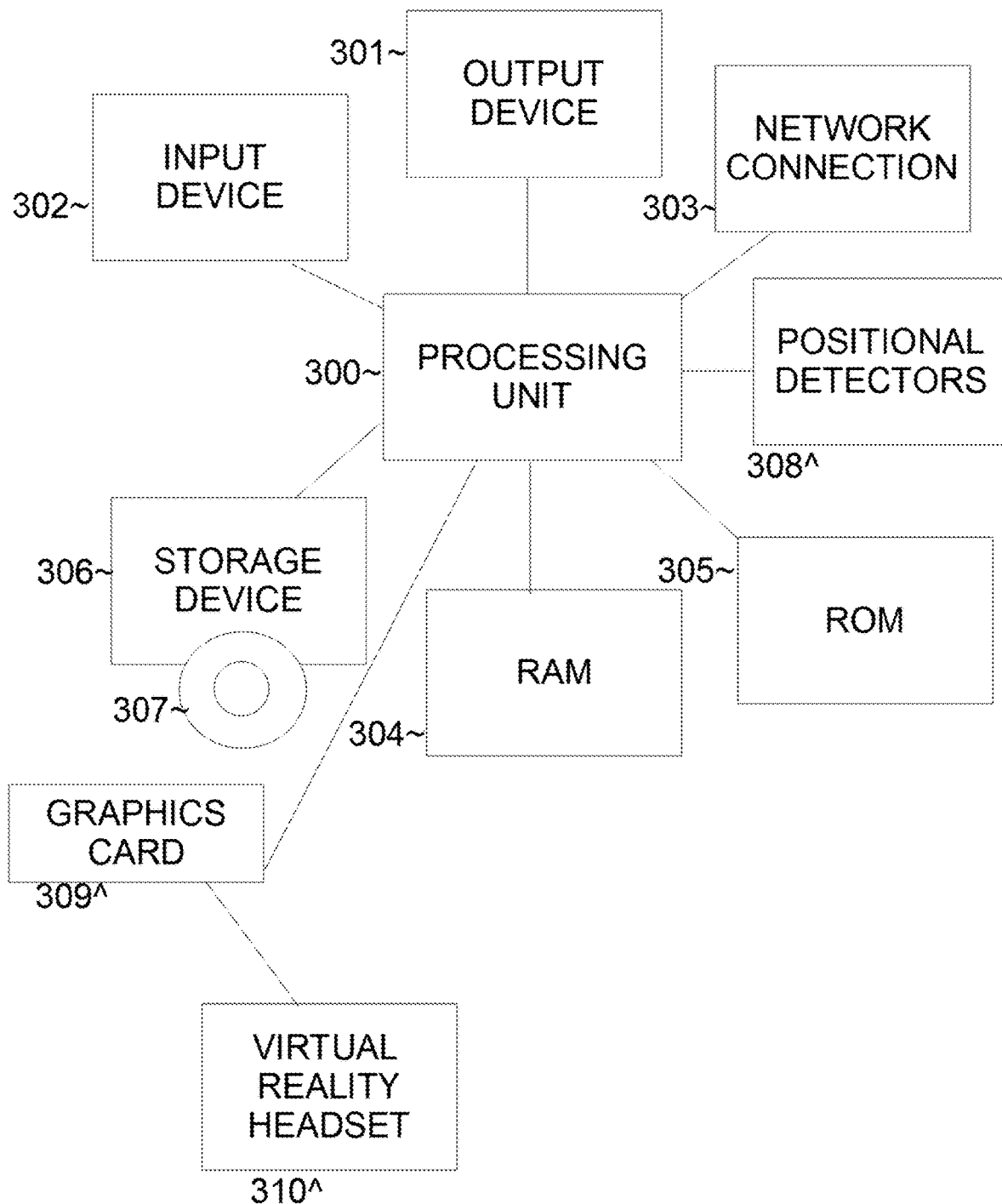
FIG. 3 is a drawing illustrating one example of hardware that can be used to implement all described features, according to an embodiment.

The system described herein can be implemented on a virtual reality system. FIG. 3 is a drawing illustrating one example of hardware that can be used to implement all described features, according to an embodiment.

The system can comprise a processing unit 300 (such as a microprocessor and any associated components such as cache, bus, etc.) which is connected to an output device 301 (such as an LCD monitor, touch screen, CRT, etc.) which is used to display to the player any aspect of the game (e.g., any state, operation, value, animation, etc.), and an input device 302 (e.g., buttons, joystick, a touch screen, a keyboard, mouse, etc.) which can be used to input any decision made by the player (note that there can be more than one input device 302). All methods/features described herein can be performed by the processing unit 300 by loading and executing respective instructions which are stored on a computer readable storage medium (e.g., computer memory, RAM, ROM, disc, etc.). Multiple such processing units can also work in collaboration with each other (in a same or different physical location). The processing unit 300 can also be connected to a network connection 3803, which can connect the electronic gaming device to a computer communications network such as the Internet, a LAN, WAN, etc. The processing unit 300 is also connected to a RAM 304 and a ROM 305. The processing unit 300 is also connected to a storage device 306 which can be a disk drive, DVD-drive, CD-ROM drive, flash memory, solid state drive, etc. A non-transitory computer readable storage medium 307 (e.g., hard disk, CD-ROM, etc.), can store a program which can control the electronic device to perform any of the methods described herein and can be read by the storage device 306.

While one processing unit is shown, it can be appreciated that one or more such processors or processing units can work together (either in a same physical location or in different locations) to combine to implement any of the methods described herein. Programs and/or data required to implement any of the methods/features described herein can all be stored on any non-transitory computer readable storage medium (volatile or non-volatile, such as CD-ROM, RAM, ROM, EPROM, microprocessor cache, etc.) All values described herein can be processed, stored, displayed, transmitted, etc., using the processing unit 300 and/or any other structure described herein. Note that while components illustrated FIG. 3 can be considered "connected" to each other, it can be appreciated that the connection may be a direct connection or an indirect connection through one or more components. For example, the processing unit may not necessarily be directly connected to the input device (e.g., a keyboard) but is instead connected to an input/output port which is then connected to the keyboard.

The processing unit 300 can also be connected to a graphics card 309 (also known as a video card, video adapter, etc.) such as the NVIDIA GTX 980 or the AMD Radeon R9 370 which processes video information fed from the processing unit 3800 and outputs a display signal to a virtual reality headset 310 (e.g., using an HDMI cable or other connection which can transmit high definition video). The virtual reality headset 310 fits over the player's head/eyes and displays the images generated by the graphics card 309 so the player feels immersed in the virtual world. The virtual reality headset 310 can also include headphones/earbuds (the audio signal can be transmitted from the graphics card via the same HDMI cable or a different connection). Note that the feed to the virtual reality headset 310 (audio, video, and any other signal) can also be transmitted wirelessly thus not utilizing any physical cables and allowing the player to roam free in the physical room. The virtual reality headset can either have one output device (e.g., screen) and two lenses which separate the output device so each eye of the player sees a different image (e.g., a left eye image and a right eye image), or alternatively the headset can have two separate output devices behind two separate lenses so each eye sees its own image. The images transmitted to the headset are updated continuously so that the player can see anything, e.g., still images, movies, etc., typically in three dimensions.

The virtual reality headset 310 can optionally comprise a gyroscope, an accelerometer and a magnetometer in order to measure the orientation of the player's head (which way he/she is looking) and/or its position (determined by detecting relative movement from a reference point). The headset 310 can also have infrared LEDs and/or photosensors embedded on its surface which can be detected by the detector(s) 308 in order to locate where the player is in the physical room (the location) and also the orientation of the headset. Controllers can also have infrared LEDs and/or photosensors so their position and orientation can be tracked as well (and their positions and orientation transmitted to the game system as well so this data can be utilized during game play).

At least one positional detector 308 is connected to the processing unit 300 and can detect locations and orientations of objects in the physical room such as the virtual reality headset 310, controllers, and other game objects, and transmit these locations and orientations to the processing unit 300.

In an embodiment, the at least one positional detector 308 can really be a pair of "lighthouse stations" which can transmit invisible infrared light signals. An omnidirectional flash can be transmitted to synchronize all of the devices that are to be detected. Then a horizontal infrared laser swipe and then a vertical infrared laser swipe are transmitted which "sweep" the room. Each device that can be located can detect these swipes via their photosensor, and then these devices can be located based on the times each swipe is detected to determine each photsensor's location. Different devices (e.g., the headset, controllers, etc.) would typically have multiple photosensors so that the device's orientation can also be computed. This location technology is implemented in the HTC VIVE virtual reality system and is known in the art.

In an embodiment the at least positional detector 3808 can be an infrared LED detector which detects the presence of the LEDs (each LED can be uniquely identified by a unique blinking pattern). Based on the position of the LEDs in the physical room (detected by the positional detector 3808), the location of the objects which embed the LEDs on them can be determined (and also the orientation as well). The headset can comprise a gyroscope and/or an accelerometer and/or a magnetometer which can be used to determine movement of the headset (and hence its position and orientation can be determined from a reference point). The positional tracker can also be used in conjunction with the devices in the headset to provide a reference point and correct errors from these measuring devices. This location technology is implemented in the OCULUS RIFT virtual reality system and is known in the art.

Using the positional detectors, the location of the headset (e.g., x, y, z coordinates) can be determined including the headset's orientation (which way the headset is pointing in all degrees of freedom). In addition, other objects such as controllers can also be located (location and orientation) using the same technology that are used to locate (and determine the orientation) of the headset, although the controllers would also require the same hardware (e.g., LEDs, gyroscope, photosensors, etc.) as the headset does which enables the system to locate (and determine the orientation of) the headset.

In another embodiment, the location (and orientation) of the headset can be tracked/determined via an "inside out" detection system. Such a system does not require any external sensors (or cameras) to locate the headset, but instead the tracking is done from inside the headset itself. Instead, cameras are located on the outside of the headset in which the images from the cameras are analyzed, and when combined with data from other sensors on/inside the headset itself (e.g., gyroscopic sensors, accelerometers, magnetometer sensors, etc. then the position and orientation of the headset can be determined.

It does not matter which tracking mechanism is used to track the headset. Ultimately, for a virtual reality system to operate, the position (location in the room which can be in coordinates) and orientation (which angles the headset is pointed at) is what is needed in order to compute what view is transmitted to the output device(s) inside the headset that the player is viewing.

Figure 4:
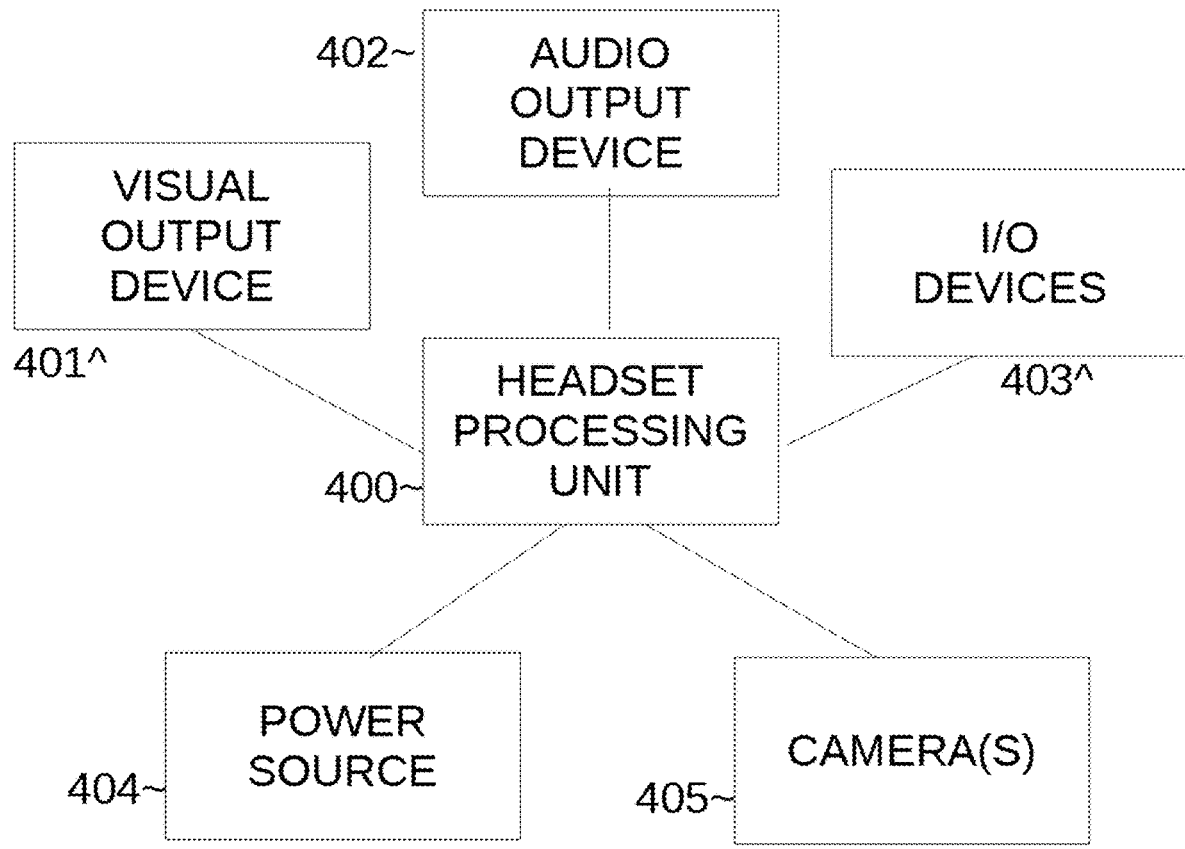
FIG. 4 is a block diagram illustrating one example of a virtual reality headset ("headset"), according to an embodiment.

FIG. 4 is a block diagram illustrating one example of a virtual reality headset ("headset").

A headset processing unit 400 can be a microprocessor and any associated structure. The headset processing unit 400 can be connected to a visual output device 401 (e.g., an HD or 4k LED (or OLED or other output technology) with lenses to direct each eye to its own display (either two separate displays, one for each eye, or one larger display which is portioned into two independent sections which each eye views only its respective section of the output device). The headset processing unit 400 can also be connected to an audio output device 402 such as headphones, speakers, etc. The processing unit 400 can also be connected to input/output devices 403 which allows the processing unit 400 to communicate with external devices and signals. For example, this can include a video/audio input (such as an HDMI cable), or a receiver to receive a wireless HDMI signal, etc. An external computer will typically drive the video and audio outputted on the headset and any type of I/O device(s) are included that can receive these signals and display the respective video and audio to the player. In another embodiment, all audio and video signals are generated internally on the headset itself (e.g., by the headset processing unit 400 or a different processing unit) and no external computer is needed. The headset processing unit 400 is also connected to a power source 404, such as a battery (disposable or rechargeable) or a power cable. The headset processing unit 400 can also be connected to optional camera(s) 405. Two such cameras can be located on the outside of the headset in the same position as each of the player's eyes would be so that the images they capture would be from the same viewpoint as each of the player's eyes. Or a single camera can be places on the outside of the headset between where the player's eyes would be.

Figure 5:
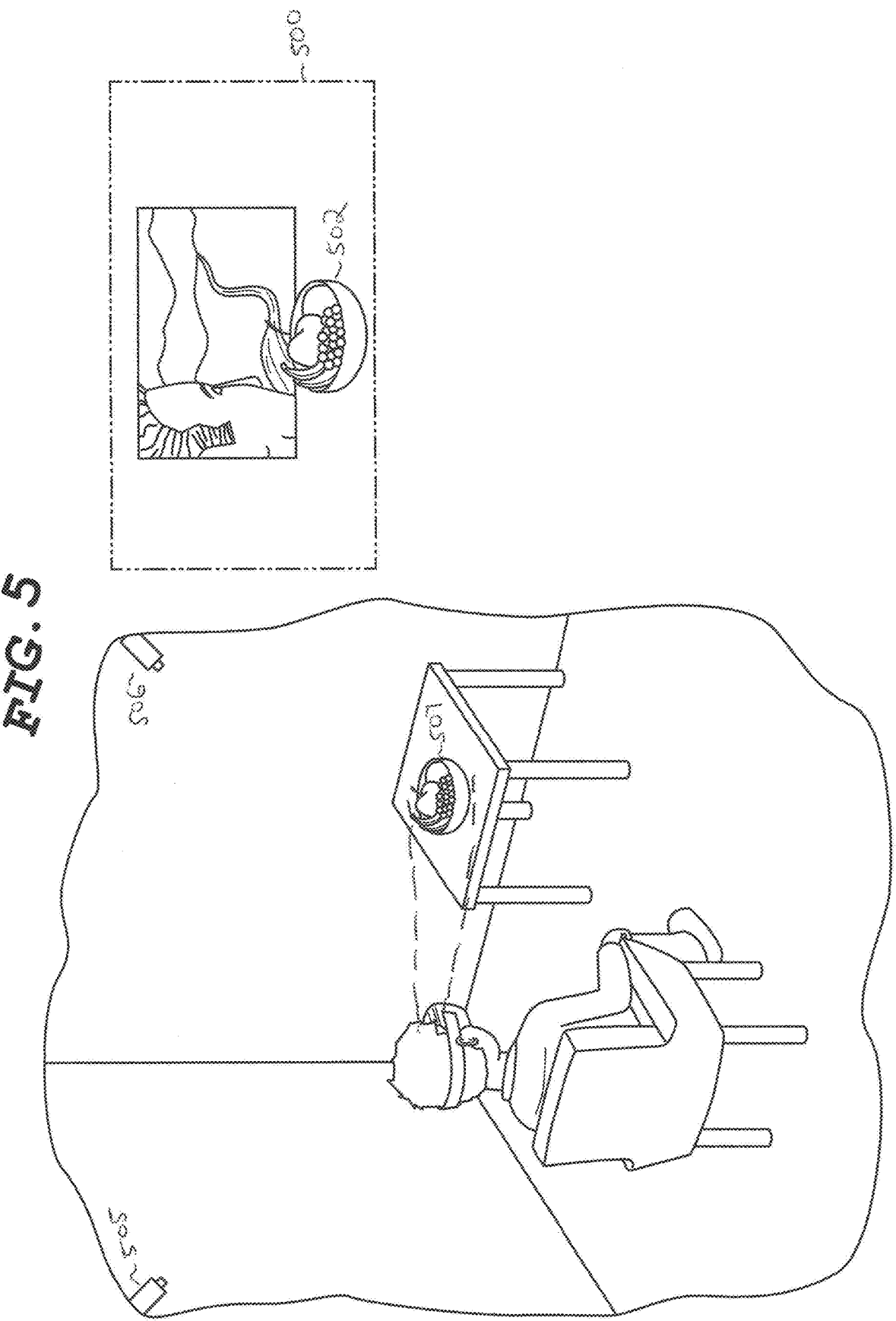
FIG. 5 is a drawing illustrating an embodiment translating live video of physical real world objects into the virtual reality images, according to an embodiment.

FIG. 5 is a drawing illustrating an embodiment translating live video of physical real world objects into the virtual reality images, according to an embodiment. This embodiment can correspond to the method illustrated in FIG. 7A.

A player is wearing a VR headset which has one or two cameras on the front of it capturing images (video) in the direction that the player is facing. The video is transmitted to a processing unit or alternatively the processing of the video can be done on the headset itself. Relevant objects in the video (in this example the plate with food on it) are identified and extracted from the video. If there are two cameras on the headset then two images are analyzed with the relevant object(s) extracted. The virtual reality view is generated, in this example the player is watching a movie through his/her virtual reality headset. The extracted video (the plate with the food on it) is placed into the virtual reality view in the same position relative to the player. For example, if the plate is in front of the player, then in the virtual reality view the plate would appear in front of the player. This is live video of the plate and its contents so as the contents of the plate changes (e.g., food is eaten) the player would see the contents of the plate in real time. In this manner, the player can eat food off of the plate while watching the movie (or doing anything else in the virtual reality space), the plate (and its contents) positioned in the virtual world in the same relative position to where the real physical plate is so that the player can reach to where he sees the plate in the virtual world and take food off of it. In the virtual world, the player is actually seeing video taken of the physical plate (and its contents), although the video can be processed to improve its display in the virtual world.

Figure 8:
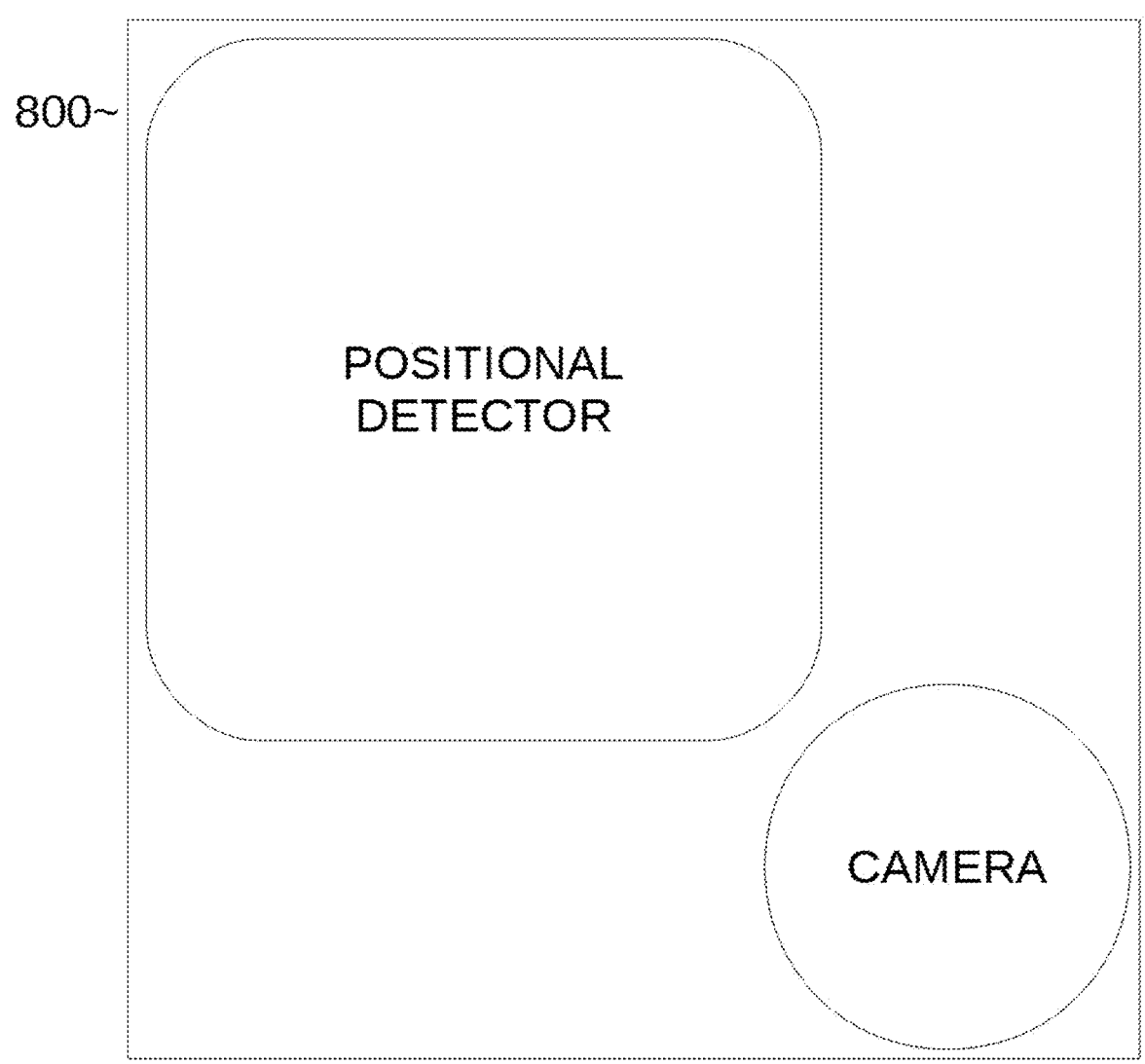
FIG. 8 is a drawing of a positional detector and a camera merged (housed) as one unit, according to an embodiment.

Cameras 505, 506 can be regular cameras or combined cameras/positional detectors as illustrated in FIG. 8. A real bowl of food 507 is the relevant object and are digitized by one or more cameras located on the headset itself. Note that the real bowl of food 507 is directly in front of the player. A player's virtual reality view 500 (what the player sees through his/her virtual reality headset) shows the player watching a movie (e.g., using a movie playing app). In front of the "screen" that the player sees is a live video image of the bowl of food 502 which is a live image of the real bowl of food 507. The relative position of the real bowl of food 507 in the real world to the player is the same as the relative position of the video image of the bowl of food 502 in the virtual reality view 500 (virtual world) to the player so (while the player is wearing the headset and is immersed in the virtual reality view 500) the player can reach out and grab something out of the real bowl of food 507 just as he/she would in real life (if the player was sitting in the same chair without the headset on). As the player takes out a piece of food from the real bowl of food 507, the video image of the bowl of food 502 would be adjusted accordingly since it is really a live image of the real bowl of food 507. For example (while wearing the headset), if the player reaches over and takes the apple (in the real world) out of the real bowl of food 507, the player would see an apple being removed (and then absent from) the video image of the bowl of food 502. In this way, the player can enjoy watching the movie using the movie app in the virtual reality world and enjoy eating his food without having to remove his/her headset to see where the bowl is.

Figure 6:
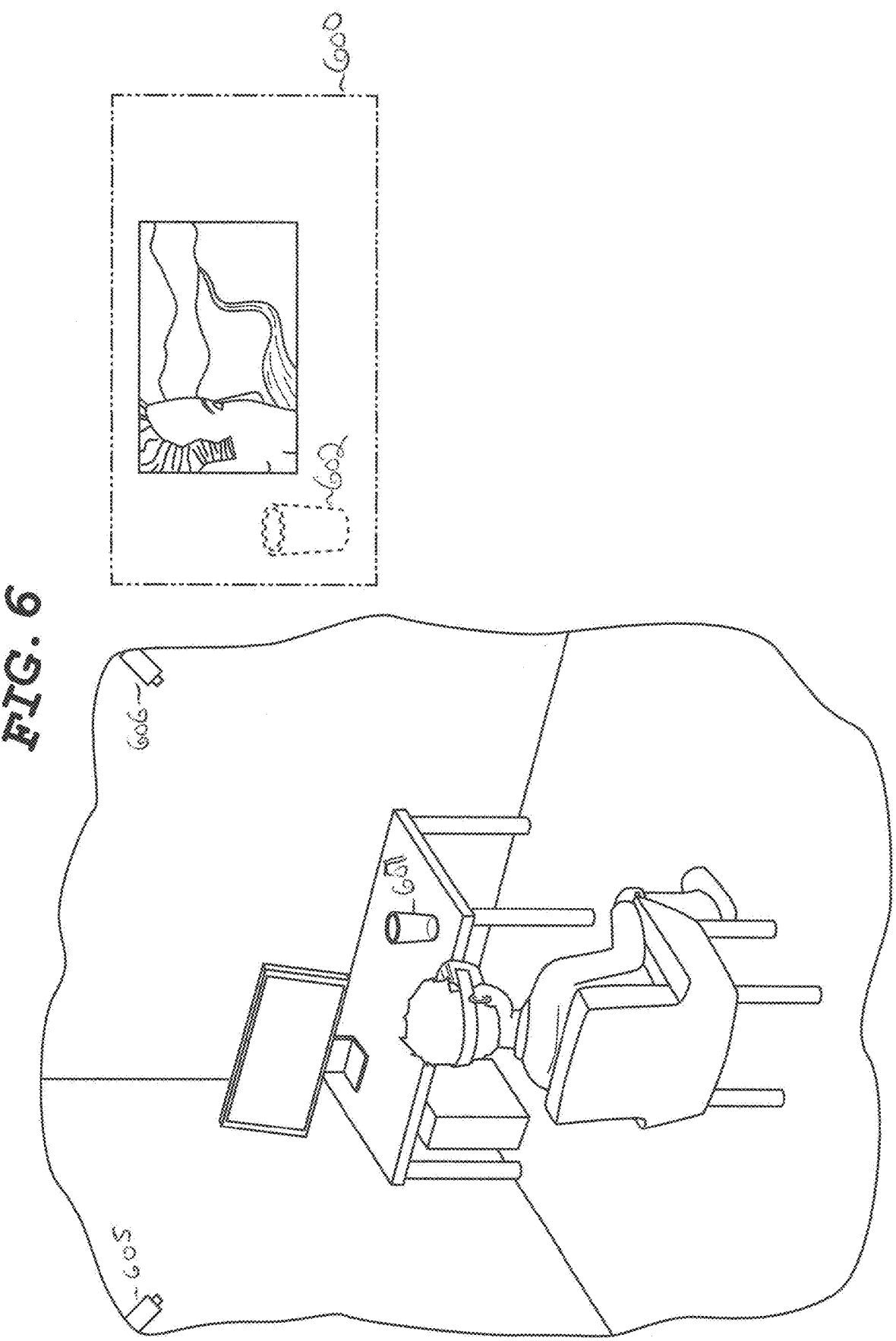
FIG. 6 is a drawing illustrating an embodiment merging computer generated images corresponding to physical real world objects into the virtual reality images, according to an embodiment.

FIG. 6 is a drawing illustrating an embodiment merging computer generated images corresponding to physical real world objects into the virtual reality images, according to an embodiment. This embodiment can correspond to the method illustrated in FIG. 7B.

In this embodiment, one or more cameras (either fixed to the room and/or located on the headset) take images which are processed to identify a relevant physical object (in this example a cup) and can determine its location in the room. The relevant physical object does not need to have special hardware that the headset or locatable controllers would have in order to be located but instead can be located in the room by the visual appearance of the relevant physical object. The relevant physical object can appear in the virtual world to the player in the same relative location as the relevant physical object is located in the real world. For example, in FIG. 6, the cup is located to the player's left. In the virtual world, the player is watching a movie and a computer generated (drawn) cup (not a real live image of the cup as in FIG. 5) is shown in the virtual world to the player's left. Thus, the player can reach out and grab the cup in the virtual world and the player would grab the real world cup (the relevant physical object). This is because the position of the cup is determined and translated into where it should appear in the virtual world and then drawn (e.g., using a 3-D model of a cup) in the proper position and orientation. In this case, the player wearing a virtual reality headset and enjoying a virtual reality application does not have to remove his headset in order to take a drink from a cup (or interact with another relevant physical object) because the player can "see" the relevant physical object in the same relevant location to the player as the relevant physical object is to the player in the real physical world. The player can thus take a sip from his cup (reaching out to it where the player sees it in the virtual world), put the cup back down in the real physical world, while viewing a virtual version of the cup in the virtual world. In other words, the virtual version of the cup appears to the player in the virtual world in the same location and orientation as it would if the player was not wearing the virtual reality headset.

Cameras 605, 606 can be regular cameras or combined cameras/positional detectors as illustrated in FIG. 8. A real cup 607 is on a table to the left of the player (wearing a headset and immersed in the virtual reality view 600). The camera(s) 505, 506 can detect the real cup 607 and determine is location in the room and its orientation (as described herein). In the virtual reality view 600, a virtual cup 602 is shown in the same relative position to the player as is the same relative position that the real cup 607 is to the player. In other words, while wearing the headset, if the player were to reach out and grab the virtual cup 602 where he sees it the player would be grabbing the real cup 607 because the virtual cup 602 is displayed in the same relative position to the player as is the real cup 607. The virtual cup 602 is not a video of the relevant object (e.g., the cup) as in FIG. 5, but a computer generated image of a cup inserted into the virtual world. The virtual cup 602 can be shown as a solid cup or in broken lines (an outline) to show the player where the cup is without distracting the player too much. Note that the orientation of virtual cup 602 would be the same orientation (in all degrees of freedom) as the real cup 607, for example if the real cup 607 was on its side, then the virtual cup 602 would also be shown on its side.

Note that in an embodiment, objects (e.g., a cup, computer mouse, keyboard, etc.) can be identified (and located) based on its physical shape. In another embodiment, objects can be identified (and located) based on a pattern (or logo) that is present on the object. For example, a cup can come pre-printed with a particular pattern on it (as described herein) which enables tie cup to be identified by the system, located (e.g., where in the physical room it is located) and ascertain its orientation. Instead of objects being pre-printed with a pattern, such patterns can also be affixed to objects via stickers. For example, a sticker with a particular pattern can be placed (by a player or other person) onto a cup (e.g., peeled off a backing and stuck to the cup via adhesive on the sticker), thereby transforming any ordinary cup into a locatable cup using the methods described herein (because the predetermined pattern will be on the face of the sticker). The sticker can wrap around the entire object, for example a sticker can be long enough to wrap entirely around a circumference of a cup. Alternatively, more than one sticker can be placed around a cup to cover the entire circumference of the cup (for example two stickers can be placed end to end around the cup so that they combine to wrap around the entire circumference of the cup).

Figure 9:
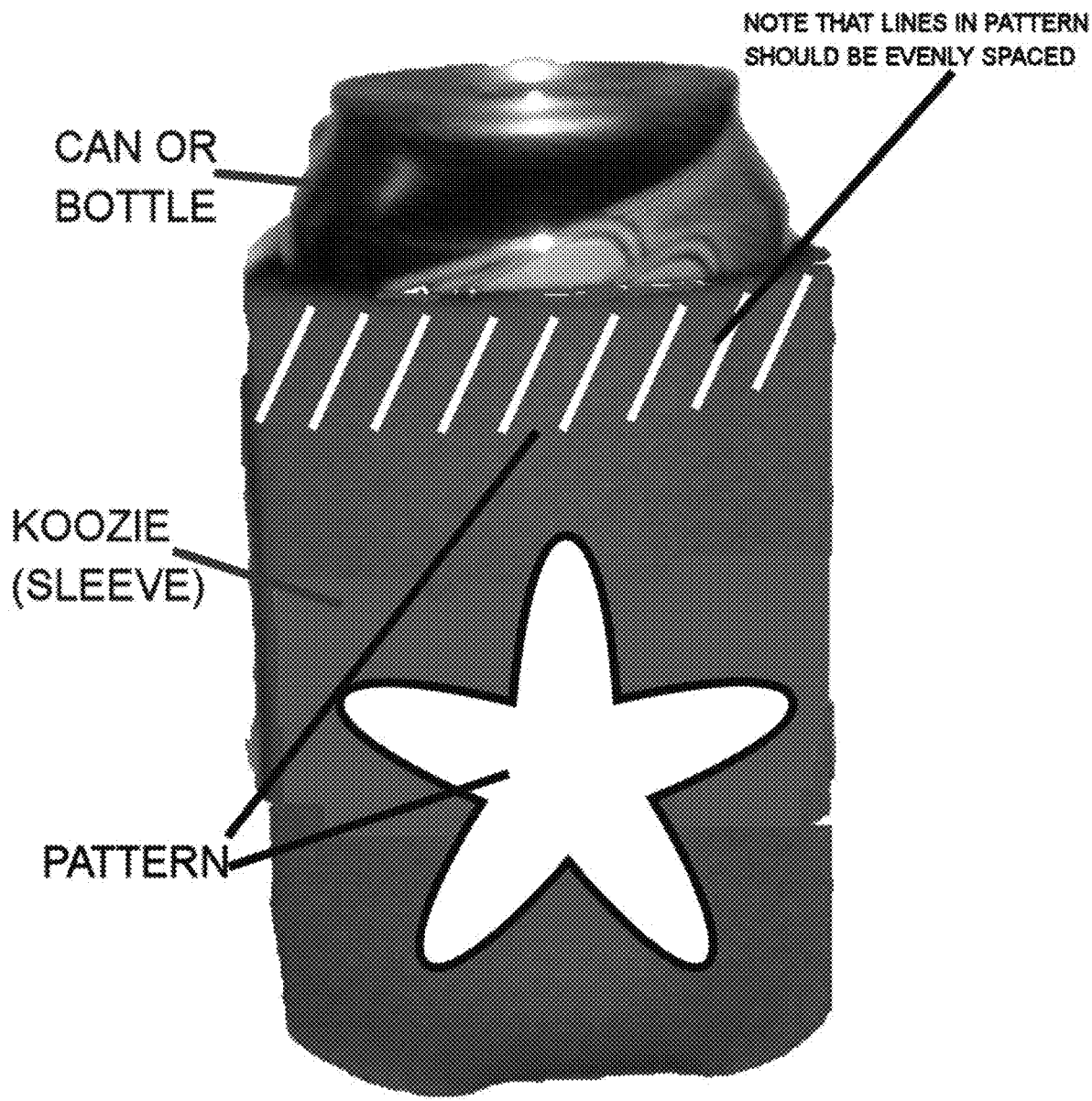
FIG. 9 is a drawing showing a soda can inserted inside a koozie (sleeve) which already has a predefined pattern pre-printed on it, according to an embodiment.

The pattern can also be printed on a sleeve that an object fits into. For example, a cup can fit inside a sleeve (e.g., a "koozie") which has the pattern/logo printed on its outside so that the koozie can be located (and processed) using the methods described herein. Thus, a cup (or a bottle, etc.) can be placed inside a koozie which enables the koozie (and hence the object inside) to be processed as described herein so that the player can drink out of the koozie while wearing the virtual reality headset and viewing the virtual world. See FIG. 9 which shows a soda can inserted inside a koozie (sleeve) which already has a predefined pattern pre-printed on it (known to the system so the koozie can be located as described herein). In this manner, the can can be located (position and orientation) using the methods herein. The same method can be used for other containers besides cans, e.g., bottles, cups, etc. Of course, the can can be removed from the koozie so that a new can can be inserted inside it (in other words the koozie is reusable). As an alternative to a sticker or a koozie, a bracelet with the pattern on it can be attached to an object (such as a cup) which enables the system to locate the object.

Figures 7A, 7B:
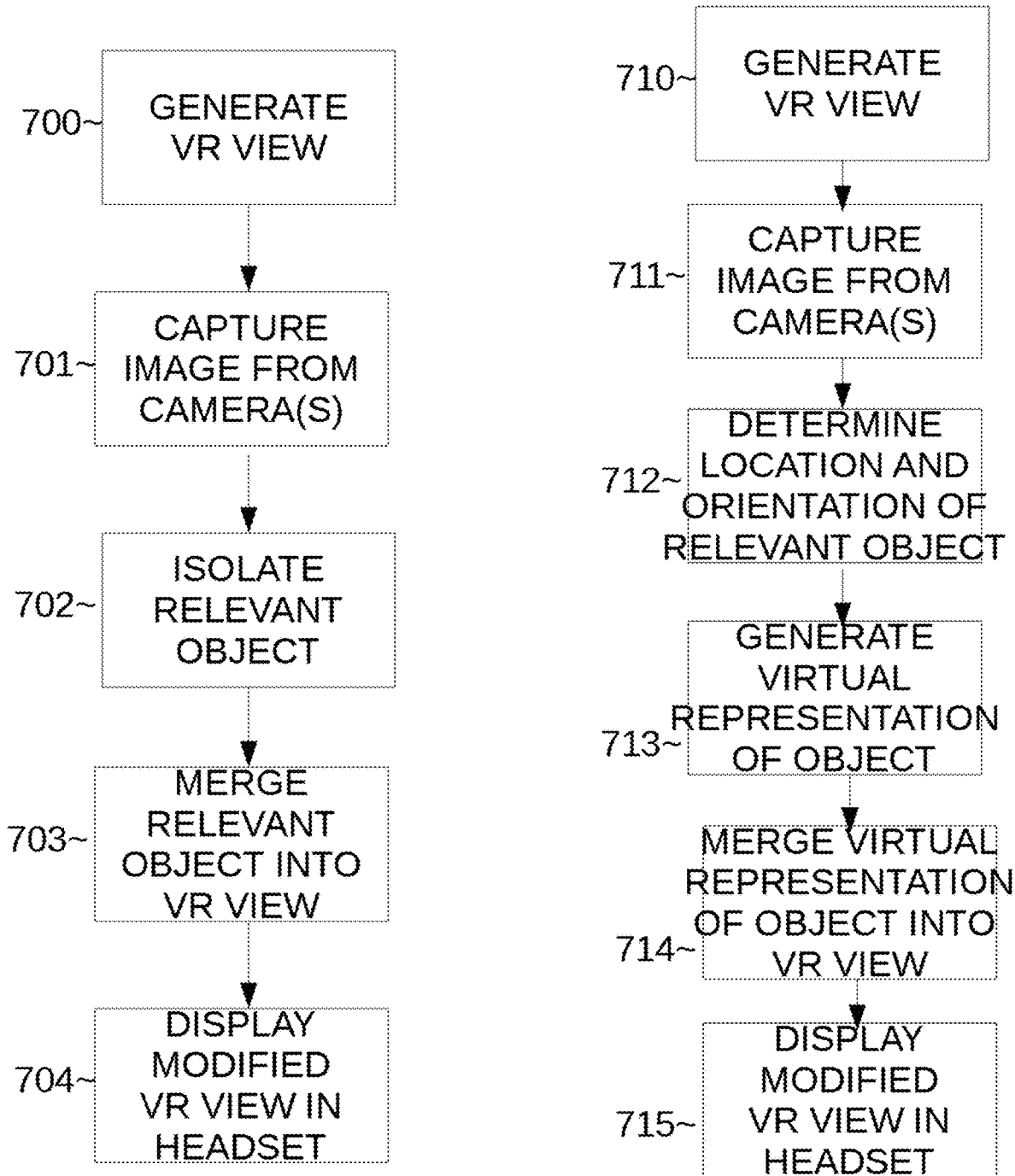
FIG. 7A is a flowchart illustrating an exemplary method of translating live video of physical real world objects into the virtual reality images, according to an embodiment.
FIG. 7B is a flowchart illustrating merging computer generated images corresponding to physical real world objects into the virtual reality images, according to an embodiment.

FIG. 7A is a flowchart illustrating an exemplary method of translating live video of physical real world objects into the virtual reality images, according to an embodiment. This can correspond (although is not limited to) the Example illustrated in FIG. 5. FIG. 7A is a high level flowchart, the details of how to implement each step is found throughout this application.

In operation 700, a virtual reality view is generated. This operation can alternatively be done at other times during this method. The virtual reality view is generated as known in the art. A unique image is generated for each eye based on a virtual world which is "projected" into the image for each eye so it can be displayed to the player/use (in operation 704).

In operation 701, an image (or a video which is a series of images) is captured from a video camera. The video camera can be a standard color video camera and can typically be mounted on the front of the headset. Two such cameras can be mounted in the front of the headset, spaced apart from each other in the manner that a human's eyes are spaced apart, in order to have two images to generate a stereoscopic effect (a second offset image can also be generated from a single image if there is only one camera on the headset mathematically). This embodiment does not require the camera to be mounted on the headset and a camera can be used that is fixed mounted (e.g., mounted to a wall or floor, etc.)

From operation 701, the method proceeds to operation 702, which isolates the images of the relevant object from the entire image/video from operation 701. This can be done as described herein.

From operation 702, the method proceeds to operation 703, which merges the isolated images of the relevant object (from operation 702) into the virtual reality view (VR world). This can be done as described herein.

From operation 703, the method proceeds to operation 704, which displays the modified virtual reality view (from operation 703) on the virtual reality headset so that the player sees a video of the relevant object in its "real" position relative to the player, so that the player can reach out and interact with the relevant object since the player knows where it is. In other words, where the player "sees" the relevant object through the headset is the same position relative to the player that the relevant object is in real life so the player can physically reach and pick up the relevant object he/she sees through the headset and really pick up the relevant object.

FIG. 7B is a flowchart illustrating merging computer generated images corresponding to physical real world objects into the virtual reality images, according to an embodiment. This can correspond (although is not limited to) the Example illustrated in FIG. 6. FIG. 7B is a high level flowchart, the details of how to implement each step is found throughout this application.

In operation 710, a virtual reality view is generated (as in operation 700, see operation 700).

In operation 711, images are captured from the camera(s) on the headset itself. The headset would typically have 1-2 cameras (although it can have more).

From operation 711, the method proceeds to operation 712, which determines the location and orientation of the relevant object. The relevant object is any object that is intended to be located and displayed inside the virtual reality view (e.g., computer mouse, cup, plate, keyboard, etc.) This can be done as described herein.

From operation 712, the method proceeds to operation 713, which generates a virtual representation of the object.

This can be done from a pre-stored 3-D model corresponding to the relevant object. For example, if the relevant object is a cup, then a 3-D model of a cup can be retrieved. The 3-D model would be scaled and rotated in order to match the size and orientation of the relevant object. This is a computer generated image/model and not a video of the relevant object as in FIG. 7A.

From operation 713, the method proceeds to operation 714, which merges the virtual representation of the relevant object into the virtual reality view (generated in operation 710). Basically, the 3-D model resulting from operation 713 is inserted into the virtual reality world (by merging the 3-D model into the 3-D map of the virtual world).

From operation 714, the method proceeds to operation 715 which displays the modified virtual reality view (from operation 714) to the player through the headset the player is wearing. Thus, the player sees the computer generated image of the relevant object in its "real" position relative to the player, so that the player can reach out and interact with the relevant object since the player knows where it is. In other words, where the player "sees" the relevant object through the headset is the same position (and orientation) relative to the player that the relevant object is in real life so the player can physically reach and pick up the relevant object he/she sees through the headset and really pick up the relevant object.

FIG. 8 is a drawing of a positional detector and a camera merged (housed) as one unit. Thus, by mounting one unit 800, the functions of both the positional detector and the camera can be accomplished. Both the positional detector and the camera can utilize the same power supply and some wireless (e.g. Wi-Fi) connection to transmit their respective data to a computer implementing the virtual reality system. A plurality of combined units 800 can be mounted throughout a room intended to be used for virtual reality. The camera can be utilized for any of the purposes described herein (e.g., take live video of objects in the room), and the positional detector can be utilized for any of the purposes herein (e.g., locate objects that have the respective hardware enabling them to be located by the positional detector).

Figure 10:
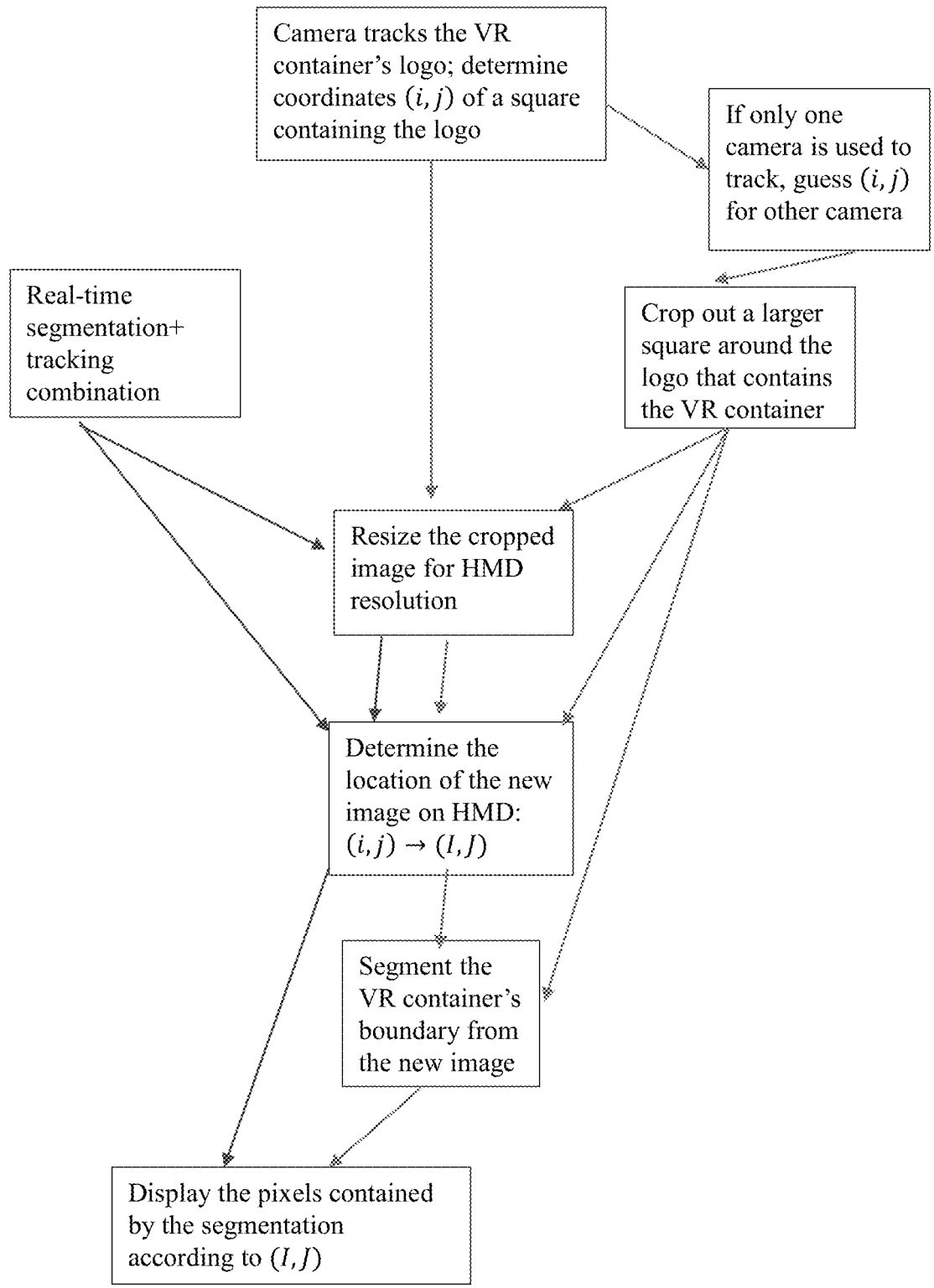
FIG. 10 is a flowchart illustrating methods of identifying a real world object and displaying a video of the real world object inside the virtual world, according to an embodiment.

FIG. 10 is a flowchart illustrating methods of identifying a real world object and displaying a video of the real world object inside the virtual world, according to an embodiment;

The following procedures assumes that there is a dual-lens camera attached to the VR system's head mounted display (HMD). In order for it to perfectly avoid the stereoscopic effect, one camera lens must be positioned directly in front of each of the user's eyes. In case there is a camera for each eye, but not exactly in front of the user's eyes, a digital displacement can be applied, but the angle will always be wrong. The camera resolution does not need to be exactly the same as the HMD screen, but it would reduce the following procedure's complexity if that was the case.

The following procedures do not necessarily need to be repeated for both cameras. For example, tracking may be solely based on the right-eye camera, and the apparent position with respect to the left-eye camera may be inferred from those results.

Recognition and tracking—Defining the target-described is a procedure for recognizing and tracking the VR container based on the paper Fully Convolutional Siamese Networks for Object Tracking. This approach was shown to track complex objects (human bodies, dogs, etc.) at 86 frames per second (fps). Fully convolutional neural networks are becoming commonplace in object tracking. It is a discriminative machine learning algorithm, meaning it requires a "training" phase during which the algorithm "learns" about a target using human-annotated video data. It is possible to train the algorithm to recognize the VR container itself (i.e. a cup, tray, etc.), but we recommend learning a pattern or logo, which could then be used on a variety of containers. Furthermore, a variety of logos could be learned and used to pass on customized information to the system.

Figure 11:
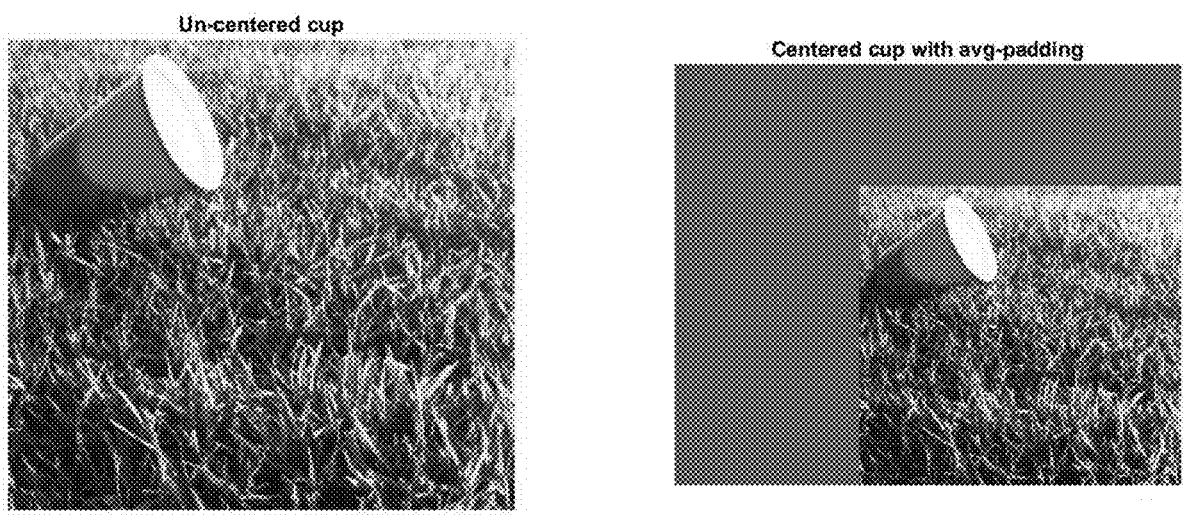
FIG. 11 shows images of an un-centered cup and a centered cup with average padding, according to an embodiment.

FIG. 11 shows images of an un-centered cup and a centered cup with average padding.

Similarity Learning (training phase)—The training process amounts to solving an optimization problem that determines the weights of a convolutional neural network; the weights only have to be learned once. The input to the training algorithm is a series of image pairs taken from video(s) of the logo, where each video has labeled target trajectories. Training pairs should include videos of the target moving up/down, closer/further, and left/right of the camera, as well as forward/backward and left/right tilts (and as well as combinations of these degrees of freedom). If desired, make training videos of the logo on various surfaces (cups, buckets, trays, a piece of paper, etc.). Pairs can also be resized and reused to simulate fluctuations in the size of the target. The output of the training phase is an array of weights, w, which are computed as follows.

Conceptually, we are learning a function $f(z, x; w)$ that compares an exemplar image z to a candidate image x, and returns a high score if the two images portray the same object. The training process requires examples of input pairs to $f$, $(z, x)$, as well as scores (v) and labels (y). $y \in \{-1, +1\}$ refers to whether $(z, x)$ is a matching pair, and v is a real-valued score, i.e. the desired output of $f$ (large if z and x depict the same object, small if not). Image pairs consist of an exemplar image z of size m×n and a large search image x of size M×N, each extracted from the same video and centered on the target (use padding, if necessary, to center the object; see FIG. 11). Many training examples come from each pair by considering all the sub-images that are defined by sliding an s(m+p)×s(n+p) rectangle around the larger search image. s is a scaling factor, and p is a padding constant. Each sub-image is assigned a positive annotation if it is within a radius R of the center c:

$$y[i] = \begin{cases} 1, & k\|i - c\| \le R \\ -1, & k\|i - c\| > R \end{cases},$$

where k is the stepsize or "stride" of the sliding rectangle, i is the index of a sub-image, R is a radius to be determined according to the image resolution of the video camera, and c is the center index. By considering many sub-images, we gain a map of scores v[i] from each pair. Recall the logistic loss function $l(y, v) = \log(1 + \exp(-yv))$, which is extended as follows to compute the loss of a score map (the mean of individual losses):

$$L(y, v) = \frac{1}{|D|} \sum_{i \in D} \ell(y[i], v[i]),$$

which requires a true label $y[i] \in \{+1, -1\}$ for each position $i \in D$ in the score map. The training phase amounts to computing the network weights w by applying Stochastic Gradient Descent to the problem $$\operatorname*{argmin}_{w} \varepsilon_{z,x,y} L(y, f(z, x; w)).$$

ƒ is the convolutional neural network whose parameters we seek. ƒ computes a cross-correlation-based score for the sub-images located at z and x:

$$f(x,z;w)=\phi(z)*\phi(x)+b,$$

where b is a constant, and φ sends a sub-image to its feature map (i.e. a representation based on the parameters w). See the enclosed reference for mathematical details.

Tracking the Target—After the weights w have been estimated, ƒ is fully defined and ready to use for tracking. The initial z should be a straightforward pre-set image centered around the logo. ƒ(z, x) is subsequently evaluated, using for x a large search image containing sub-images of the current frame (as in the training example search images), as well as scaled versions of each sub-image. Thus, when the logo enters the field of view of the video camera, the score map produced by ƒ will contain a sufficiently high score (over some threshold), corresponding to the location (and scale) of the sub-image containing the logo. z is then set to this winning sub-image, after centering it around the target in the same manner as in the training phase (see FIG. 11). This pattern is repeated for subsequent frames: x is the collection of sub-images of the current frame, and z is the winning sub-image from the previous frame (after centering). This process keeps track of the coordinates (i, j) of the logo-containing sub-image, from frame to frame (where i is pixel row, and j is the pixel column). (i, j) may correspond to the upper-left corner, upper-right corner, etc., depending on the particular implementation.

We assume from here on that sub-images are square, and that (i, j) denotes the upper-left pixel coordinates of the winning sub-image at the current frame. Further, note that the displacement of the target from frame to frame can be determined by the relative position of the maximum score to the center index, scaled by k. Denote this displacement vector at the current frame by d.

This tracking algorithm may be enhanced using various temporal regularization schemes, such as considering optical flow or otherwise incorporating the past 'appearance' of the logo. In any case, to avoid unrealistic jumps, large displacements should be penalized (i.e., apply a non-linear threshold such as the cosine window to the score map), and sub-images should only be considered if they are from a limited region around the object's previous position (say, within a radius of 3-6 times the target's previous size, in pixels).

crop out a square around the VR container—To avoid processing a potentially large camera image at each frame, we crop out a square that is presumed to contain the VR container, using (i, j). Note that the size of the sub-image will change depending on whether the winning image was scaled: it is sm pixels tall and sn pixels wide, where s, m, n are defined FIG. 12 is a drawing showing the cup and a cropped image, according to an embodiment. Suppose that, when standing upright, the VR container is at most $a_1$ cm tall and $b_1$ cm wide, and the logo is at most $a_2$ cm tall and $b_2$ cm wide. Note that $$\frac{a_1}{a_2} > 1 \text{ and } \frac{b_1}{b_2} > 1.$$

Denote $$h = \text{ceil}\left(sm\frac{a_1}{a_2}\right)$$
$$w = \text{ceil}\left(sn\frac{b_1}{b_2}\right),$$

where ceil is an operator that rounds up to the nearest integer.

The pixel coordinates of the four corners of the desired cropped image are then given by: (i+h, j−w), (i+h, j+w), (i−h, j−w), (i−h, j+w). See FIG. 12.

Optionally, as described herein, the displacement d of the winning sub-image from the previous frame is also available. Instead of computing the indices of the cropped image for each frame, it is possible to simply shift the previous frame's cropped image by d. Scale must be taken into account, however; in particular, if the winning sub-image is larger than the previous one (s>1), then the cropped image should be proportionally larger. First, displace the image; then, elongate the cropping boundaries by a factor of s. This is a little rougher and will result in a larger cropped image, but may save time.

As a note, consider the case when two cameras are available, both attached to the HMD, but it is desired to only perform object tracking in one of the video feeds. Then the cropping square found in this step can be "translated" to the other camera image. Use the same cropping square in the new camera image (in terms of pixels), then expand it. This is to ensure the logo is still contained the cropped frame of the new image. Then complete the rest of the steps for both cropped images.

Resize image for HMD—(if each camera and HMD have the same resolution, this can just be skipped). Real-time image resizing has been thoroughly developed in the past decade with the acceleration of image/video uploads to the internet, smart phone apps and cameras, etc. Any fast implementation of bilinear or bicubic interpolation will do, or if computational resources are abundant, an adaptive resizing algorithm that takes local image context into account can be used.

Suppose the camera resolution is a×b, and the HMD resolution is c×d. Then the image resize factor should be c/a in the vertical dimension and d/b in the horizontal dimension (e.g.: if c=2a and d=2b, then perform a 2× image magnification, or you can say a "2× upsampling rate in both dimensions").

HMD coordinates of resized image—(if each camera and HMD have the same resolution, AND the cameras are positioned directly in front of each eye, this can be skipped)

After resizing the image, we must determine where in the HMD it should be placed. We address this problem in terms of mapping (i, j)→(I, J), where (i, j) are the coordinates of the image in the camera's current frame, and (I, J) are the coordinates of the resized image in the HMD's current frame. Suppose the camera image has resolution c×d, and each HMD has resolution C×D. Then the normalized position of the sub-image is $$\left(\frac{i}{c}, \frac{j}{d}\right).$$

Then we can solve for I and J by estimating the following equations:

$$\frac{i}{c} = \frac{I}{C},$$
$$\frac{j}{d} = \frac{J}{D}.$$

This gives us $$I = \text{round}\left(\frac{i}{c}C\right)$$
$$J = \text{round}\left(\frac{j}{d}D\right),$$

where round rounds to the nearest integer, simply ensuring that (I, J) is a valid pixel coordinate pair.

If the cameras have an offset from the user's eyes, then (I, J) will need tweaking as well:

$$(I,J)_{final} = (I,J) + (\Delta_I, \Delta_J),$$

Where $(\Delta_I, \Delta_J)$ is a determined by the camera resolution and (x, y) offset between the user's eyes and the cameras.

Segment the cup boundary from the square sub-image—The sub-image has been designed to be easily segmented: see the right panel of FIG. 12. A wide slew of algorithms can work here, depending on the type of hardware the system is using (GPU computing etc.). Some examples include:

Graph cuts: input the center of the sub-image (the logo interior) and the cropped image boundary as seeds. The graph cut algorithm will find the most prominent continuous edge in-between these boundaries.

If necessary, the algorithm can be customized to find two continuous boundaries: the container and logo. The larger boundary will correspond to the container.

Geodesic active contours (snakes): input the cropped image boundary as the seed, and require the contour to travel inward from there. The boundary of the container will be recovered (and, probably, the user's wrist).

Edge Detection: if the sub-image can be guaranteed to be smaller than the container's boundary, one may simply set its interior to some average value, then find the smallest continuous edge by primitively analyzing the gradient image (the image obtained by computing the differences of each adjacent pixel vertically or horizontally).

There are no algorithms (yet) that can promise to segment of the VR container without being thrown off by the user's hands which will presumably be holding and even entering the container. We recommend suggestion 2, which should be the most robust to the varying sub-image and cropped-image size, and boundary deformation caused by the user.

No matter which algorithm is used, the output will be either (a) the boundary of the container, or (b) the boundary and apparent interior of the container. In the case of (a), we need to obtain the pixel indices corresponding to the interior of the boundary. This could be done in a rudimentary way, such as by drawing the smallest rectangle containing all of the boundary coordinates. If desired, customized cropping can take care of the predictable slivers of background at the top and sides of this rectangle.

Display—previously, we determined the location of the resized cropped image containing the target with respect to the HMD: pixel coordinate (I, J) determines where the upper-left corner of the image should be placed. We determined which pixels of the resized cropped image should be displayed. Doing this for each eye, with each camera, completes the basic procedure.

What follows is a description of a procedure for systems with only one (non-bi-focal) head-mounted camera, or a bifocal system that does all of the tracking and resizing procedures using just one eye's image stream and simply estimates the other eye's display based on those results. The camera whose feed is processed as described herein is assumed to be aligned (or already adjusted for) the left eye in the following descriptions. I.e., the computations are performed based on the images from this left-camera only. The display in the right eye's screen is subsequently determined as follows.

Estimating the distance to the object (t)—The distance from the HMD camera to the object, t, should be estimated in order to simulate a stereoscopic effect. We suggest a simple method for rotationally invariant shaped containers such as the cup/bucket-like one in FIG. 12. For more arbitrarily shaped containers this method can be applied to the logo itself. In that case, replace "container" with "logo" in the following sub-procedures.

One piece of prior information is required for this method, i.e. it must be collected offline and stored in the system beforehand: the maximum perceived width of the container from a known distance, where "perceived width" means the width in pixels in a camera image. The perceived width of an object shrinks linearly as the object moves further away.

Figure 19:
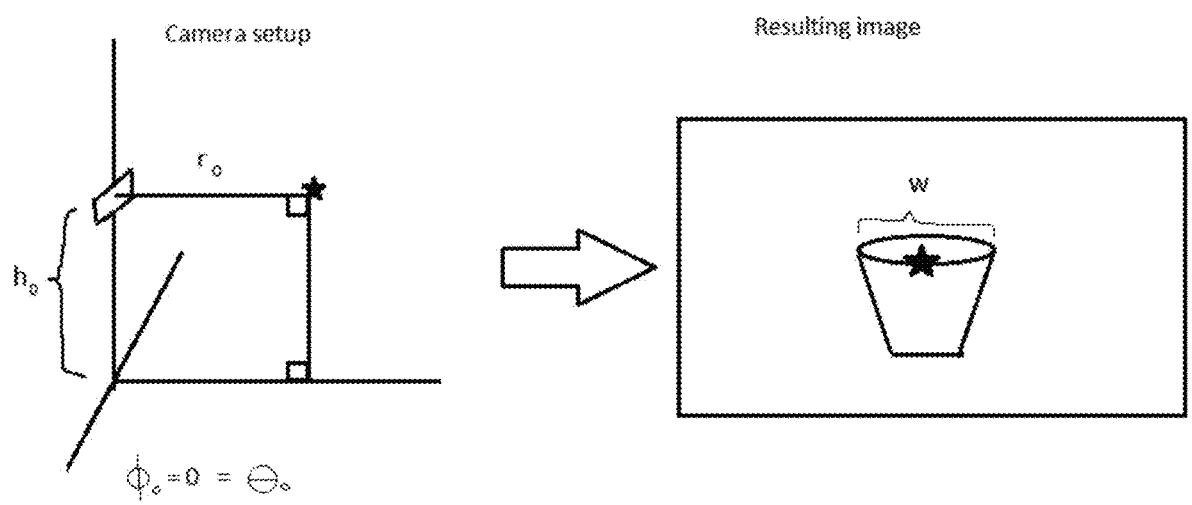
FIG. 19 is a drawing illustrating a camera setup and resulting image, according to an embodiment.

After taking a photo using the setup in FIG. 19, we compute w which is the perceived width of the cup (which can be accomplished using a method described herein) from a distance to, knowing that the actual width of the cup is $w_0$. Then using similar triangles, the focal length of our camera is $$F = \frac{w[\text{pixels}] \times t_0[\text{cm}]}{w_0[\text{cm}]}.$$

Then, at each subsequent frame during tracking, w is measured (the width of the cup as perceived by the active camera). t (the distance between the active camera and the object) can then be estimated using laws of similar triangles $$t = \frac{F[\text{pixels}] \times w_0[\text{cm}]}{w[\text{pixels}]}$$

We assume that the container is similar to the cup/bucket in FIG. 12. (rotationally symmetric and with height greater than its width). Different virtual containers may require tweaking to this method. After segmenting the container, a tight box is drawn around the container's image by linking the top, bottom, left, and right extremity pixels: the pixel with the highest vertical index, lowest vertical index, leftmost index, and rightmost index, respectively. We will refer to this outline as the "box" in the below instructions, although it will likely be trapezoidal (See FIG. 13). FIG. 13 is a drawing of different cases of the cup according to an embodiment.

There are four edges comprising the box. The longest two edges are the height of the container. The two shorter edges designate the widths. The widest distance across the container is invariant to tilts, and only appears to shrink/grow when the container is moved closer/further from the viewpoint.

There are 6 possible edges to form between the box vertices. 4 of those edges comprise the hull of the box (the outer edges). The other two are "diagonals". As depicted in FIG. 13, we only consider two special cases in which the cup is seen from slightly above. If you wish to include other cases (looking at the container from directly above/below, or extremely/completely sideways), other heuristics must be considered. The procedure for Case 1 will work even if the bottom of the cup is visible instead of the top of the cup, except for extreme tilts Bisect the cup image in half. If three points are on one half, then go to Case 1. If two points are on each half, go to Case 2.

In Case 1, the width w is the distance between the left and right extremity.

If one of the bottom corners becomes a left/right extremity, or one of the top corners becomes the top extremity, etc., then we have Case two. Then the maximum width is the distance between the two extremities in the top half.

The apparent distance between two pixel locations (a, b) and (c, d) is computed using the Pythagorean theorem:

$$w = \sqrt{(a-c)^2 + (b-d)^2}.$$

w is an estimate of the perceived width of the container in pixels.

We now employ the calibration measurements F and $w_0$ to compute the current distance to the object using $$t = \frac{F \times w_0}{w}$$

Using one camera to simulate stereoscopic effect—The logo may be tracked separately for each eye (using one camera lens per eye), or to save time, can be tracked primarily using just one camera aligned with an eye as follows. Suppose the above tracking algorithm is only applied to the video feed from the left-eye camera. Let $(i, j)^L$ be the corresponding upper-left pixel position of the winning sub-image, as discussed previously for the left eye. The analogous coordinates for the right eye $(i, j)^R$ will have a slight horizontal offset to the left, i.e., $$(i,j)^R = (i,j)^L - (x,0),$$

where x>0 is a positive integer representing a pixel-offset. x will depend on the resolution of the HMD cameras, the distance between the HMD cameras and the object (t), the "distance" between the eye and the HMD screen (L), and the distance between the cameras (m).

Figure 14:
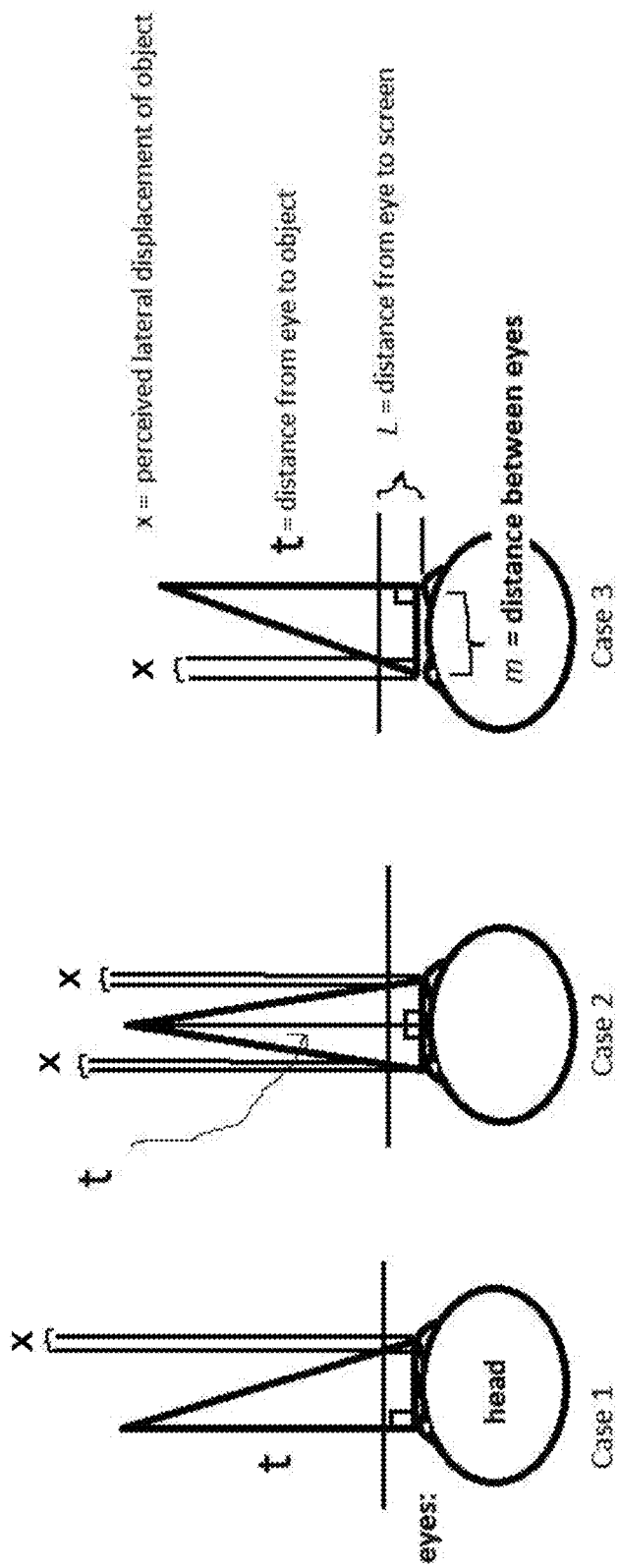
FIG. 14 illustrates three possible scenarios: the object lying directly in front of one eye and the object directly in-between the two eyes, according to an embodiment.

FIG. 14 illustrates three possible scenarios: the object lying directly in front of one eye and the object directly in-between the two eyes, according to an embodiment. In reality, the object could anywhere in-between the eyes or far to one side, but these simplified cases serve as an approximation. We explicitly address Case 1 below. Case 2 and Case 3 follow similarly using fundamental trigonometry. Note that Case 2 corresponds to a single camera in-between the eyes of the user. This is the least natural case and will probably lead to dizziness; most people use their dominant eye to focus and the other eye trails after (in our example, the left eye would be dominant).

Figure 15:
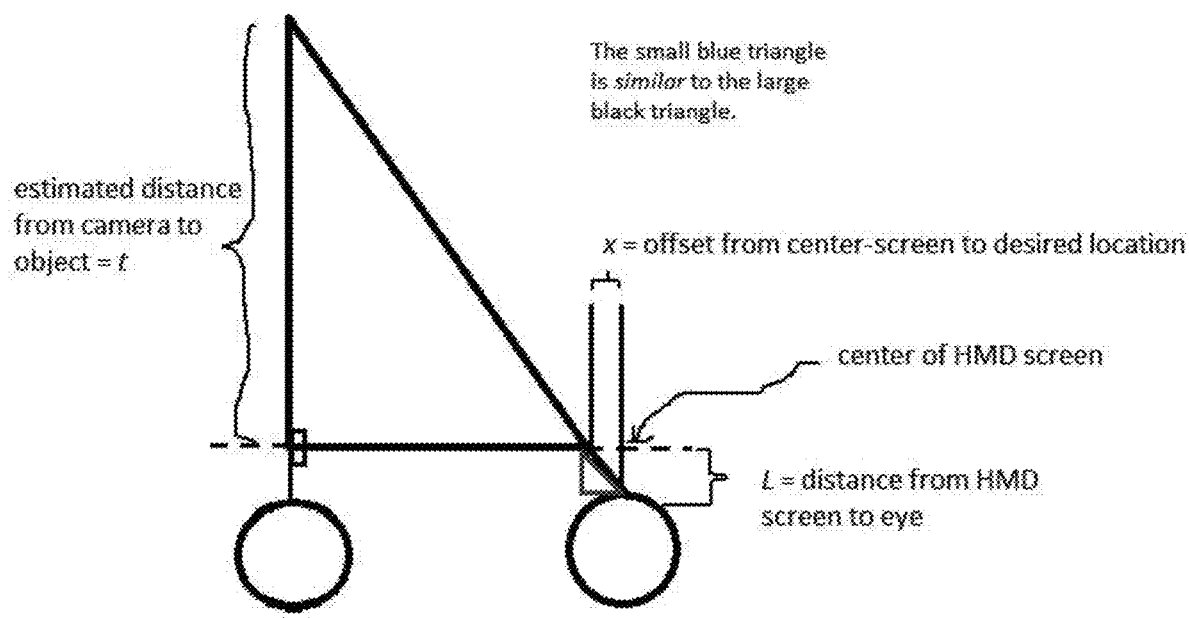
FIG. 15 is a drawing illustrating both eyes, the HMD screen, and the estimated distance from the camera to the object, according to an embodiment.

Procedure: We pose the problem as finding the offset needed (in pixels) from the center of the right-eye's HMD screen, x. This offset determines where to "plant" the video feed in the right HMD screen. See FIG. 15. Let L be the "distance" between the eye and the HMD screen, and let m denote the distance between the centers of the user's eyes.

Note that the parameter L may need adjustment depending on the presence of any magnifying lenses between the eye and the screen. In that case, a "perceived distance" should be used for L. The trigonometric identities used below will only hold for a linearized approximation of the hardware setup.

m may be separated into x (the desired offset) plus y (the remainder). We have the following equations since the small triangle and large triangle (in FIG. 15) are similar:

$$m = y + x$$
$$\frac{t}{L} = \frac{y}{x}.$$

Solving this system of equations yields $$x = \frac{m}{\frac{t}{L} + 1}.$$

After rounding, x gives the number of pixels shifted to the left that the image-feed should be placed. If instead the tracking and segmentation procedure is done for the right eye, then x is determines where to place the sub-image in the left HMD screen using $$(i,j)^L = (i,j)^R + (x,0).$$

Note that If the user's head is tilted, then a vertical pixel adjustment is also necessary. Assuming the tilt is known (e.g. from gyroscope technology), a similar procedure as just described can be used to find this tilt.

Also note that some HMD's have physical an "eye separation adjustment" lever available. This must be accounted for in m and the user should be encouraged to experiment with this separation to get the distance approximation to look realistic.

Combining tracking and segmentation—It may be possible in the near future to combine segmentation and object tracking algorithms into a single, real-time scheme. In the case that the segmentation/tracking steps are combined, draw a small rectangle around the segmentation and execute the resizing and placement procedures as necessary. Choose a reference point on the segmentation with respect to the small rectangle and maintain a proportional distance from it to a point on the small rectangle after resizing.

In the case that a combined tracking/segmentation algorithm is used, it is possible to use additional prior information for the enhancement of the neural network weights (or other methods). For example, during the training phase, one could include boundary annotations in addition to trajectory annotations (see left tree of flow-chart). Since the container will probably have a semi-rigid body, boundary information could be effective.

In an embodiment, the logo approach is described above for a container: a cup, tray, or bucket, etc. It can also be used on other objects that do not require any segmentation. For example, a physical frame can have print on it a number of logo(s) which, upon detection, notify the system to route appropriate video-feed from the interior of the frame to the HMD screens. This can be as simple as 1.) Detect the logo, and draw a tight circumscribing box around it.

2.) Use the procedure described above to estimate the distance between the headset and the logo (where the perceived size may correspond to the size of the box around the logo).
3.) Draw a rectangular frame R such that the bottom left corner of the logo-box is the top-right corner of R. The size of the rectangle should correspond to the estimated distance found in Step 2.
4.) Use methods described herein to appropriately display the interior of the rectangle in the HMD screens.

The distance-size relationship in Step 2 may depend on which logo is detected (for example, different sized frames are needed to display a watch, book, or a frame around the whole HMD for user-webcam like apps). Further, Step 1 (detection and tracking, described in a previous embodiment) may be optimized for this task. The "logo" could be more like a design spanning the length of one side of the frame, or the entire frame, instead of just the corner of the frame. Some frame examples include: 1) Attached them to objects like watches, books, or masks; 2) Keyboard, mouse, clock, In a further embodiment, the logo may simply designate an "area to be displayed" (no segmentation is required, here). For example, a logo could be placed on an arbitrary object. Then as long as a system camera can track the logo (as previously described), a rectangle of pixels can be designated with the logo in its center (the size of the rectangle may depend on the size of the logo as in the prior embodiment). The video feed inside this rectangle can be fed to users' headsets. Some examples include: 1) The logo could be placed on each user's HMD. Then in a virtual chatroom, "windows" can be placed in a 3D environment through which users can look at each other; 2) A logo can be placed on a desktop mouse or keyboard.

Figure 16:
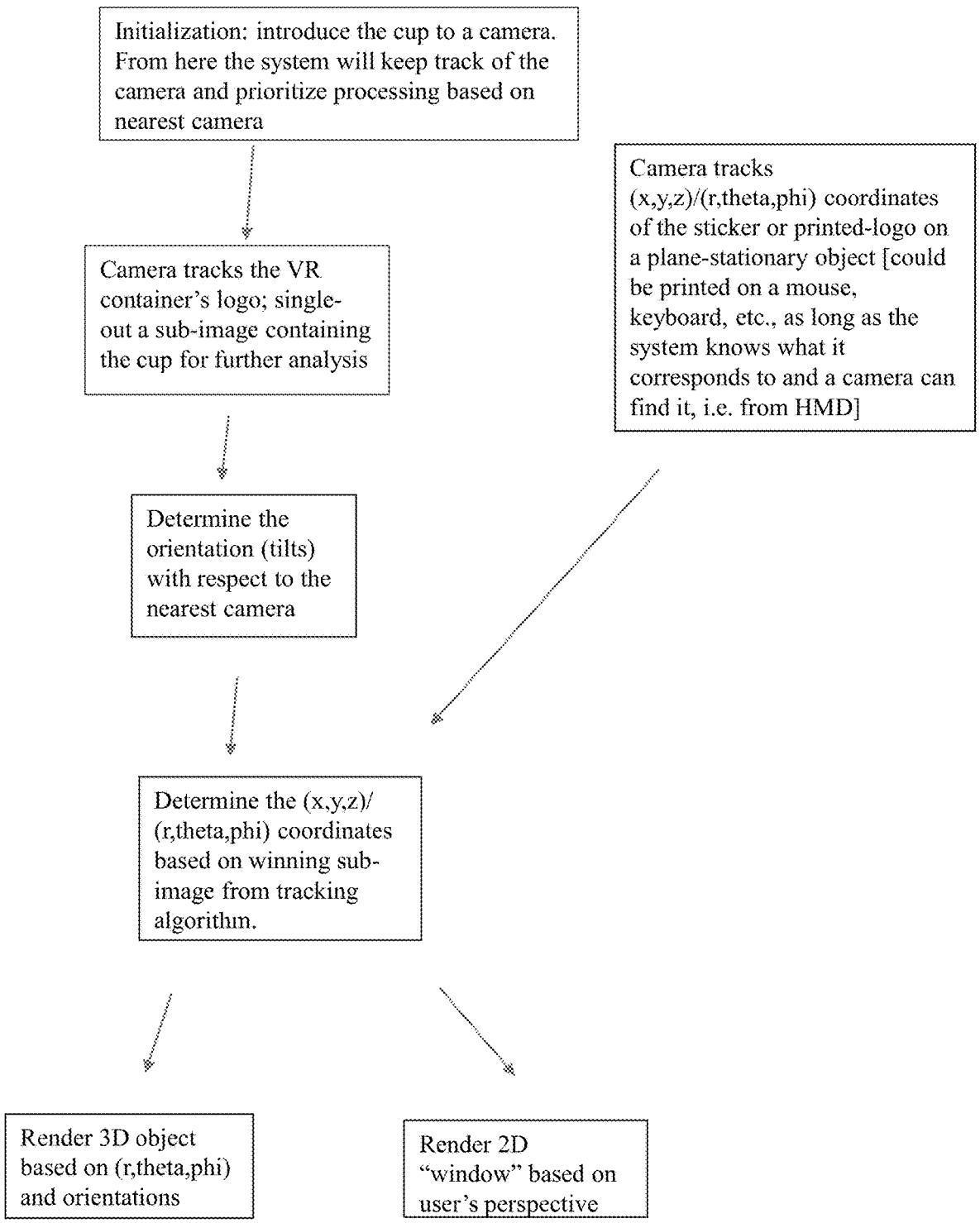
FIG. 16 is a flowchart illustrating a method of tracking a physical object and rendering that object in the virtual world, according to an embodiment.

FIG. 16 is a flowchart illustrating a method of tracking a physical object and rendering that object in the virtual world, according to an embodiment.

Setup—About the Logo: The following procedures rely on image processing to locate, track, and analyze the position and orientation of objects in 3D space. Specifically, we aim to track a cheap and easy-to-make object, and display a virtual copy of it in the environment created by the system so that the user can interact with it (as opposed to a complex object such as existing VR controllers which interactively sends signals to its main system). In other words, we wish to measure the R(x, y, z) coordinates of the object in reality, and map them to a V(x, y, z) in the virtual environment so that they are in agreement with respect to relative position to the user.

This will be done using image processing. The cheap object only needs to have a special "logo" or pattern printed on it, which the system cameras will track and analyze. Once the pattern has been analyzed, the system will know (1) where in VR to display the object, and (2) which object it should be displaying; i.e. It is possible to design varying logos, each corresponding to a different object (a cup, a mouse, a keyboard, etc.)

Logo Examples: Logo-based calculations described herein can rely on the relative positions of two rows of points (see FIG. 17). Based on the relative positions of any 4 points (two from each row), the 3D orientation and position can be estimated. However, many kinds of logos could be used. For example, any design or pattern can be drawn in-between such points, as long as the algorithm can pinpoint them (or some lines connecting them) with reasonable accuracy. FIG. 17 is a drawing illustrating different points/patterns on cups, according to an embodiment.

We also consider objects that are not allowed to move as freely through 3D space and have perhaps some input to the system: for example, a computer mouse that moves only in a 2D plane, and within rather predictable limits. In a special case like this, we can use simplified procedures that incorporate the usual mouse input (i.e. its movement). Here, the logo does not need to imply as much information (such as tilts).

Figure 18:
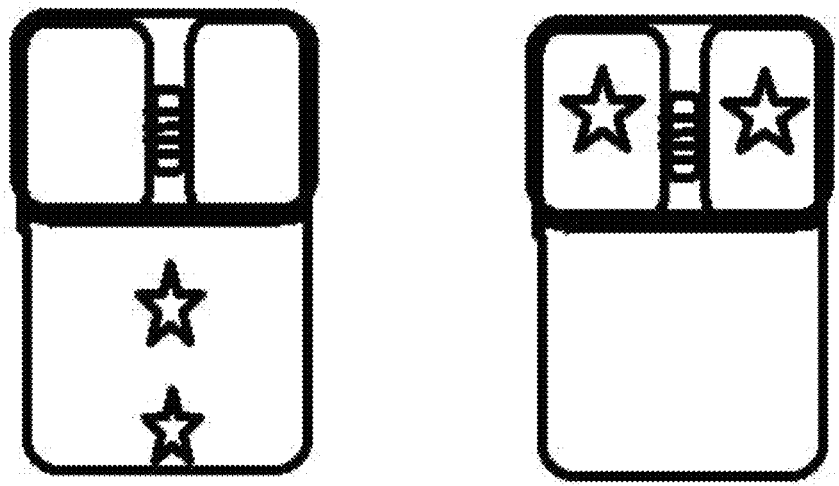
FIG. 18 is a drawing illustrating different logo designs for a mouse, according to an embodiment.

FIG. 18 is a drawing illustrating different logo designs for a mouse, according to an embodiment.

3.) Multi-camera array: To use real-time image processing analysis, some camera must always have a view of some portion the logo (two adjacent dots from each row-four total). This imposes some requirements on the logo, object and system:

Multiple cameras are necessary in case the user comes between a camera and object.

We do not suggest running our tracking procedure on all of the video streams produced by a multi-camera array. Instead, we present a procedure for choosing which camera to use at a given point based on its location (specifically, the nearest one).

For best results, it is recommended to have a camera mounted on the user's HMD. For example, when the user is holding the object it may be hard for a camera to distinguish the pattern (unless finger interference is accounted for in the tracking algorithm). Another example is when the object is a keyboard or mouse, which are only seen from certain angles (i.e. they only need to be tracked when the HMD is pointing toward them).

Figure 20:
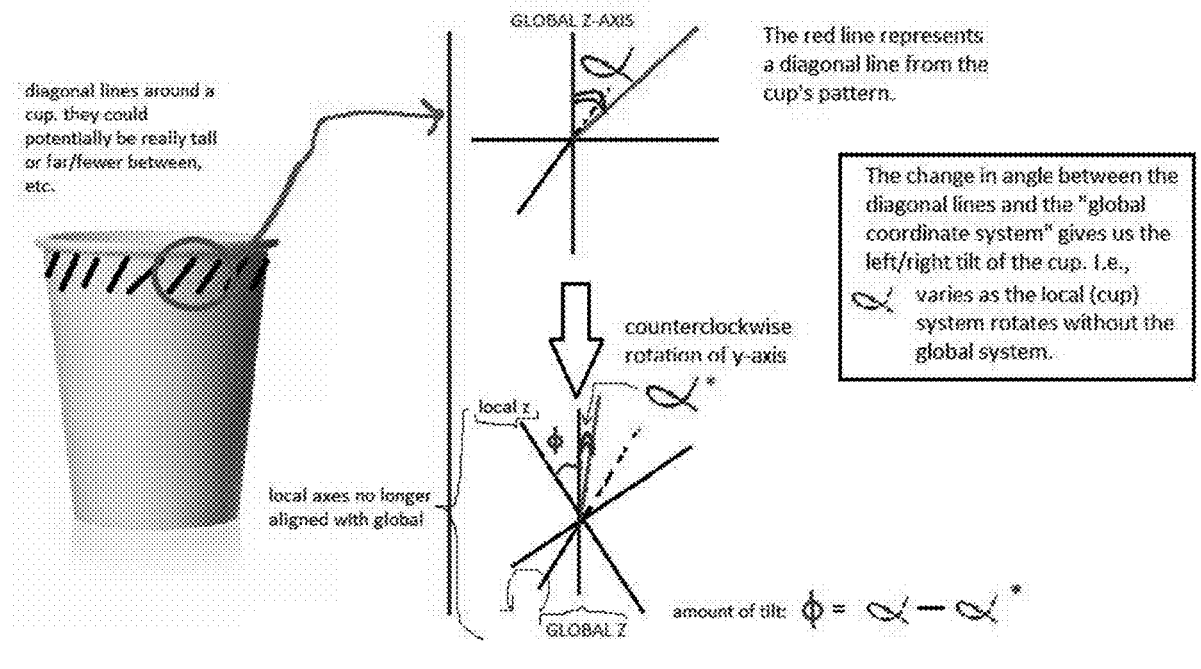
FIG. 20 is a drawing showing rotation of the y-axis, according to an embodiment.

The ideal camera setup would be having cameras suspended off the floor (see FIG. 20). However, it should work with less accuracy using the cameras on the ground or ceiling. Additional work is needed for cameras that are not level with the floor (i.e. pointing diagonally up/down).

If the object is able to freely travel in 3D, a sufficient portion of the logo needs to be recognizable from any direction (i.e. wrapping all around a cup), so that the object can be turned. For example, in FIG. 17 we show the suggested rotationally symmetric pattern of diagonal lines (or dots, from which the diagonal lines can be inferred).

Objects that are restricted to two dimensions (e.g., a computer mouse) may have a more basic logo but require a camera to be facing their domain; i.e. a camera that always faces the user's computer desk, or one mounted on the HMD.

It is possible that a VR system doesn't have cameras around the room; i.e. that all of the system cameras (2 or more) are mounted on the user's headset. This case is addressed at various points in the procedure below and assumes that the headset is using some kind of "inside-out" tracking, i.e. the system has 3D coordinates for various points on the headset (at least one coordinate for each camera on the HMD).

Additional Technologies—VR systems may use image processing methods in conjunction with another technology for tracking and measuring objects in 3D space: e.g., radar/lasers/lidar. For example, such systems could measure the distance from the transmitter to the object more accurately (and faster), but the image processing approach is much better suited for localizing objects in a scene.

II. Measurements that will come built-in with the system (for all users) Two reference or calibration measurements are necessary for computing the objects coordinates in 3D using this method. These calibration measurements are camera-specific, so they should be carefully executed by the system designers and included in the product before the time of release.

FIG. 19 is a drawing illustrating a camera setup and resulting image, according to an embodiment.

Width/distance calibration—An integral part of our procedure is estimating the distance from a camera to an object, given an image of the object from the camera's perspective. This is generally impossible to do without a trustworthy reference object or image (i.e., you can't measure the distance to the moon from photo of it, even if you know its diameter.).

The procedure described herein estimates distance based on the maximum width of the cup as perceived by the active camera. Thus, it is crucial to take an accurate calibration measurement. Different resolution cameras will need separate calibration measurements. The perceived width of an object shrinks linearly as the object moves further away. See FIG. 19. The point of detection (discussed herein) should be centered near the center pixel. E.g., we assume that the cup is widest along its upper rim. The cup should be aligned so that the center pixel is on the middle of said upper rim.

After taking a photo using the setup in FIG. 19, we compute w (the perceived width of the cup, using procedure described herein) from a distance $r_0$, knowing that the actual width of the cup is $w_0$. Then using similar triangles, the focal length of our camera is $$F = \frac{w[\text{pixels}] \times r_0[\text{cm}]}{w_0[\text{cm}]}.$$

Then, at each subsequent frame during tracking, w is measured (the width of the cup as perceived by the active camera). r (the distance between the active camera and the object) can then be estimated using laws of similar triangles $$r = \frac{F[\text{pixels}] \times w_0[\text{cm}]}{w[\text{pixels}]}.$$

Angular Calibration—The proposed method for triangulating the object relies on calibration measurements. We seek to measure the tracking-point's relative position to a reference image, in terms of spherical coordinates, in order to estimate its physical translations in real space. In other words, we convert the "perceived pixel-displacement" of the object's image into "angular displacement" in real life, frame to frame. The angles θ and φ do not vary linearly with (x, y) displacement, they vary with the arc-tangent function.

The ideal calibration measurement would be straight on (see FIG. 19). The parameter $h_0$ in FIG. 20 can be zero (corresponding to a camera and target object on the ground). There are pros and cons to having suspended/raised cameras versus grounded cameras. The user's cameras will need to be raised to the same height, so un-grounded cameras will be more of a hassle to the user. If there is no HMD camera, the experience will greatly benefit from having suspended cameras (i.e. bringing them closer to the cup when in use). Another benefit of grounded cameras is that the cup may be placed on the ground when not in use; this may be the most important time for the localization to be accurate (so the user can safely pick up the cup and avoid kicking it over). At the point it is picked up, the system could switch to an HMD or otherwise mounted camera. Of course, an array of cameras at different heights would be the most robust setup.

FIG. 20 is a drawing showing rotation of the y-axis, according to an embodiment.

Multi-Camera HMD—If the HMD has a series of cameras, then the pre-stored measurements discussed above may both be unnecessary: (1) the distance from the any two cameras to the cup can be computed using one of the well-studied procedures for bi-camera triangulation, and (2) if many cameras are on the HMD, the angular displacement may become negligible at any given point (i.e. if the nearest camera is always "looking" at the logo rather straight-on).

Initially locating and tracking the cup (or any other object)—Initialization It is unnecessary and even infeasible to have tracking algorithms running on the whole array of video streams; especially if there is nothing to be found (i.e. no cups are in the playspace). This means that either (1) a single camera is running the tracking algorithm all of the time, and the user is expected to "present" the cup to the camera to introduce it into the space; or (2) the user executes an "initialization" mode where the system exhaustively searches for the cup, starting with the camera nearest the user (or one mounted on the HMD, in which case the user just needs to be facing the cup).

Which Camera to Use (Depending on the Position)—In the following procedures we need to compute the Euclidean distances between points in 3D space. The Euclidean distance between two points with familiar Cartesian coordinates, $(x, y, z)_0$ and $(x, y, z)_1$, is $$\text{distance} = \sqrt{(x_0-x_1)^2+(y_0-y_1)^2+(z_0-z_1)^2}.$$

If one of more points is in spherical coordinates, we must convert them to Euclidean coordinates before applying the above equation. To convert (r, θ, φ) to (x, y, z) we use $$x = r \cos \theta \cos \phi$$

$$y = r \cos \theta \sin \phi$$

$$z = r \sin \theta$$

Basic Protocol: As the object moves around the room, the camera with the best view should be used. The best camera is the closest one that has a clear view of the logo. A clear view is achieved when the tracking algorithm is able to score above some threshold (the tracking score is defined explicitly herein). For example: if the object is very close to Camera A, but logo is not found, then the next closest camera should be determined. We presume to have the relative (x, y, z) coordinates of both the object and cameras (computed using procedures described herein), so it is simple to determine the next-closest camera using Euclidean distance.

Suppose that Camera B is the next-closest camera. Then the current frame from Camera B will be analyzed. If the logo still cannot be found by Camera B, the next closest camera will be used. And so forth. Since the tracking algorithm works in real-time, there may be a skip of up to N frames, if the N-th closest camera is the nearest one that has a clear view of the logo.

Choosing an appropriate threshold for the tracking algorithm depends on the exact logo used. It may need a higher threshold (i.e. a more precise logo match) if the logo is difficult to detect and track.

A more robust camera array—A good way to avoid skips is to install a camera on the HMD of the user. Presumably, if the nearest camera cannot find the logo, the user is holding/examining the object. Then a head-mounted camera will (a) probably have the best view, and (b) probably be the nearest camera, anyway.

It is likely in the future that a series of cameras are included on the HMD (2 or more). In this case, it is advantageous for the system to employ the nearest two cameras to observe the target object. Only one video stream needs to be fully analyzed with the tracking algorithm at each frame; the region containing the cup in one camera view can be inferred from the other depending on the displacement of the two cameras. This is discussed in detail at each step below.

If the user is holding the object: If the user is holding the object, her fingers may block the view of the logo (even from the view of the HMD camera). This is why a repetitive pattern is desired: so that the tracking algorithm can find some part of the logo, even if some of it is covered. The tracking score threshold should be calibrated with the robustness of the logo ("how much" of the logo is necessary for logo analysis). Another way to promote robustness is to include hand-blocking in the training data (elaborated in the next section), so that the tracking algorithm itself expects finger interference.

Tracking the Logo—One way this can be done as described herein. It should be ensured that enough the logo is in the wining sub-image for further analysis. A sufficient amount means 4 dots: two in the upper row above and two in the lower row.

IV. Logo Analysis (Computing the Object's Orientation/tilts)—It is easier to describe the procedures in Sections in terms of the diagonal lines connecting nearby dots, rather than the dots by their selves. There are two linearly independent types of tilting that occurs in 3D space: to/fro tilts, and left/right tilts.

Left/right tilt—The left/right tilt of the cup can be measured by the angle between the global axis and the diagonal lines in the pattern. See FIG. 20. Consider the diagonal line connecting the two points from lower-left to upper-right with pixel coordinates (m, n) and (i, j), respectively. The angle this segment has with the global z-axis is given by $$\alpha = \tan^{-1}\left(\frac{i-m}{j-n}\right)$$

Figure 21:
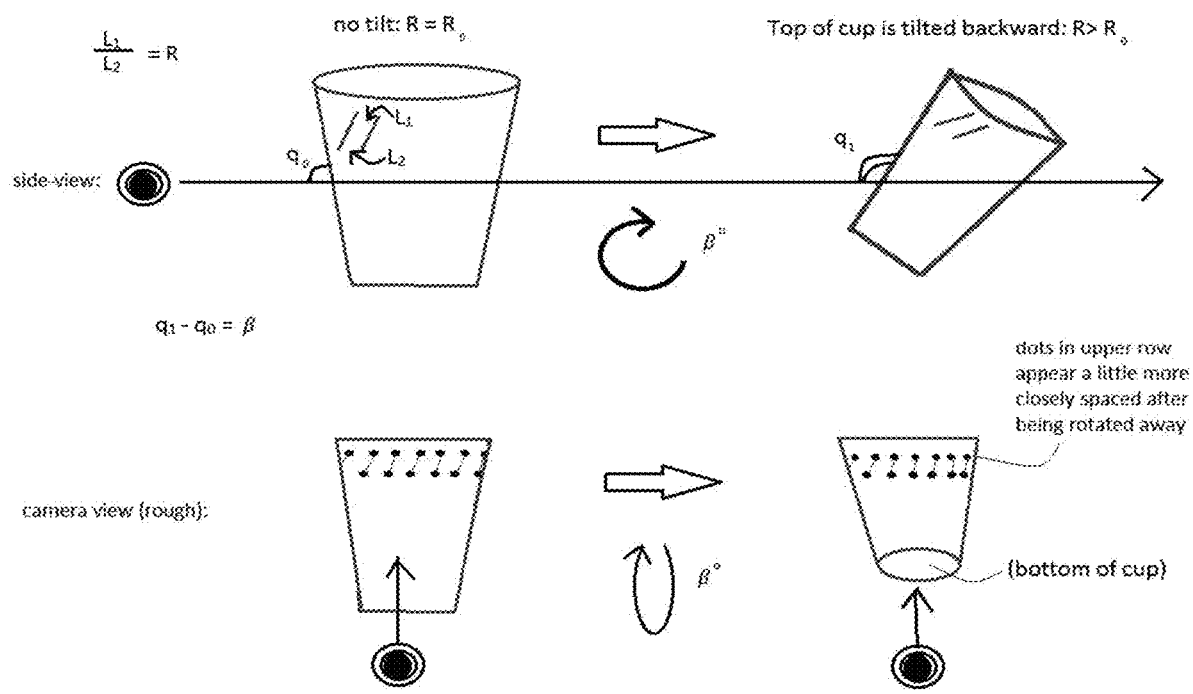
FIG. 21 is drawing showing a cup with no tilt and tilt, according to an embodiment.
Figure 23:
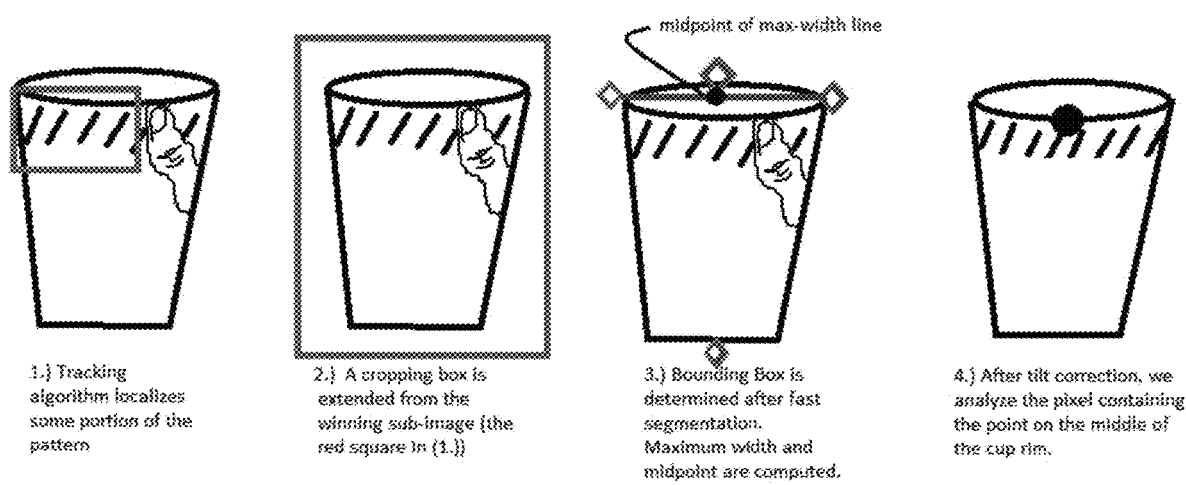
FIG. 23 is a drawing showing to/fro tilt, according to an embodiment.

FIG. 23 is a drawing showing to/fro tilt, according to an embodiment. To/Fro tilt—The to/fro tilt can be inferred by the relative separation between the top and bottom of two diagonal segments. See FIG. 21. When the top of the cup is rotated away, two diagonal lines are closer at the top than they are at the bottom. When the bottom of the cup is rotated away, the two diagonal lines are closer at the bottom than the top.

Let L1 be the separation between two diagonal lines at their top, and L2 be their separation at the bottom. When the cup is upright relative to the camera, $L1/L2=R_0$ (the diagonal lines appear parallel). If $L1/L2>R_0$, the bottom of the cup is rotated away. If $L1/L2<R_0$, the top of the cup is rotated away. Call R=L1/L2 the ratio of these lengths.

There can be 3 ways to estimate the angle of tilt:

Direct ratio-tilt conversion: The question is, how much does β degrees of tilt cause the ratio R to change? The answer depends on both the camera and logo, so we simply provide a procedure for estimating this for a given system.

This experiment should be performed offline, i.e. before releasing to the user (like the other calibration measurements). Using a setup like that in FIG. 19, take some photographs of the cup at different tilts (the amount of tilt needs to be controlled accurately). Then, measure the widths $L_1$ and $L_2$ at each tilt. Next, use regression to compute a best-fit curve to the data points $(R_i, \beta_i)$ (where $R_i$ is the ratio of widths, $L_1/L_2$, when the cup is tilted $\beta_i$ degrees). Use both positive ("fro") and negative ("to") tilts. A linear regression may be sufficient, but a higher order regression may be necessary for longer distances (by plotting $(R_i, \beta_i)$, one should be able to deduce the most appropriate type of approximation function).

The result of this regression scheme will be some coefficients that define a continuous best-fit line for the data. Later, during tracking, at each frame the ratio R can be measured and input to this best-fit line and the corresponding tilt β can be estimated.

Another approach is to use a second camera, for which we present two sub-methods: If another camera has a perpendicular view of the cup, its left/right tilt corresponds to the "to/fro" tilt of the main active camera. This is computationally costly than the previous method but possibly has increased accuracy. There are only two linearly independent dimensions along which the cup can tilt, so two such measurements should be sufficient.

Figure 22:
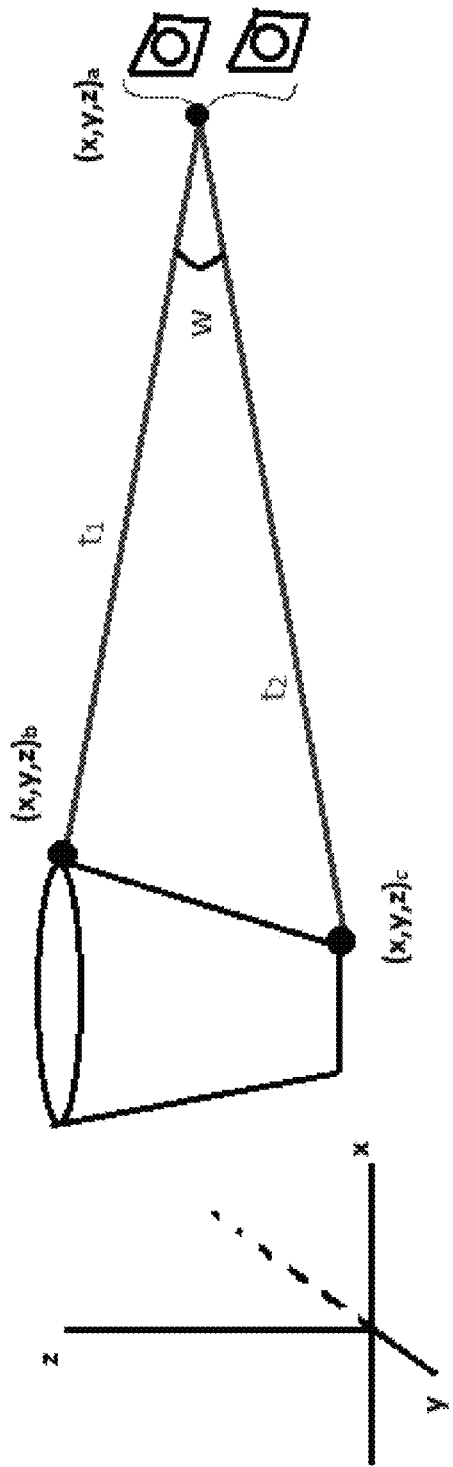
FIG. 22 is a drawing showing a pair of cameras and a cup, according to an embodiment.

In the case that there are multiple cameras on the HMD, the tilt can be computed using bifocal triangulation of two points on the cup. Using bi-camera triangulation (discussed below), the cameras can compute the distance to the top and bottom of the cup. Suppose these two points have coordinates $(x, y, z)_1$ and $(x, y, z)_2$. Then, using a vertical line as a reference, the angle between the points can be computed. The tilt β is given by $$\beta = \arctan\left(\frac{z_1 - z_2}{x_1 - x_2}\right)$$

where $x_1$ and $x_2$ are the axial coordinates relative to the cameras; i.e. along the dimension between the cameras and cup (x measures how far the points are from the cup when projected onto a flat line below). See FIG. 22. FIG. 22 is a drawing showing a pair of cameras and a cup, according to an embodiment.

This may be the most difficult and sensitive measurement to make using image processing (a high-resolution camera may be necessary for very accurate tilt estimate). If a flexible laser/ladar/radar system can step in to make two measurements of distance to different points on the cup (based on the localization performed in the tracking step), the to/fro tilt can be estimated from there. Suppose point A is distance R1 from the transmitter, and point B is distance R2 from the transmitter.

Computing Object's Real 3D Coordinates $(r, \theta, \phi)_0$—FIG. 23 shows a captured cup and steps in the processing of the cup, according to an embodiment. The system should determine Where on the object is the $(x, y, z)/(r, \theta, \phi)$ being tracked . . . A 3D object cannot by described by a single 3D coordinate. For example, if someone claimed that "the cup is at $(x, y, z)_0$," one must ask "is $(x, y, z)_0$ a point at the top, bottom, or midsection of the cup?" and "is $(x, y, z)_0$ a point on the front, back, or in the middle of the cup, relative to the user?".

Suppose Camera A has a clear view of the cup (i.e. the tracking score is above some threshold). Then we assume that any (x, y, z)-coordinate estimated by Camera A must be on the face of the cup seen by Camera A (this may seem extremely obvious but it must be incorporated into the algorithm). In other words, the cup must be "sticking out behind" the point measured by Camera A. Further, we must know relative position of (x, y, z)$_0$ on the cup. The tracking algorithm in III-3 actually keeps track of a sub-image containing a portion of the logo (we don't assume that the entire logo is visible). Then we determine the maximum width of the visible cup. We also determine the tilt. Combining all of this information will give us coordinates (r, θ, ϕ) for the center of the top-rim of the cup. See FIG. 23. The rightmost panel shows the point on the cup to be tracked is on the edge of the top of the cup, in the middle (not hovering in the center of the cup opening between edges).

Consider the case where 2 or more cameras are attached to the HMD. Then it is advantageous to analyze the logo from two viewpoints. The logo can be tracked independently in each video feed, or to save computational resources, it can be tracked in one camera image and the "winning sub-image" for the other camera can be inferred from the first. Suppose the cameras are separated along the left/right dimension, and the tracking procedure is completed using the video from the left camera only, yielding the winning sub-image pixel coordinates $(i,j)^L$. Then the winning sub-image coordinates for the right camera will be shifted a bit to the left:

$$(i,j)^R = (i,j)^L - (x,0)$$

Where x>0 is an integer representing a pixel offset. To ensure robustness, instead of just shifting the winning sub-image, its left border should simply be extended (perhaps doubled; this depends on the implementation of the tracking algorithm). Vice-versa: if the image is analyzed in the right camera, then copy its winning sub-image to the left camera image and extend its right border. This makes the winning sub-image a "wider" rectangle. A similar procedure should be done if the cameras also have a vertical displacement, using $$(i,j)^{above} = (i,j)^{below} - (0,y),$$

where we assume the winning camera image in the higher/above camera needs to be extended downwards; or the lower/below camera winning sub-image needs to be extended upwards. The point is to ensure that the logo is found inside the "winning sub-image" in both camera images.

Estimate the Distance from the Active Camera to the Object ($r_0$)—There are various ways to accurately compute the distance of an object from a sensor, including radar, lidar, etc. However, in those cases the sensor needs to know "where to look", and must able to tell the difference between, say, the object and the user. Stereoscopic cameras (dual lenses) have also be used to compute distance. We present a novel way of estimating the distance between a camera and a point on an object using a single lens camera (the active camera).

Rotationally Symmetric Objects—By rotationally symmetric, we mean an object whose shape does not change as it is spun around (such as a cup with no handle). This method relies on a reference or calibration measurement of the maximum width of the cup. ($r_0$, $w_0$) See FIG. 19 for calibration measurement setup. This dimension of the object does not vary with left/right tilting—it only varies with distance, and a little bit from to/fro tilting.

To do real time distance-tracking we first measure this width-dimension using the following procedure (see FIG. 13):

From Step 3 in the Tracking box around the cup. It doesn't matter as much how accurate this is, as long as the bounding box is nearly proportional.

The bounding box should have 4 extremity pixels: the (i, j) index of the leftmost, rightmost, highest and lowest points of the bounding box.

The maximum width of the cup is depicted as a dashed line in FIG. 17. Here is a procedure for determining the length of this segment:

Bisect the cup image in half. If three points are on one half, then go to Case 1. If two points are on each half, go to Case 2.

In Case 1, the width w is the distance between the left and right extremity.

If one of the bottom corners becomes a left/right extremity, or one of the top corners becomes the top extremity, etc., then we have Case two. Then the maximum width is the distance between the two extremities in the top half.

The apparent distance between two pixel locations (a, b) and (c, d) is computed using the Pythagorean theorem:

$$w = \sqrt{(a-c)^2 + (b-d)^2}$$

w is an estimate of the perceived width of the container in pixels.

We now employ the calibration measurements F and $w_0$ to compute the current distance to the object using $$r = \frac{F \times w_0}{w}$$

Non-symmetric objects—When it comes to "digitizing" a 3D object, in general there is much to be gained from special properties like rotational symmetry. Without such properties, stereoscopic cameras may be used to estimate distance, but non-image-processing methods will probably prevail. A promising approach is to use camera tracking to localize the objects and supplement the analysis with more precise methods for tilt measurements etc.

Using bifocal camera to determine r—Computing distance to an object using two cameras is well-known (the XBOX KINECT utilizes this).

Figure 25:
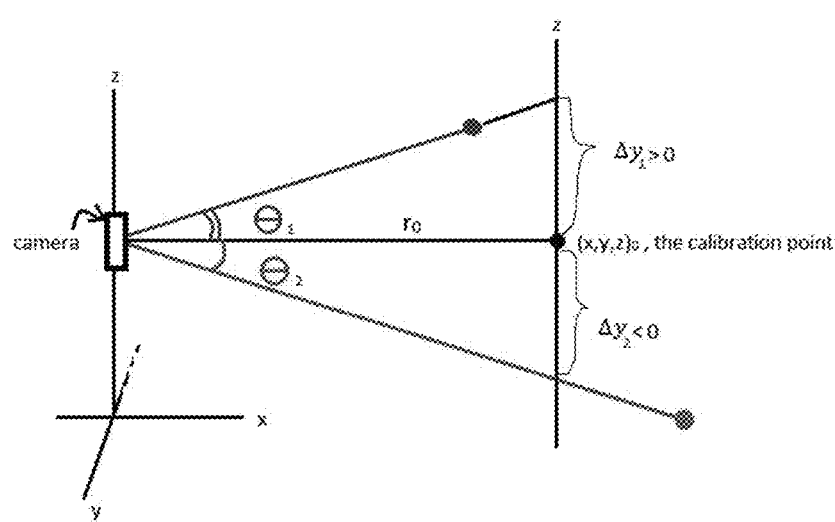
FIG. 25 is a drawing illustrating the camera and angles therefrom, according to an embodiment.

FIG. 25 is a drawing illustrating the camera and angles therefrom.

Figure 24:
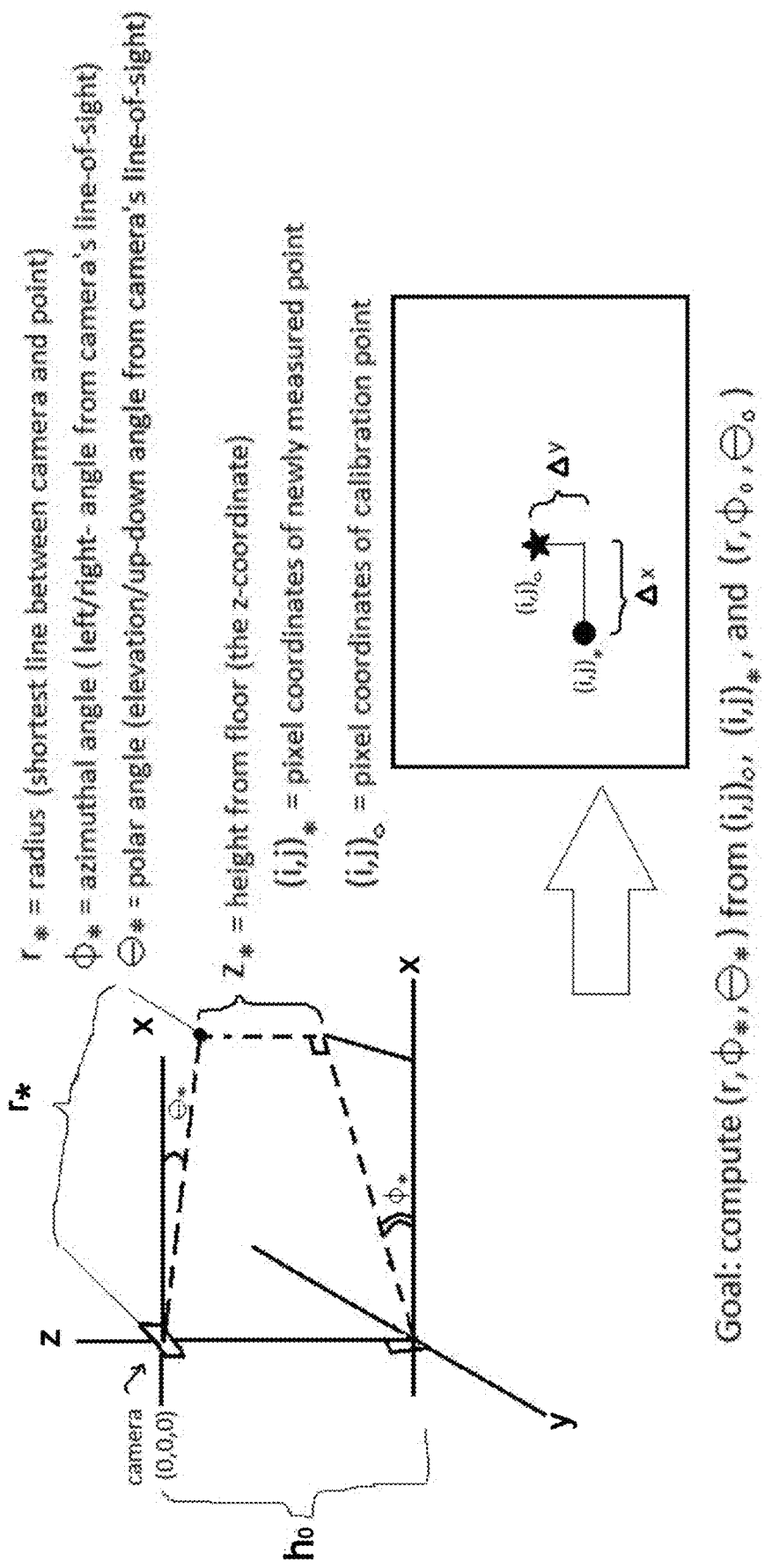
FIG. 24 is a drawing showing the azimuth angle and the polar angle, according to an embodiment.

Computing Polar-angular displacement (θ)—The following sections relate to estimating the polar and azimuthal angular displacements (see FIG. 24 which is a drawing showing the azimuth angle and the polar angle).

In this section we seek to answer the question "what is the change in polar angle due to a vertical displacement of Δy pixels?" Two cases are shown in FIG. 25. The tracking point is below the camera and further from the calibration measurement. In blue, the tracking point is above the camera and nearer to the camera. In both cases, the polar angle is given by a simple arc-tangent computation. In the equations given, we use the convention that θ ranges from −90° to 90°, and we let displacements downward correspond to a negative pixel displacement (i.e. Δy<0 if the object is below the camera).

$$\theta = \tan^{-1}\left(\frac{\Delta y}{r_0}\right)$$

Compute Azimuth-angular displacement (ϕ)—This step is nearly identical to the previous one. We seek to answer the question "what is the change in azimuth angle due to a horizontal displacement of Δx pixels?" Simply replace θ with ϕ, and Δy with Δx. Imagine FIG. 25 was rotated about the x-axis so that the lines exist in a horizontal x-y plane, instead of a vertical x-z plane. We get $$\phi = \tan^{-1}\left(\frac{\Delta x}{r_0}\right)$$

Convert (r, θ, φ) to global system coordinates.—Combining the previous sections gives us a coordinate (r, θ, φ), with respect to the active camera. I.e., the radius extends from the active camera's position and the angles are with respect to the camera's line-of-sight. The coordinate thus needs to be adjusted for a global reference system for display. In the next sections when we refer to (r, θ, φ) or (x, y, z), we assume that the computed coordinate has been transformed to such a global coordinate system. We now have the 3D coordinates of a point on the object in real-space.

Creating the Correct 3D Object—The rest of the object, relative to (x, y, z)/(r, θ, φ)* We now have a point (r, θ, φ) on the top rim of the cup. To render the object we:
  create the top rim: a circle on "the other side" of the tracking point (x, y, z)*, at the angles α and β (left/right and to/fro tilts, respectively), with respect to the active camera.
  create the bottom rim: a smaller circle in a parallel plane at the appropriate distance away (the height of the cup)
  Make everything in-between the circles from (a) and (b) opaque to the user.

Alternatively, depending on what sort of rendering software is used, it might be easier to render the cup by creating a cone. The circular base of the cone corresponds to the top rim of the cup, and should be placed as in part (a), so that the tracking point is on the rim facing the active camera. Then, simply "chop off" the cone at the parallel plane where the bottom rim should be (from part (b)), i.e. depending on the length of the cup. Then color-in the middle and make invisible the tip, to make a frustum corresponding to the cup. A cone with its "tip" chopped off is called a frustum.

Fitting a frustum (or cone) equation to two points—Some optional steps from the above procedures suggest using two cameras to measure two points on the surface of the cup during a single frame. A cup can be thought of as a cone with its tip chopped off; this shape (kind of like a trapezoid crossed with a cylinder) is called a frustum. Three points are necessary to define a shape such as a cone in 3D space, but with heuristic tricks, two points may do the trick. For example, we know that each point measured is facing its corresponding camera. So, after fitting a frustum or cone equation to the two points, we can correctly render it in virtual reality by making sure the rest of the frustum "sticks out" on the other side of the dots from the cameras.

Fitting the equation to more points—With 3 or more points, actual triangulation could be performed. The problem with this sort of "brute force" approach is that cameras must have a "clear view" of the logo to estimate these points. Thus, none of the cameras may be on the other side of the user from the cup. However, if the user can be expected to dedicate a whole room to virtual reality, perhaps someday we can put a huge array of cameras around the VR room. In that case, the cone/frustum equation can be fit to the three (or more, using approximation techniques) points and the tilt may not even need to be estimated.

Special (plane-stationary) Objects with User Input—Some important objects, especially a computer mouse or other cursor-input device, could greatly benefit users if they were displayed in VR. This type of object lies mainly in a single 2D plane: we don't expect the mouse to go up and down, and to stay level on the desk. So, the computations needed for displaying them correctly in VR are simplified compared to free-floating objects such as cups.

Mouse—Once the logo (discussed earlier) is recognized and distance to the HMD is estimated, the object should be created on the "other side" of that point from the camera. From there, mouse inputs can solely determine how the virtual representation moves. In other words, we may be able to avoid constantly tracking it. In FIG. 18 we suggested a mouse design with two logos. The idea is that by tracking the angle between them, we can tell whether the mouse was translated as a whole or just rotated about a point.

Keyboard—Similarly, we don't want to have to track the keyboard (since it is presumably stationary.) So once it's found, a digital copy can be made. The regular keyboard input can be exploited to reflect a key-press. Utilizing an earlier embodiment with the keyboard as a "frame", it could then show the user's hands using the keyboard.

Figure 26:
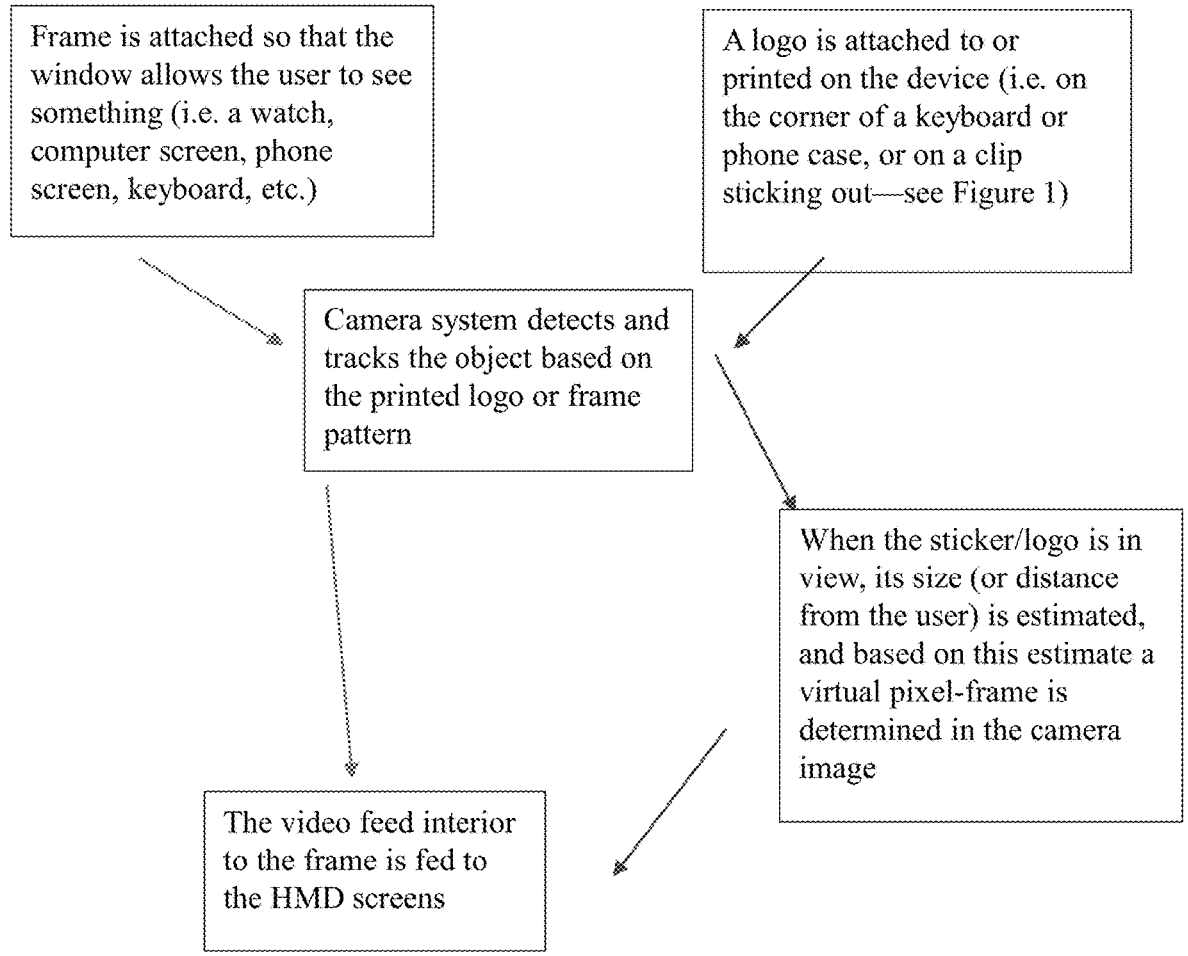
FIG. 26 is a flowchart illustrating an exemplary method of detecting and feeding a video feed to the head mounted display, according to an embodiment.

FIG. 26 is a flowchart illustrating an exemplary method of detecting and feeding a video feed to the head mounted display, according to an embodiment.

Figure 27:
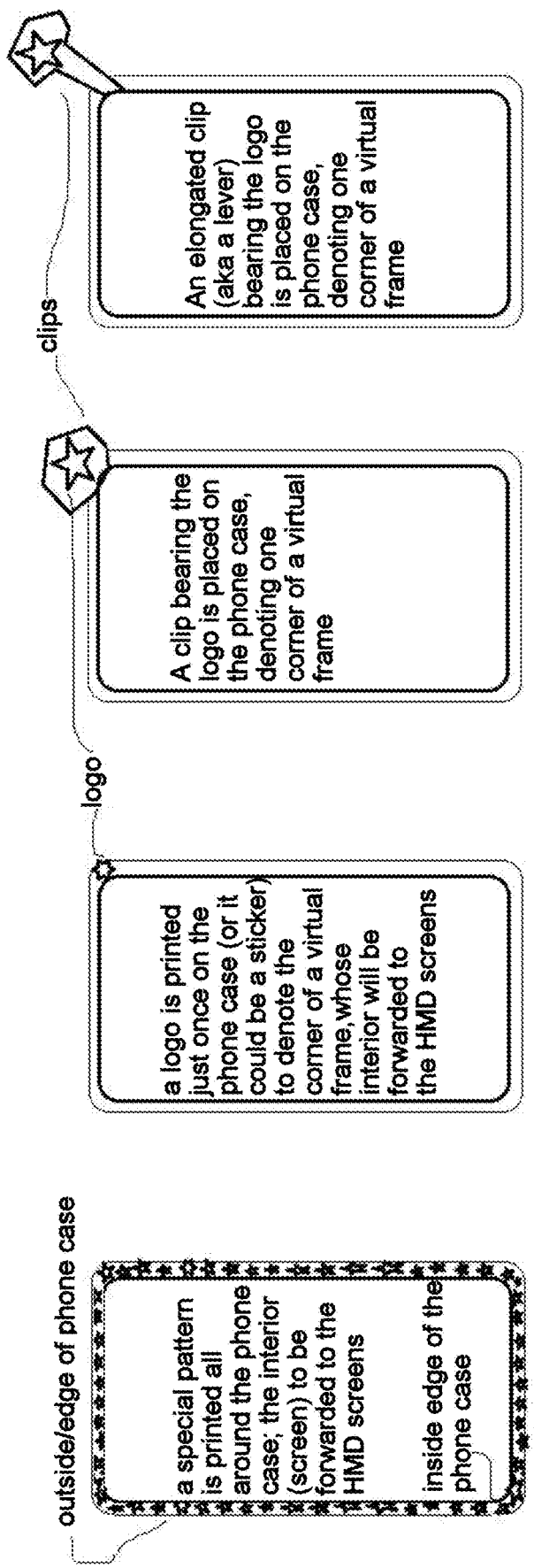
FIG. 27 is a drawing illustrating different embodiments of frames, according to an embodiment.

FIG. 27 is a drawing illustrating different embodiments of frames, according to an embodiment.

Figure 28:
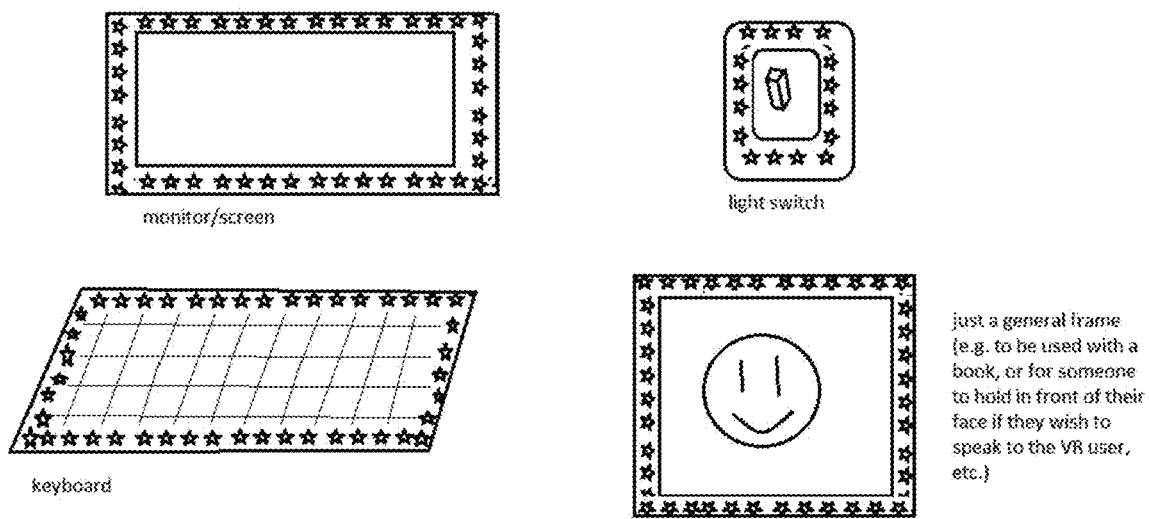
FIG. 28 is a drawing illustrating different applications of frames, according to an embodiment.

FIG. 28 is a drawing illustrating different applications of frames, according to an embodiment.

Full frame—The idea is to have a physical frame surrounding the object or space that is desired to be displayed in the virtual world. The frame as perceived in the camera images denotes a pixel window, whose interior will be visible to the user in their HMD. See FIG. 28 for some examples. The frame is detected and tracked by the system cameras, then the pixels interior to the frame are forwarded in real-time to the HMD screens in the appropriate position.

System Requirements and Placement of the Frame—System Requirements: The VR headset needs to have a mounted camera or pair of cameras. The following procedures assume that there is a dual-lens camera attached to the VR system's head mounted display (HMD). To perfectly avoid stereoscopic mismatch, one camera lens must be positioned directly in front of each of the user's eyes.

In case there is a camera for each eye, but not exactly in front of the user's eyes, a digital displacement can be applied, but the angle will always be slightly wrong.

The camera resolution does not need to be exactly the same as the HMD screen, but it would reduce the following procedure's complexity if that was the case.

At the end, we address the case of having only one camera attached to the HMD, i.e. the following procedure does not need to be repeated for both cameras. For example, tracking may be solely based on the right-eye camera, and the apparent position with respect to the left-eye camera may be approximated from those results.

Frame Placement: See FIG. 28. The pixels interior to the frame will be fed directly to the user's HMD.

Consider the case of printing a frame around the edge of a keyboard or phone case. Then, when facing the keyboard/phone screen, the user will be able to see both (1) the keys/buttons available, and (2) their actual fingers. This has practical purposes (if the user wants to use a virtual desktop but has trouble typing without seeing their hands), as well as gaming potential (the phone could have a corresponding app for a VR game, and could be strapped to the user's arm, so whenever the user looks at their arm they are able to key-in commands via their phone touchscreen).

A frame could also be free-floating just for experimental purposes. For example, if the user is deep into a VR experience but someone needs to interrupt them, they interrupter may hold the frame in front of their face, which will subsequently appear in the virtual world.

Detecting/Tracking the Frame Pattern—Detection: This should be the same as described herein, i.e., a convolutional neural net is used to return a "winning sub-image" of the current video-frame that contains the entire patterned frame. Labeled videos with different angles/views of the entire frame should be used as training data, with a variety of backgrounds visible through the middle.

Auto-segmentation can be used if the training data is so specific as to label the outline of the frame.

Frame Segmentation: The tracking algorithm will return a rectangular sub-image containing the frame, its interior, and its immediate exterior. The interior and exterior need to be separated by segmenting the frame edge. This should be easily achievable using a basic edge detection algorithm. For example: graph cuts, or an active contour/snake algorithm that begins at the border of the sub-image and works inward until it finds a strong connected edge (the frame).

If desired, you can help avoid displaying the frame itself as well as its interior by making the inner edge extra dark. See FIG. 14.

Placing the Video Feed in HMD Screens—Resize the image from camera to HMD resolution (if each camera and HMD have the same resolution, this can be ignored) Image resizing/interpolation is well studied. Any fast implementation of bilinear or bicubic interpolation will do, or if computational resources are abundant, an adaptive resizing algorithm that takes local image context into account can be used. Suppose the camera resolution is a×b, and the HMD resolution is c×d. Then the image resize factor should be c/a in the vertical dimension and d/b in the horizontal dimension (e.g.: if c=2a and d=2b, then perform a 2× image magnification, or you can say a "2× upsampling rate in both dimensions").

Compute the HMD coordinates of resized image (if each camera and HMD have the same resolution, AND the cameras are positioned directly in front of each eye, this can be skipped). After resizing the image, we must determine where in the HMD it should be placed. Instead of worrying about the 3D coordinates of a "floating screen", for example, we are exploiting the relationship between the head-mounted camera and "what the frame would look like to the user", if they were not wearing the HMD. Below, when we say to "the image", we are referring to the winning sub-image determined by the tracking algorithm (described herein).

We address this problem in terms of mapping (i, j)→(I, J), where (i, j) are the coordinates of the image in the camera's current view, and (I, J) are the coordinates of the resized image in the HMD's current view. The tracking algorithm described herein collects (i, j).

Suppose the camera image has resolution c×d, and each HMD has resolution C×D. Then the normalized position of the sub-image is $$\left(\frac{i}{c}, \frac{j}{d}\right).$$

Then we can solve for I and J by estimating the following equations:

$$\frac{i}{c} = \frac{I}{C}$$

$$\frac{j}{d} = \frac{J}{D}.$$

This gives us $$I = \text{round}\left(\frac{i}{c}C\right)$$

$$J = \text{round}\left(\frac{j}{d}D\right),$$

where round rounds the argument to the nearest integer, simply ensuring that (I, J) is a valid pixel coordinate pair.

Note that if the cameras have an offset from the user's eyes, then (I, J) will need tweaking, in a similar fashion as in the following section, in which $(I, J)^L$ is computed for the left eye based on the camera, then the $(I, J)^R$ for the other eye is approximated based on that. If both cameras need additional tweaking (which is NOT advised), the formula is $$(I,J)_{final}=(I,J)+(\Delta_I,\Delta_J)$$

where $(\Delta_I, \Delta_J)$ is determined by the camera resolution and camera/eye offset.

In the previous subsections, we determined the location of the resized cropped image containing the target (the frame's interior), with respect to the HMD: pixel coordinate (I, J) determines where the upper-left corner of the image would be placed. Then, based on the segmentation performed, we determine which pixels of the resized cropped image should be displayed. Doing this for each eye, with each camera, completes the basic procedure.

One-camera system adjustments—Next is described a procedure for systems with only one (non-bi-focal) head-mounted camera, or a bifocal system that does all of the tracking and resizing procedures using just one eye's image stream, then estimates the other eye's display based on those results. The camera whose feed is processed per the above procedures is assumed to be aligned (or already adjusted for) the left eye in the following descriptions. I.e., the computations above are performed based on the images from this left-camera only. The display in the right eye's screen is subsequently determined as follows.

Estimating the distance to the object (t)—The distance from the HMD camera to the object, t, should be estimated in order to simulate a stereoscopic effect. We suggest a simple based on the edges of the frame. We assume that the frame is a parallelogram (there are four sides, where each side has the same length as its opposite side, i.e. a rectangle or a rhombus). Whichever edge is the "width" versus the "height" is arbitrary.

One piece of prior information is required for this method, i.e. it must be collected offline and stored in the system beforehand: the perceived width of the frame from a known distance, where "perceived width" means the number of pixels across in a camera image. The perceived width of an object shrinks as the object moves further away.

The perceived width (w) is easy to compute after segmenting the frame as previously discussed. After taking a photo, (see for example FIG. 34) we compute w from a known distance to, knowing that the actual width (say, in centimeters) of the frame is $w_0$. Then using similar triangles, the focal length of our camera is $$F = \frac{w[\text{pixels}] \times t_0[\text{cm}]}{w_0[\text{cm}]}.$$

Now, at each subsequent video frame during tracking, w is measured, and $t_0$ is replaced by t, which can then be solved for. t (the distance between the HMD camera and the object) is given by $$t = \frac{F[\text{pixels}] \times w_0[\text{cm}]}{w[\text{pixels}]}$$

In case it is desired to implement a circular or elliptic frame, use the length of the major axis to estimate the distance t instead of the "width" of the frame.

The above equations do not account for the possible tilting of frames. (i.e., the top of the frame is closer to the user than the bottom, or the left edge is closer than the right edge, etc.). If it is desired, this effect can be alleviated by averaging the width of the top and bottom instead of taking just one value. Similarly, the distance could be computed using both the widths and the heights, and the two corresponding distance estimates can be averaged to produce t. In the case of an elliptic frame, average the resulting distance estimates corresponding to the major and minor axes.

Computing the offset in the screen of the "other eye"—Let $(i, j)^L$ be the corresponding upper-left pixel position of the winning sub-image, as discussed in above, for the left eye. The analogous coordinates for the right eye $(i, j)^R$ will have a slight horizontal offset to the left, i.e., $$(i,j)^R = (i,j)^L - (0,x),$$

where x>0 is a positive integer representing a pixel-offset. x will depend on the resolution of the HMD cameras, the distance between the HMD cameras and the object (t), the "distance" between the eye and the HMD screen (L), and the distance between the cameras (m).

FIG. 14 illustrates three possible scenarios: the object lying directly in front of one eye and the object directly in-between the two eyes. In reality, the object could anywhere in-between the eyes or far to one side, but these simplified cases serve as an approximation. We explicitly address Case 1 below. Case 2 and Case 3 follow similarly using fundamental trigonometry. Note that Case 2 corresponds to a single camera in-between the eyes of the user. This is the least natural case and will probably lead to dizziness; most people use their dominant eye to focus and the other eye trails after (in our example, the left eye would be dominant).

Procedure: We pose the problem as finding the offset needed (in pixels) from the center of the right-eye's HMD screen, x. This offset determines where to "plant" the video feed in the right HMD screen. See FIG. 15. Let L be the "distance" between the eye and the HMD screen, and let m denote the distance between the centers of the user's eyes. Note that the parameter L may need adjustment depending on the presence of any magnifying lenses between the eye and the screen. In that case, a "perceived distance" should be used for L. The trigonometric identities used below will only hold for a linearized approximation of the hardware setup.

m may be separated into x (the desired offset) plus y (the remainder). We have the following equations since the small triangle and large black triangle (in FIG. 15) are similar:

$$m = y + x$$

$$\frac{t}{L} = \frac{y}{x}.$$

Solving this system of equations yields $$x = \frac{m}{\frac{t}{L} + 1}.$$

After rounding, x gives the number of pixels shifted to the left that the image-feed should be placed. If instead the tracking and segmentation procedure is done for the right eye, then x is determines where to place the sub-image in the left HMD screen using $$(i,j)^L = (i,j)^R + (0,x).$$

Note that if the user's head is tilted, then a vertical pixel adjustment is also necessary. Assuming the tilt is known (e.g. from gyroscope technology), a similar procedure as just described can be used to find this tilt.

Also note that some HMD's have physical an "eye separation adjustment" lever available. This must be accounted for in m and the user should be encouraged to experiment with this separation to get the distance approximation to look realistic.

In another embodiment, a virtual frame can utilize a solitary logo (via a sticker, printed on a target object, or a clip).

The scheme here is based on just one copy of a recognizable logo that can be (1) printed on an object, (2) printed on a sticker, which can be stuck to whatever the user wishes, or (3) printed on a clip that can be attached to various objects/surfaces. FIG. 27 illustrates examples of utilizing a recognizable logo on a target object, according to an embodiment. This embodiment addresses all but the leftmost example. Once the logo is located, the system can estimate the apparent size of the logo (or its distance from the user) and create a virtual frame based on the position of the logo in the camera image. Then the interior of the virtual frame is forwarded to the user's HMD screens. This method will be faster than the first embodiment.

The logo may be printed on the device, a removeable/disposable sticker, a clip, etc. The distance to the logo will probably need to be computed as described above. By making the logo a box resembling the frame above, all of those procedures may be used. Alternatively, the logo could be a very simply circle or start, etc., and the detection algorithm can heavily utilize different scales. I.e., the detection/tracking algorithm will implicitly determine the size of the logo, which will correspond to its distance from the user. The latter is recommended and discussed explicitly below.

Detecting and Tracking the Logo—The detection/tracking algorithm is the same as in the previous explanations; however, it is recommended to heavily exploit the fact that many different scales can be checked during the scoring stage. I.e., when the network is evaluating the current frame to determine where the logo is, it compares the image with different scales of the exemplar image (all implicitly defined in the network weights). This allows the tracking algorithm to infer the perceived size of the logo (i.e., how large the logo appears to the camera, which depends directly on how far away it is).

To summarize, the at each video frame, the tracking algorithm outputs (i, j), the pixel coordinate of a winning sub-image containing the logo, and S, the scaling factor (which represents the perceived size of the logo).

Logo Analysis and Virtual Frame Definition (Defining the Virtual Frame)—It makes sense to have a window that varies in size as it is moved closer/further away from the user (size in terms of the number of pixels it takes up in the HMD). Most of the parameters involved in defining the frame, at this point, will depend on the specific implementation. For example, values of S may range from 0.01 to 1, or from 1 to 100, depending on the original training data. This makes it difficult to provide step-by-step instructions. The idea is to use S to determine how many pixels tall and wide the virtual frame should be.

Figure 29:
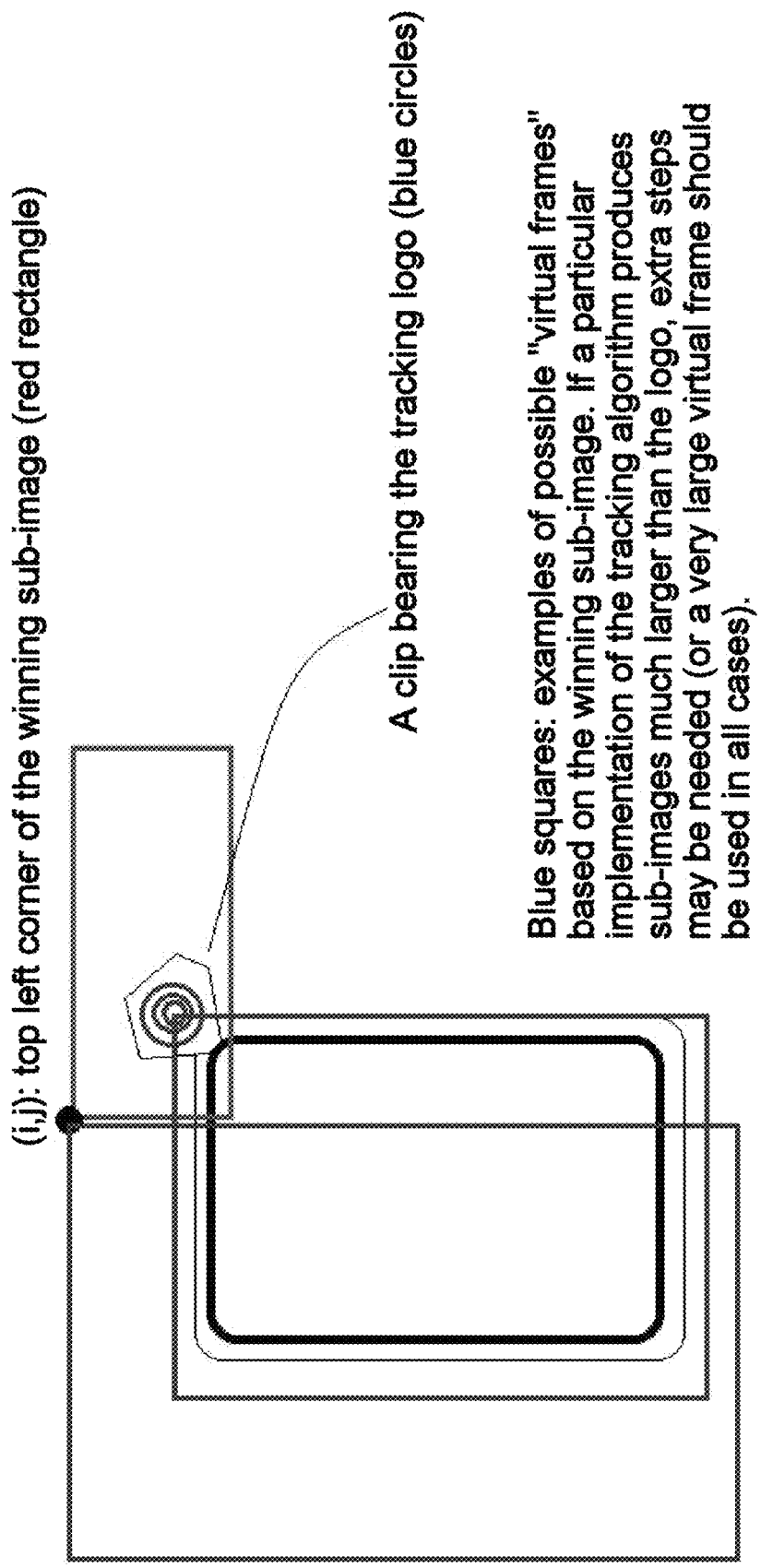
FIG. 29 is a drawing illustrating virtual frames, according to an embodiment.

FIG. 29 is a drawing illustrating virtual frames, according to an embodiment.

Two squares depict different options for the virtual frame, based on the logo (circles) and its corresponding winning sub-image (the rectangle). This is meant to illustrate that it may not be sufficient to simply make the sub-image coordinate (i, j) one corner of the virtual frame, unless the tracking algorithm is rather precise (which it may be, depending on the extent of the training data).

If the winning sub-images tend to be much larger than the logo, it may be advantageous to locate the logo within the winning sub-image. This can be done by the tracking algorithm as described above, or by heuristically determining the center of the logo as follows:

"Center of mass" of a sub-image (color-intensity):— Suppose the logo can be expected to be darker than the rest of the sub-image. Then the pixel coordinate of its center will heavily influence the "center of color-intensity" (i.e., like the centroid of an object but using color intensity instead of mass). The center of color intensity is computed as:

$$M = \sum_{i=1}^{N} \sum_{j=1}^{M} I_{i,j}$$

$$a = \text{round}\left(\frac{1}{M}\sum_{i=1}^{N} \sum_{j=1}^{M} I_{i,j} \times i\right)$$

$$b = \text{round}\left(\frac{1}{M}\sum_{i=1}^{N} \sum_{j=1}^{M} I_{i,j} \times j\right),$$

Where $I_{i,j}$ is the color intensity at pixel coordinate (i, j), and M is the sum of all intensities in the sub-image. The round operator simply rounds to the nearest integer-values pixel coordinate.

Placing the Video in the HMD—These steps are the same as previously discussed, but utilize the virtual frame instead of the winning sub-image. The feed inside the virtual frame may need to be resized and shifted.

One difference between this and the previous Frame Embodiment is that we may be able to skip the estimation of t, the distance between the user and the logo. E.g., we can probably use S, the scale of the logo to estimate the necessary offset in the other HMD eye screen.

Figure 30:
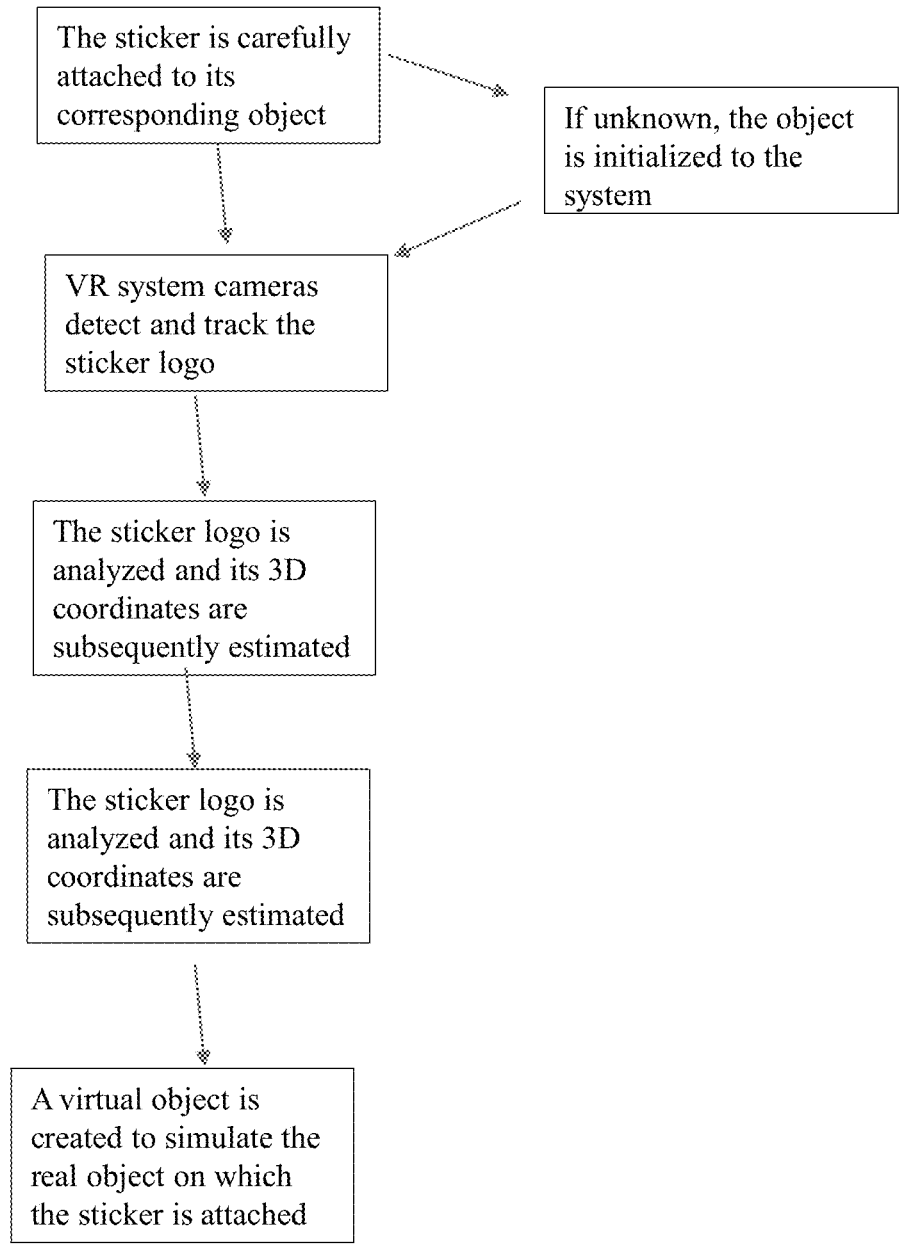
FIG. 30 is a flowchart illustrating an exemplary method of utilizing a sticker to denote a mixed reality object which is created as a virtual object, according to an embodiment.

In an embodiment, a standalone sticker can be used to denote a mixed reality object, the sticker bearing a pattern known to the system is placed on an object. The system locates the pattern and proceeds to analyze it in order to create a virtual object with approximately the same dimensions as the real object bearing the sticker. FIG. 30 is a flowchart illustrating an exemplary method of utilizing a sticker to denote a mixed reality object which is created as a virtual object, according to an embodiment.

The sticker bearing a pattern known to the system is placed around an object. It needs to go all the way "around" the object so the system can recognize the pattern from any angle (e.g., the user can freely turn the object). The system detects and tracks the pattern. At each frame of the video playing the user's HMD, the system analyzes the pattern to determine the object's 3D coordinates and orientations (e.g., how tilted it is along any dimension). Then, a virtual object with approximately the same dimensions as the real object is rendered in the virtual environment with the same relative distance to the user. This way the user can interact with the real object while immersed in a virtual environment.

Figure 31:
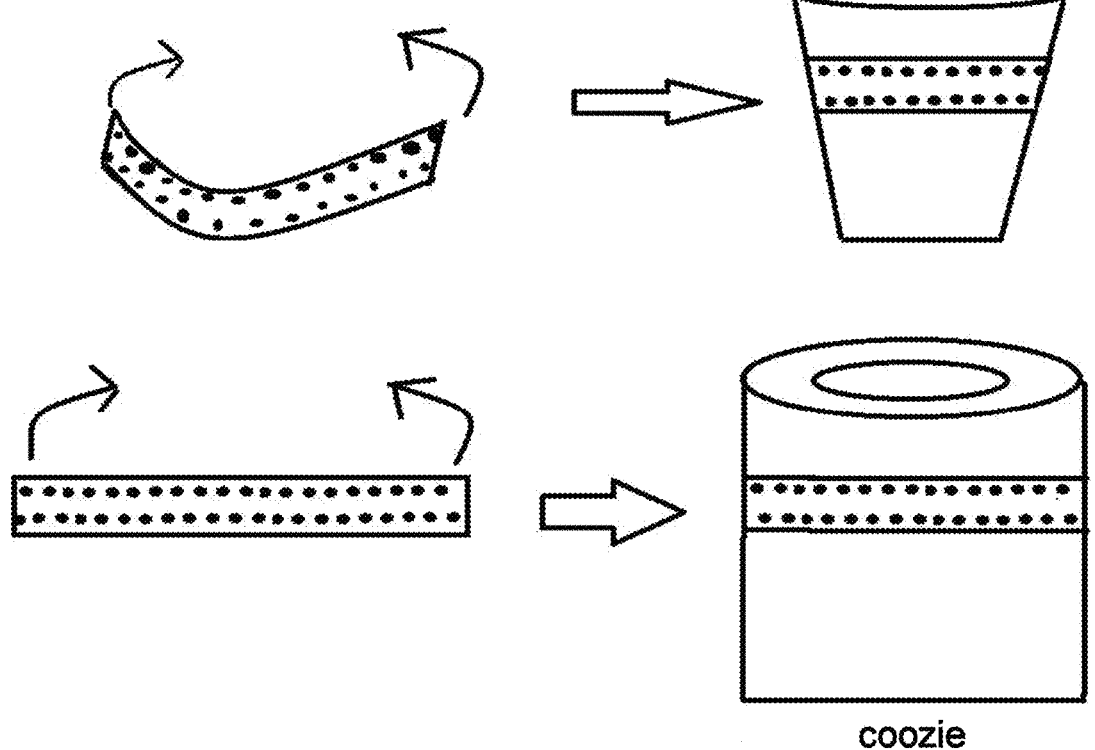
FIG. 31 is a drawing illustrating a logo pattern that can be attached to an object, according to an embodiment.

FIG. 31 is a drawing illustrating a logo pattern that can be attached to an object, according to an embodiment.

Multi-camera array: To use real-time image processing analysis, some camera must always have a sufficient view of some portion the logo (for the pattern suggested in the next subsection, "sufficient" means two adjacent dots from each row—four total). This imposes some requirements on the system:

Multiple cameras are necessary in case the user comes between a camera and object.

We do not suggest running our tracking procedure on all the video streams produced by a multi-camera array. Instead, we present a procedure for choosing which camera to use at a given point based on its location (specifically, the nearest one).

Figure 32:
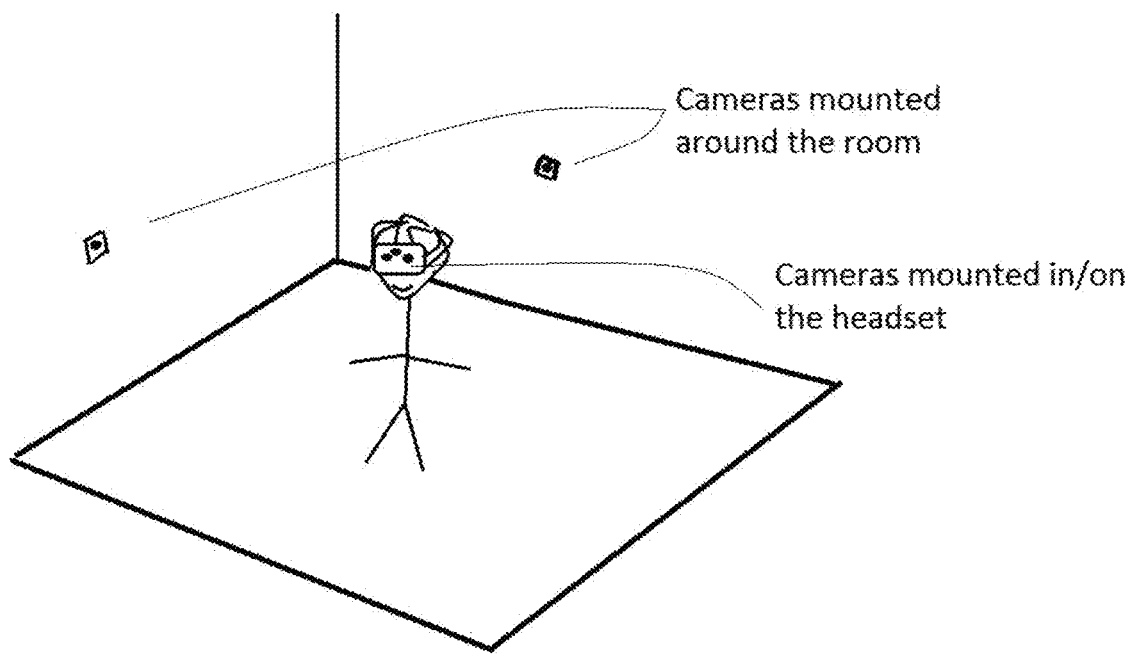
FIG. 32 is a drawing illustrating cameras mounted around the room and in/on the headset, according to an embodiment.

For best results, it is recommended to have a camera mounted on the user's HMD. For example, when the user is holding the object and facing away from most cameras, it may be hard for a camera to distinguish the pattern from across the room (even if finger-interference is accounted for in the tracking algorithm). FIG. 32 is a drawing illustrating cameras mounted around the room and in/on the headset, according to an embodiment.

The ideal camera setup would be having cameras suspended off the floor (see FIG. 32). However, it should work with less accuracy using the cameras on the ground or ceiling. Additional work is needed for cameras that are not level with the floor (i.e. pointing diagonally up/down).

Placing cameras around the room (e.g. mounted on the wall) is optional. We propose a procedure that relies solely on head-mounted cameras, where preferably 2 or more are mounted on the user's headset. This case is addressed at various points in the procedure below and assumes that the headset is using "inside-out" tracking, i.e. the system has 3D coordinates for the cameras' locations.

Sticker Design and Placement: The sticker needs to be visible from any angle of viewing the object (see FIG. 32). If the user, as pictured, held the object with an attached sticker directly in front of him/her, with the sticker facing away from his/her face, then there are no cameras that can detect the sticker. Thus the sticker needs to wrap around the object and/or cameras need to be strategically placed around the room.

Figure 33:
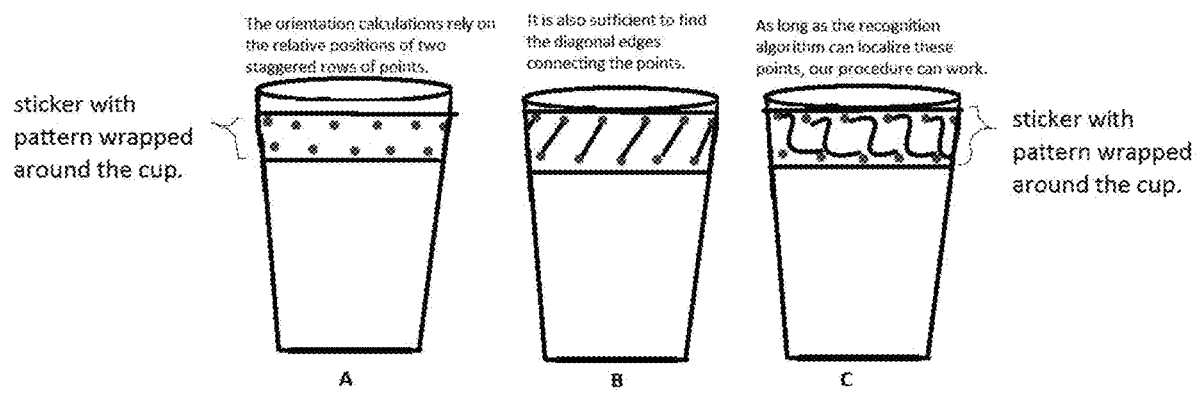
FIG. 33 is a drawing illustrating sticker/logo design examples, according to an embodiment.

FIG. 33 is a drawing illustrating sticker/logo design examples, according to an embodiment. The procedures for analysis presented in the below sections rely on two vertically displaced rows of dots. However, if a top and bottom row of dots can be reconstructed from the sticker logo, this will work.

After logo analysis, the system will know (1) 3D coordinates for the object, e.g. where in the virtual environment to render the virtual copy of the object, and (2) the orientation of the object, e.g. how tilted it is and in which dimension with respect to the active camera.

The logo should be expected to be only partially viewable at any given moment (i.e. when the user is holding the object, their finger may cover at least half of the sticker). To do the analysis, 4 adjacent dots are necessary: two adjacent dots from each row (see FIG. 33).

Image-processing/computer-vision based measurements as described below are well suited for tracking objects in scenes. However, tilt and coordinate measurements will be rather approximate. In a futuristic VR system it is strongly advantageous to pair image processing techniques with radar, lidar, or acoustic signal processing techniques, which may be capable of more pinpoint accuracy. In this case the camera-based techniques described below can localize a "region of interest" where the object is suspected to be, then use a more advanced probing technique to measure its tilts and distance with respect to the headset, etc.

Object analysis/initialization of an unknown object—We consider two general types of sticker patterns, which denote to the system whether a pre-measured objected is to be rendered or an unknown object. Of course, there could be more than two: there could be a variety of pre-stored objects, each of which has a distinct sticker pattern; when the system detects one of these patterns, it must decide which pattern was detected in addition to analyzing its measurements. A more interesting alternative is to simply have a sticker that tells the system to measure the object it is on. Of course, some pre-stored information still must be stored so that the system knows what measurements to make.

Measurement calibrations—Width/distance calibration using one camera—An integral part of our procedure is estimating the distance from a camera to an object, given an image of the object from the camera's perspective. This is generally impossible to do without a trustworthy reference object or image (i.e., you can't measure the distance to the moon from photo of it, even if you know its diameter; you need a reference image taken from the same camera). We rely on the maximum width of the object, which we assume to be at the top of the cup without loss of generality.

Figure 34:
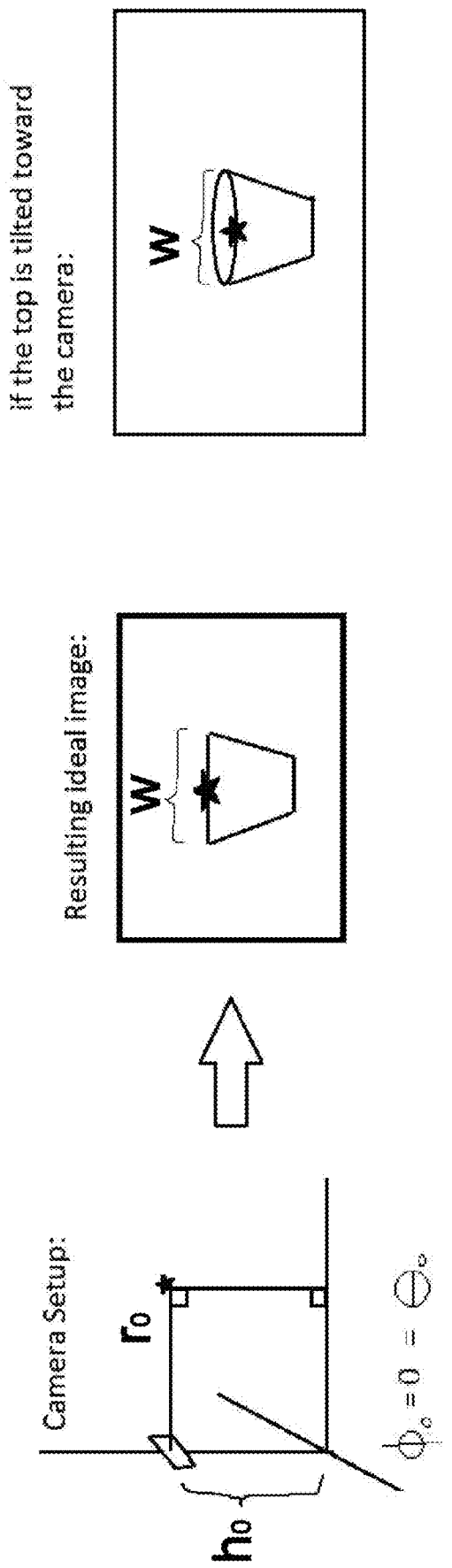
FIG. 34 is a drawing showing how to set up the object and camera to take a reference image, according to an embodiment.

FIG. 34 is a drawing showing how to set up the object and camera to take a reference image, according to an embodiment.

The procedure described herein estimates distance based on the maximum width of the cup as perceived by the active camera. Thus, it is crucial to take an accurate calibration measurement. Different resolution cameras will need separate calibration measurements.

The perceived width of an object shrinks linearly as the object moves further away. The point of detection (e.g., the point of the cup whose (x, y, z) coordinate we wish to estimate) should be centered near the center pixel of the image. It can't be perfect, but the closer the better. In FIG. 34 we focus on tracking the center of the top rim of a cup with the sticker on it, on the rim (not "hovering" in the middle of the cup's mouth). So, the cup should be aligned so that the center pixel of the reference image is on the middle of said upper rim.

After taking a photo using the setup in FIG. 34, we compute the perceived width w from a distance $r_0$, knowing that the actual width of the cup is $w_0$ (using the procedure in described herein and shown in FIG. 13). Then using similar triangles, the focal length of our camera is $$F = \frac{w[\text{pixels}] \times r_0[\text{cm}]}{w_0[\text{cm}]}.$$

We have put the units of each variable in square brackets for clarification. Using [cm] for distance is just an example; any units could be used. Then, at each subsequent frame during tracking, w is measured (the width of the cup as perceived by the active camera). r (the distance between the active camera and the object) can then be estimated using laws of similar triangles.

$$r = \frac{F[\text{pixels}] \times w_0[\text{cm}]}{w_0[\text{pixels}]}$$

Angular calibration—The proposed single-camera method for triangulating the object relies on calibration measurements. We seek to measure the tracking-point's relative position to a reference image, in terms of spherical coordinates, in order to estimate its physical translations in real space. In other words, we convert the "perceived pixel-displacement" of the object's image into "angular displacement" in real life, frame to frame, with respect to the active camera. The angles θ and φ do not vary linearly with (x, y) displacement, they vary with the arc-tangent function. Details are provided in the measurement/analysis sections herein (see also FIG. 19).

The ideal calibration measurement would be straight on (as in FIG. 19). The parameter $h_0$ in FIG. 19 can be zero (corresponding to a camera and target object on the ground). There are pros and cons to having suspended/raised cameras versus grounded cameras. The user's cameras will need to be raised to the same height as in the reference images, so un-grounded cameras will theoretically be more of a hassle to the user. If there is no HMD camera, the experience will greatly benefit from having suspended cameras (i.e. bringing them closer to the cup when in use). Another benefit of grounded cameras is when the cup is placed on the ground when not in use; this may be the most important time for the localization to be accurate (so the user can safely pick up the cup and avoid kicking it over). Then, at the point it is picked up, the system could switch to an HMD or otherwise mounted camera. Of course, an array of cameras at different heights would be the most robust setup.

Figure 35:
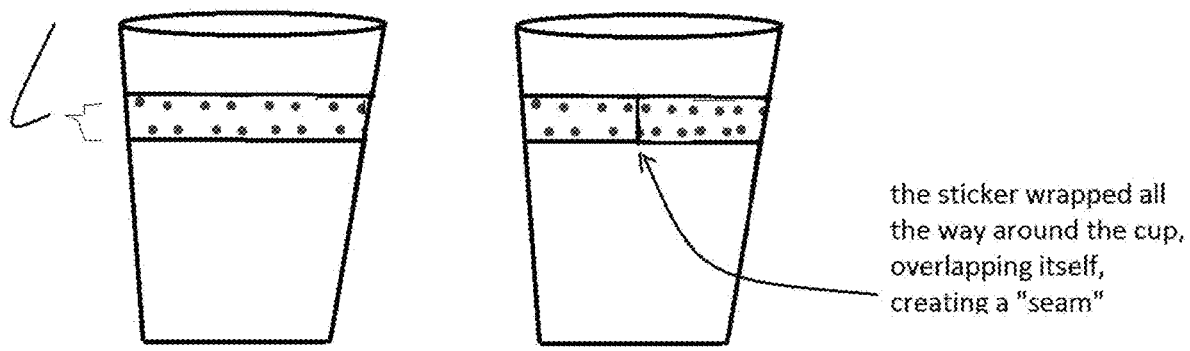
FIG. 35 is a drawing illustrating a sticker wrapped around a cup, according to an embodiment.

New shapes introduced by sticker—FIG. 35 is a drawing illustrating a sticker wrapped around a cup, according to an embodiment. Previously, we assumed the cup has a known size and the sticker is just used to detect and analyze its orientation at a given step. It is possible to introduce one's own cup or coozie to the system, using the following procedure. The sticker needs to be tightly wrapped around the cup (e.g. avoid wrinkles). If the sticker is longer than the circumference of the cup, overlap one side cleanly on top of the other and do not use the edge for the initialization analysis (see FIG. 35).

Perform segmentation of the cup—It is not a difficult task to perform a segmentation of the cup. Use the tracking/detection algorithm to locate the logo, then use a segmentation algorithm to get the boundary of the cup. This is the smallest closed boundary enclosing the logo (unless the cup has some details/patterns on it itself, in which case some prior information should be used in segmentation: e.g. ensure that the boundary is a certain number of times taller than the distance between the rows of markers.). Appropriate segmentation algorithms include graph cuts, active snake contours, or simple edge detectors if a solid-color backdrop is used for the initialization image.

Figure 36:
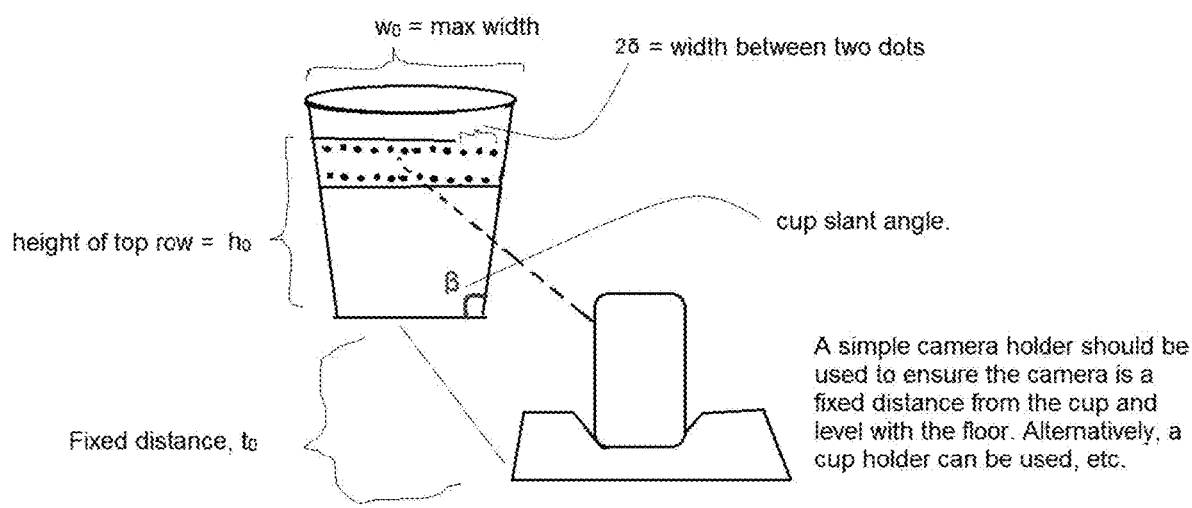
FIG. 36 is a drawing illustrating measurements taken of a cup, according to an embodiment.

FIG. 36 is a drawing illustrating measurements taken of a cup, according to an embodiment.

Characterize cup shape—It is easy to estimate the radius of the cup at any given height. Measure the width of the cup at height $h_0$ as pictured in FIG. 36: the height at which the top row of markers are aligned. We now have an estimation of the width in terms of $\delta$ (via the number of markers), and in terms of pixels. Now consider the following cases:

Initialization photo taken straight on; NONE of the inside of the cup is visible Consider pairs of boundary pixel indices that are in the same row; i.e. boundary pixels at the same height, but on opposite sides of the cup. Whichever pair is furthest apart (or closest) designates the maximum (or minimum) width of the cup, as well as where that distance occurred (e.g. the top of bottom of cup if the cup has some slant).

The other cases consider imperfect initialization images:

Max width of cup achieved at top or bottom—Perform the maximum/minimum distance search as in Part (a.), above. If we assume that the cup has a constant (or approximately constant) slant, we just need to compare the vertical pixel indices of the max and min distances. If the maximum width occurs at a vertical-pixel index higher than the y-index at which the minimum width occurs, then the max width occurs at the top of the cup. The reverse is true if the maximum width has a lower y-index than the minimum width.

Nonstandard Cups:—If the cup is rather funky or nonstandard (e.g. an hourglass shape or coffee mug), more specific procedures will be necessary.

Estimate width of cup using sticker pattern—The sticker dots are a known distance apart, say $\delta$cm. Then take an initialization photo using the setup in FIG. 36. Say the distance between dots in the image are D pixels. The number of markers (in the figure they are dots, but in practice it could be any identification pattern/logo) serves as an approximation of the width of the cup at an unknown midsection of the cup. Suppose there are N markers visible. To improve the accuracy of this measurement, measure the distance between the outermost markers and the boundary computed in the segmentation step (e.g. find the distance between the outermost markers and the nearest boundary index to each of those points). Denote this distance (in pixels) by $r^L$ and $r^R$, e.g. the left and right distances respectively. Then add that distance to the width. So, the total width of the cup at height $h_0$ in pixels is $$w_p(h_0) = (N*D) + r^R + r^L$$

Then the pixel-to-cm conversion is $$\frac{\delta}{D} = \frac{w_p}{w_{cm}} \Rightarrow w_{cm} = w_p * \left(\frac{D}{\delta}\right)$$

The measurement is actually unnecessary, unless the user it instructed to place the sticker on the widest part of the cup. However, we may similarly estimate the width at other heights. Let $w^*_p$ denote he maximum or minimum width of the cup in pixels, measured as described in the "characterize cup shape" section. The pixel-to-cm conversion is:

$$w^*_{cm} = w^*_p * \left(\frac{D}{\delta}\right)$$

Figure 37:
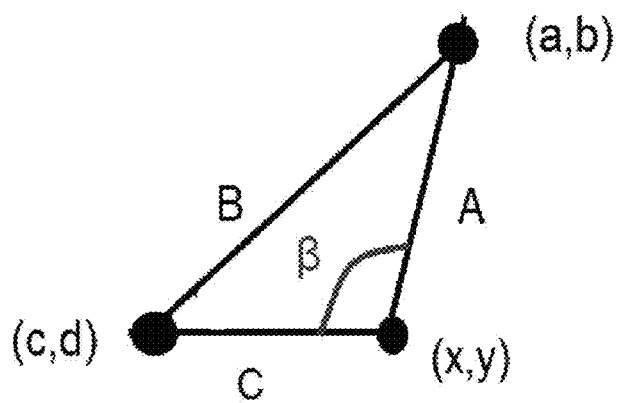
FIG. 37 is a drawing illustrating how to compute the slant of the cup, according to an embodiment.

FIG. 37 is a drawing illustrating how to compute the slant of the cup, according to an embodiment.

Measure cup slant—Using the pixel indices of the segmentation step, we now infer the angle of slant the cup has. This step illustrates the importance of having the camera and cup perfectly flat on the same surface (although the cup may be raised as in FIG. 36 so that the shutter is level with the top row of markers for increased accuracy). Let $\beta$ be the angle of slant, computed using any points (a, b), (c, d) and corner pixel (x, y) as shown in FIG. 37:

$$\beta = \cos^{-1}\frac{A^2 + C^2 - B^2}{2AC}$$

$$A = \sqrt{(a-x)^2 + (b-y)^2}$$

$$B = \sqrt{(a-c)^2 + (b-d)^2}$$

$$C = \sqrt{(x-c)^2 + (y-d)^2}$$

Note that the cup may not have any slant as in the coozie drawn in FIG. 31. In this case $\beta$ should be about 90°.

Special case: coozie—Suppose the sticker is wrapped around a coozie that has, for example, a glass bottle in it. Some standard types of objects that might be found in the coozie should be pre-programmed into the system. The type of object in the coozie can then be detected in this step. Some examples include (a) an object/image classification algorithm, similar to the one used in tracking, described in a subsequent section, (b) use a specialized active contour algorithm to extend the boundary up or down (but not sideways) until the next smallest continuous boundary is found. A complex method of displaying the exact bottle can be used, or the method can just detect how much taller the bottle is than the coozie, and render a generic approximation based on this dimension.

Summary—We now have all the necessary measurements for rendering the cup or coozie (and possibly its contents) in virtual reality, after locating the sticker pattern. More details about using these dimensions to render the correct shape is discussed at the end of the writeup.

Using only HMD cameras—If the HMD has a series of cameras, then both of the pre-stored measurements discussed above may be unnecessary: (1) the distance from the any two cameras to the cup can be computed using one of the well-studied procedures for bi-camera triangulation, and (2) if many cameras are on the HMD, the angular displacement may become negligible at any given point (i.e. if the nearest camera is always "looking" at the logo rather straight-on). While the situation in (2) is a longshot, the distance being measured by a stereoscopic distance map is probably more likely to be employed than the single-camera method suggested below.

Detecting and Tracking the Sticker Pattern—Initialization—It is unnecessary and even infeasible to have tracking algorithms running on each camera in an of video streams; especially if there is nothing to be found (i.e. no stickers are in even in the playspace). We suggest that when introducing an object with the sticker on it to the system for the $1^{st}$ time, either (1) a single camera is running the tracking algorithm all of the time, and the user is expected to "present" the cup to the camera to introduce it into the space; or (2) the user executes an "initialization" mode where the system exhaustively searches for the cup, starting with the camera nearest the user (or one mounted on the HMD, in which case the user just needs to be facing the cup). An alternative initialization procedure is described below.

Which Camera to Use (depending on position)—In the following procedures we need to compute the Euclidean distances between points in 3D space. The Euclidean distance between two points with familiar Cartesian coordinates, $(x, y, z)_0$ and $(x, y, z)_1$, is $$\text{distance} = \sqrt{(x_0-x_1)^2 + (y_0-y_1)^2 + (z_0-z_1)^2}.$$

If one of more points is in spherical coordinates, we must convert them to Euclidean coordinates before applying the above equation. To convert $(r, \theta, \phi)$ to $(x, y, z)$ we use $$x = r \cos \theta \cos \phi$$

$$y = r \cos \theta \sin \phi$$

$$z = r \sin \theta$$

Basic Protocol: As the object moves around the room, the camera with the best view should be used. The best camera is the closest one that has a clear view of the logo. A clear view is achieved when the tracking algorithm is able to score above some threshold (the tracking score is defined explicitly in the next subsection). For example: if the object is very close to Camera A, but logo is not found, then the next closest camera should be determined. We presume to have the relative (x, y, z) coordinates of both the object and cameras (computed using procedures described herein), so it is simple to determine the next-closest camera using Euclidean distance.

Suppose that Camera B is the next-closest camera. Then the current frame from Camera B will be analyzed. If the logo still cannot be found by Camera B, the next closest camera will be used. And so forth. If the tracking algorithm is implemented so that it can barely operate in real-time, there may be a skip of up to N frames, if the N-th closest camera is the nearest one that has a clear view of the logo. Employing HMD-mounted cameras will be strongly advantageous in avoiding these errors when the user is holding the cup, while room-based cameras are ideal when the cup is placed away from the user.

Choosing an appropriate threshold for the tracking algorithm depends on the exact logo used, and how the tracking algorithm is implemented. It may need a higher threshold (i.e. a more precise logo match) if the logo is difficult to detect and track. Details on tracking are provided in the next section.

A more robust camera array—A good way to avoid skips is to install a camera on the HMD of the user. Presumably, if the nearest camera cannot find the logo, the user is holding/examining the object. Then a head-mounted camera will (a) probably have the best view, and (b) probably be the nearest camera, anyway.

A series of cameras can be included on the HMD (2 or more). In this case, it is advantageous for the system to employ the nearest two cameras to observe the target object. Only one video stream needs to be fully analyzed with the tracking algorithm at each frame; the region containing the cup in one camera view can be inferred from the other depending on the displacement of the two cameras. This is discussed in detail in the steps below.

If the user is holding the object—If the user is holding the object, her fingers may block the view of the logo (even from the view of the HMD camera). This is why a repetitive pattern is desired: so that the tracking algorithm can find some part of the logo, even if some of it is covered. The tracking score threshold should be calibrated with the robustness of the logo ("how much" of the logo is necessary for logo analysis). Another way to promote robustness is to include hand-blocking in the training data (elaborated below), so that the tracking algorithm itself expects finger interference.

Tracking the Logo—Defining the target—We now describe a procedure for recognizing and tracking the VR container based on the paper "Fully Convolutional Siamese Networks for Object Tracking" by Bertinetto et al. This approach was shown to track complex objects (human bodies, dogs, etc.) at 86 frames per second (fps). Fully convolutional neural networks are becoming commonplace in object tracking. It is a discriminative machine learning algorithm, meaning it requires a "training" phase during which the algorithm "learns" about a target using human-annotated example data, e.g. videos with labeled trajectories for the object in question. Here, the target is a sticker with a special logo or pattern on it. A variety of logos could be learned and used to pass on customized information to the system in the case of multiple objects.

Similarity Learning (training phase)—The training process amounts to solving a numerical optimization problem that determines the weights of a convolutional neural network; the weights must only be learned once. The input to the training algorithm is a series of image pairs taken from video(s) of the sticker pattern/logo, where each video has labeled target trajectories.

Training pairs should include videos of the target moving up/down, closer/further, and left/right of the camera, as well as forward/backward and left/right tilts (and as well as combinations of these degrees of freedom). The algorithm needs to be able to recognize as little as four adjacent "dots" or markers (two above and two below as pictured in the examples figure). Make training videos of the sticker logo on various surfaces (cups, buckets, trays, whatever might be used with the sticker). Pairs can also be resized and reused to simulate fluctuations in the size of the target. The remainder of this subsection describes how to compute the output of the training phase: an array of weights, w.

Conceptually, we are learning a function $f(z, x; w)$ that compares an exemplar image z to a candidate image x, and returns a high score if the two images portray the same object. The training process requires examples of input pairs to $f$, $(z, x)$, as well as scores (v) and labels (y). $y \in \{-1, +1\}$ refers to whether $(z, x)$ is a matching pair, and v is a real-valued score, i.e. the desired output of $f$ (large if z and x depict the same object, small if not). Image pairs consist of an exemplar image z of size m×n and a large search image x of size M×N, each extracted from the same video and centered on the target (use padding, if necessary, to center the object; see FIG. 11). Many training examples come from each pair by considering all the sub-images that are defined by sliding an s(m+p)×s(n+p) rectangle around the larger search image. s is a scaling factor, and p is a padding constant. Each sub-image is assigned a positive annotation if it is within a radius R of the center c:

$$y[i] = \begin{cases} 1, & k\|i-c\| \leq R \\ -1, & k\|i-c\| > R \end{cases},$$

where k is the stepsize or "stride" of the sliding rectangle, i is the index of a sub-image, R is a radius to be determined according to the image resolution of the video camera, and c is the center index. By considering many sub-images, we gain a map of scores v[i] from each pair. Recall the logistic loss function $$l(y,v) = \log(1+\exp(-yv)),$$

which is extended as follows to compute the loss of a score map (the mean of individual losses):

$$L(y, v) = \frac{1}{|D|} \sum_{i \in D} \ell(y[i], v[i])$$

which requires a true label $y[i] \in \{+1, -1\}$ for each position $i \in D$ in the score map. The training phase amounts to computing the network weights w by applying Stochastic Gradient Descent to the problem $$\arg \min_w \varepsilon_{z,x,y} L(y, f(z, x; w)).$$

$f$ is the convolutional neural network whose parameters we seek. $f$ computes a cross-correlation-based score for the sub-images located at z and x:

$$f(x,z;w) = \phi(z) * \phi(x) + b,$$

where b is a constant, and <p sends a sub-image to its feature map (i.e. a representation based on the parameters w). See the enclosed reference for mathematical details.

Tracking the Target—After the weights w have been estimated, $f$ is fully defined and ready to use for tracking. The initial z should be a straightforward pre-set image centered around the logo. $f(z, x)$ is subsequently evaluated, using for x a large search image containing sub-images of the current frame (as in the training example search images), as well as scaled versions of each sub-image. Thus, when the logo enters the field of view of the video camera, the score map produced by $f$ will contain a sufficiently high score (over some threshold), corresponding to the location (and scale) of the sub-image containing the logo. z is then set to this winning sub-image, after centering it around the target in the same manner as in the training phase (see FIG. 11). This pattern is repeated for subsequent frames: x is the collection of sub-images of the current frame, and z is the winning sub-image from the previous frame (after centering). This process keeps track of the coordinates (i, j) of the logo-containing sub-image, from frame to frame (where i is pixel row, and j is the pixel column). (i, j) may correspond to the upper-left corner, upper-right corner, etc., depending on one's preferred implementation.

We assume from here on that sub-images are square, and that (i, j) denotes the upper-left pixel coordinates of the winning sub-image at the current frame. Further, note that the displacement of the target from frame to frame can be determined by the relative position of the maximum score to the center index, scaled by k. Denote this displacement vector at the current frame by d.

This tracking algorithm may be enhanced using various temporal regularization schemes, such as considering optical flow or otherwise incorporating the past 'appearance' of the logo. In any case, to avoid unrealistic jumps, large displacements should be penalized (i.e., apply a non-linear threshold such as the cosine window to the score map), and sub-images should only be considered if they are from a limited region around the object's previous position (say, within a radius of 3-6 times the target's previous size, in pixels). This prevents the object from artifactually jumping across the display etc.

Sticker analysis for 3D coordinates and orientation—We often refer to the diagonal lines connecting nearby dots as shown in the center panel of FIG. 33, rather than the dots by their self. Dots can be inferred based on a more general pattern if desired, and the lines from the dots. The following procedures are based on rotationally symmetric objects such as bottle cozies or cups. There are two linearly independent types of tilting that occurs in 3D space: to/fro tilts, and left/right tilts.

Left/right tilt—The left/right tilt of the cup can be measured by the angle between the global axis and the diagonal lines in the pattern. See FIG. 20. Consider the diagonal line connecting the two points from lower-left to upper-right with pixel coordinates (m, n) and (i, j), respectively. The angle this segment has with the global z-axis is given by $$\alpha = \tan^{-1}\left(\frac{i-m}{j-n}\right)$$

To/fro tilt—The to/fro tilt can be inferred by the relative separation between the top and bottom of two diagonal segments. See FIG. 21. When the top of the cup is rotated away, two diagonal lines are closer at the top than they are at the bottom. When the bottom of the cup is rotated away, the two diagonal lines are closer at the bottom than the top.

Let L1 be the separation between two diagonal lines at their top, and L2 be their separation at the bottom. When the cup is upright relative to the camera, L1/L2=$R_0$ (the diagonal lines appear parallel). If L1/L2>$R_0$, the bottom of the cup is rotated away. If L1/L2<$R_0$, the top of the cup is rotated away. Call R=L1/L2 the ratio of these lengths.

What follows is 3 ways to estimate the angle of tilt:

Direct ratio-tilt conversion: The question is, how much does 3 degrees of tilt cause the ratio R to change? The answer depends on both the camera and logo, so we simply provide a procedure for estimating this for a given system.

This experiment should be performed offline, i.e. before releasing to the user (like the other calibration measurements). Using a setup like that in FIG. 19, take some photographs of the cup at different tilts (the amount of tilt needs to be controlled accurately). Then, measure the widths $L_1$ and $L_2$ at each tilt. Next, use regression to compute a best-fit curve to the data points ($R_i$, $\beta_i$) (where $R_i$ is the ratio of widths, $L_1/L_2$, when the cup is tilted $\beta_i$ degrees). Use both positive ("fro") and negative ("to") tilts. A linear regression may be sufficient, but a higher order regression may be necessary for longer distances (by plotting ($R_i$, $\beta_i$), one should be able to deduce the most appropriate type of approximation function).

The result of this regression scheme will be some coefficients that define a continuous best-fit line for the data. Later, during tracking, at each frame the ratio R can be measured and input to this best-fit line and the corresponding tilt $\beta$ can be estimated.

Another approach is to use a second camera, for which we present two sub-methods:

If another camera has a perpendicular view of the cup, its left/right tilt corresponds to the "to/fro" tilt of the main active camera. This is computationally costly than the previous method but possibly has increased accuracy. There are only two linearly independent dimensions along which the cup can tilt, so two such measurements should be sufficient.

In the case that there are multiple cameras on the HMD, the tilt can be computed using bifocal triangulation of two points on the cup. Using bi-camera triangulation (discussed below), the cameras can compute the distance to the top and bottom of the cup. Suppose these two points have coordinates $(x, y, z)_1$ and $(x, y, z)_2$. Then, using a vertical line as a reference, the angle between the points can be computed. The tilt $\beta$ is given by $$\beta = \arctan\left(\frac{z_1 - z_2}{x_1 - x_2}\right)$$

where $x_1$ and $x_2$ are the axial coordinates relative to the cameras; i.e. along the dimension between the cameras and cup (x measures how far the points are from the cup when projected onto a flat line below).

This may be the most difficult and sensitive measurement to make using image processing (a high-resolution camera may be necessary for very accurate tilt estimate). If a flexible laser/ladar/radar system can step in to make two measurements of distance to different points on the cup (based on the localization performed in the tracking step), the to/fro tilt can be estimated from there. Suppose point A is distance R1 from the transmitter, and point B is distance R2 from the transmitter.

Computing Object's Real 3D Coordinates $(r, \theta, \phi)_0$ (or where on the object is the $(x, y, z)/(r, \theta, \phi)$ being tracked)—A 3D object cannot by described by a single 3D coordinate. For example, if you claimed that "the cup is at $(x, y, z)_0$," one must ask "is $(x, y, z)_0$ a point at the top, bottom, or midsection of the cup?" and "is $(x, y, z)_0$ a point on the front, back, or in the middle of the cup, relative to the user?".

Suppose Camera A has a clear view of the cup (i.e. the tracking score is above some threshold). Then we assume that any $(x, y, z)$-coordinate estimated by Camera A must be on the face of the cup seen by Camera A (this may seem extremely obvious but it must be incorporated into the algorithm). In other words, the cup must be "sticking out behind" the point measured by Camera A. Further, we must know relative position of $(x, y, z)_0$ on the cup. The tracking algorithm presented above actually keeps track of a sub-image containing a portion of the logo (we don't assume that the entire logo is visible). Then, we determine the maximum width of the visible cup. In the previous two subsections, we determine the tilts. Combining all this information will give us coordinates $(r, \theta, \phi)$ for the center of the top-rim of the cup.

See FIG. 23. The rightmost panel shows the point on the cup to be tracked is on the edge of the top of the cup, in the middle (not hovering in the center of the cup opening between edges).

Consider the case where 2 or more cameras are attached to the HMD. Then it is advantageous to analyze the logo from two viewpoints. The logo can be tracked independently in each eye, or to save computational resources, it can be tracked in one camera image and the "winning sub-image" for the other camera image can be inferred from the first. Suppose the cameras are separated along the left/right dimension, and the tracking procedure is completed using the video from the left camera only, yielding the winning sub-image pixel coordinates $(i, j)^L$. Then the winning sub-image coordinates for the right camera will be shifted a bit to the left:

$(i,j)^R=(i,j)^L-(x,0)$

Where $x>0$ is an integer representing a pixel offset. To ensure robustness, instead of shifting the winning sub-image, its left border should simply be extended (doubled). If the image is analyzed in the right camera, then copy the winning sub-image to the left camera image and extend its right border by 2x. This makes the winning sub-image a "wider" rectangle.

A similar procedure should be done if the cameras also have a vertical displacement, using $(i,j)^{above}=(i,j)^{below}-(0,y)$, where we assume the winning camera image in the higher/above camera needs to be extended downwards; or the lower/below camera winning sub-image needs to be extended upwards. The point is to ensure that the logo is found inside the "winning sub-image" in both camera images.

Estimate the Distance from the Active Camera to the Object ($r_0$)—There are various ways to accurately compute the distance of an object from a sensor, including radar, lidar, etc. However, in those cases the sensor needs to know "where to look", and must able to tell the difference between, say, the object and the user. Stereoscopic cameras (dual lenses) have also be used to compute distance. We present a novel way of estimating the distance between a camera and a point on an object using a single lens camera (the active camera).

Rotationally Symmetric Objects—By rotationally symmetric, we mean an object whose shape does not change as it is spun around (such as a cup with no handle). This method relies on a reference or calibration measurement of the maximum width of the cup. ($r_0$, $w_0$) See FIG. 34 for calibration measurement setup. This dimension of the object does not vary with left/right tilting—it only varies with distance, and a little bit from to/fro tilting.

To do real time distance-tracking we first measure this width-dimension using the following procedure (see FIG. 19):

I. From Step 3 in the Tracking box around the cup. It doesn't matter as much how accurate this is, as long as the bounding box is nearly proportional to.

II. The bounding box should have 4 extremity pixels: the (i, j) index of the leftmost, rightmost, highest and lowest points of the bounding box.

III. The maximum width of the cup is depicted as a dashed line in FIG. 17. Here is a procedure for determining the length of this segment:
   i) Bisect the cup image in half. If three points are on one half, then go to Case 1. If two points are on each half, go to Case 2.
   ii) In Case 1, the width w is the distance between the left and right extremity.
   iii) If one of the bottom corners becomes a left/right extremity, or one of the top corners becomes the top extremity, etc., then we have Case two. Then the maximum width is the distance between the two extremities in the top half.

IV). The apparent distance between two pixel locations (a, b) and (c, d) is computed using the Pythagorean theorem:

$w=\sqrt{(a-c)^2+(b-d)^2}$ w is an estimate of the perceived width of the container in pixels.

V). We now employ the calibration measurements F and $w_0$ to compute the current distance to the object using $$r = \frac{F \times w_0}{w}$$

Other objects—When it comes to "digitizing" a 3D object, in general there is much to be gained from special properties like rotational symmetry. Without such properties, stereoscopic cameras may be used to estimate distance, but non-image-processing methods will probably prevail. A promising approach is to use camera tracking to localize the objects and supplement the analysis with more precise methods for tilt measurements etc.

Using bifocal camera to determine r—Computing distance to an object using two cameras is well-studied and easy to find detailed descriptions. Using steps above, locate the pixel representing the point on the cup that we wish to track (the center of the rim nearest the active camera). Then create a distance map using stereoscopic estimates, and refer to the corresponding point on the map (or take an average of nearby points on the cup).

Compute Polar-angular displacement (θ)—The next two subsections deal with estimating the polar and azimuthal angular displacements. See FIG. 24.

In this section we seek to answer the question "what is the change in polar angle due to a vertical displacement of Δy pixels?" See FIG. 25.

Two cases are shown in FIG. 23. the tracking point is below the camera and further from the calibration measurement. Also shown is the tracking point is above the camera and nearer to the camera. In both cases, the polar angle is given by a simple arc-tangent computation. In the equations given, we use the convention that θ ranges from −90° to 90°, and we let displacements downward correspond to a negative pixel displacement (i.e. Δy<0 if the object is below the camera).

$$\theta = \tan^{-1}\left(\frac{\Delta y}{r_0}\right)$$

Compute Azimuth-angular displacement (φ)—This step is nearly identical to the previous one. We seek to answer the question "what is the change in azimuth angle due to a horizontal displacement of Δx pixels?" Simply replace θ with φ, and Δy with Δx. Imagine FIG. 25 was rotated about the x-axis so that the different lines exist in a horizontal x-y plane, instead of a vertical x-z plane. We get $$\phi = \tan^{-1}\left(\frac{\Delta x}{r_0}\right)$$

Convert (r, θ, φ) to global system coordinates—Combining the previous sections gives us a coordinate (r, θ, φ), with respect to the active camera. I.e., the radius extends from the active camera's position and the angles are with respect to the camera's line-of-sight. The coordinate thus needs to be adjusted for a global reference system for display. In the next sections when we refer to (r, θ, φ) or (x, y, z), we assume that the computed coordinate has been transformed to such a global coordinate system.

Creating the virtual object—The rest of the object, relative to (x, y, z)/(r, θ, φ)* We now have a point (r, θ, φ) on the top rim of the cup. To render the object we:
a. create the top rim: a circle on "the other side" of the tracking point (x, y, z)*, at the angles α and β (left/right and to/fro tilts, respectively), with respect to the active camera.

b. create the bottom rim: a smaller circle in a parallel plane at the appropriate distance away (the height of the cup)
c. Make everything in-between the circles from (a) and (b) opaque to the user.

Alternatively, depending on what sort of rendering software is used, it might be easier to render the cup by creating a cone. The circular base of the cone corresponds to the top rim of the cup, and should be placed as in part (a), so that the tracking point is on the rim facing the active camera. Then, simply "chop off" the cone at the parallel plane where the bottom rim should be (from part (b)), i.e. depending on the length of the cup. Then color-in the middle and make invisible the tip, to make a frustum corresponding to the cup. A cone with its "tip" chopped off is called a frustum.

Fitting a frustum (or cone) equation to two points—Some optional steps from the above procedures suggest using two cameras to measure two points on the surface of the cup during a single frame. A cup can be thought of as a cone with its tip chopped off; this shape (kind of like a trapezoid crossed with a cylinder) is called a frustum. Three points are necessary to define a shape such as a cone in 3D space, but with heuristic tricks, two points may do the trick. For example, we know that each point measured is facing its corresponding camera. So, after fitting a frustum or cone equation to the two points, we can correctly render it in virtual reality by making sure the rest of the frustum "sticks out" on the other side of the dots from the cameras.

Fitting the equation to more points—With 3 or more points, actual triangulation could be performed. The problem with this sort of "brute force" approach is that cameras must have a "clear view" of the logo to estimate these points. Thus, none of the cameras may be on the other side of the user from the cup. However, if the user can be expected to dedicate a whole room to virtual reality, perhaps someday we can put a huge array of cameras around the VR room.

In that case, the cone/frustum equation can be fit to the three (or more, using approximation techniques) points and the tilt may not even need to be estimated.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:
1. An apparatus, comprising:
a virtual reality headset configured to be worn on a player's head, the virtual reality headset comprising an output device and a camera array comprising more than two cameras;
a computer configured to communicate with the virtual reality headset, the computer configured to read computer readable instructions from a non-transitory computer readable storage medium, the computer readable instructions are programmed to:
display on the output device a virtual world using a position and an orientation of the headset;
capture respective images of a physical object from individual cameras in the camera array, and compute a respective tracking score for the physical object for each of the individual cameras, the tracking score computed based upon how much of a pattern on physical object is visible, and determine a selection of the respective images of the physical object to utilize based upon the respective tracking scores; and determine a position and orientation of the physical object using the selection of the respective images.

2. The apparatus as recited in claim 1, wherein the physical object is a cup.

3. The apparatus as recited in claim 1, wherein the computer readable instructions are further programmed such that the selection of respective images is a single image.

4. The apparatus as recited in claim 1, wherein the computer readable instructions are further programmed such that the selection of respective images is a first image and second image, and the using the selection of respective images utilizes a combination of a portion of a first image and a portion of the second image.

5. A method, comprising:

displaying a virtual world on an output device on a virtual reality headset configured to be worn on a player's head, the virtual reality headset comprising an output device, an electronic processor, and a camera array comprising more than two cameras;

executing computer readable instructions stored on a non-transitory computer readable storage medium on the electronic processor, the computer readable instructions causing the electronic processor to perform:

displaying on the output device a virtual world using a position and an orientation of the headset;

capturing respective images of a physical object from individual cameras in the camera array, and computing a respective tracking score for the physical object for each of the individual cameras, the tracking score computed based upon how much of a pattern on the physical object is visible, and determining a selection of the respective images of the physical object to utilize based upon the respective tracking scores; and determining a position and orientation of the physical object using the selection of the respective images.

6. The method as recited in claim 5, wherein the physical object is a cup.

7. The method as recited in claim 5, wherein the computer readable instructions are further causing the selection of respective images is a single image.

8. The method as recited in claim 5, wherein the computer readable instructions are further causing the selection of respective images to comprise a first image and a second image, and the using the selection of respective images utilizes a combination of a portion of a first image and a portion of the second image.

* * * * *